United States Patent
Senn

(10) Patent No.: US 12,293,745 B2
(45) Date of Patent: May 6, 2025

(54) SYSTEM AND METHOD FOR CREATING A SENSORY EXPERIENCE BY MERGING BIOMETRIC DATA WITH USER-PROVIDED CONTENT

(71) Applicant: Paul Senn, Swampscott, MA (US)

(72) Inventor: Paul Senn, Swampscott, MA (US)

( * ) Notice: Subject to any disclaimer, the term of this patent is extended or adjusted under 35 U.S.C. 154(b) by 459 days.

(21) Appl. No.: 17/808,936

(22) Filed: Jun. 24, 2022

(65) Prior Publication Data

US 2022/0319477 A1 Oct. 6, 2022

Related U.S. Application Data

(63) Continuation-in-part of application No. 17/659,600, filed on Apr. 18, 2022, now abandoned, which is a
(Continued)

(51) Int. Cl.
*G10H 1/00* (2006.01)
*G06F 3/01* (2006.01)
(Continued)

(52) U.S. Cl.
CPC .......... *G10H 1/0008* (2013.01); *G06F 3/015* (2013.01); *G06F 3/017* (2013.01); *G10L 19/02* (2013.01);
(Continued)

(58) Field of Classification Search
CPC .......... G10H 1/0008; G10H 2240/056; G10H 2240/131; G06F 3/015; G06F 3/017; G10L 19/02; H04R 5/033; H04R 5/04
See application file for complete search history.

(56) References Cited

U.S. PATENT DOCUMENTS 7,674,224 B2 3/2010 Hewett
10,264,990 B2 4/2019 Pasley et al.
(Continued)

OTHER PUBLICATIONS

"Constant-Q Transform and Chroma," Web page https://musicinformationretrieval.com/chroma.html, 5 pages, Jul. 27, 2017, retrieved from Internet Archive Wayback Machine https://web.archive.org/web/20170727035250/https://musicinformationretrieval.com/chroma.html on Aug. 12, 2020.
(Continued)

*Primary Examiner* — Robert W Horn
(74) *Attorney, Agent, or Firm* — Neal, Gerber & Eisenberg LLP

(57) ABSTRACT

Systems and methods for generating sensory outputs (e.g., tactile, scent, and/or flavor) based on biometric/neurometric user data are provided. One exemplary method comprises receiving an incoming signal from a bio-generated data sensing device worn by a user; receiving an input signal representing sensory content experienced by the user in association with generation of the incoming signal; populating a common vocabulary with one or more values determined based on the input signal; determining a set of output values based on the incoming signal, the common vocabulary, which comprises a list of possible output values, and a parameter file, which comprises a set of instructions for applying the common vocabulary to the incoming signal to derive the set of output values; generating an output array comprising the set of output values; and providing the output array to an output delivery system configured to render the output array as a sensory output.

27 Claims, 31 Drawing Sheets

Related U.S. Application Data continuation of application No. 16/872,940, filed on May 12, 2020, now Pat. No. 11,308,925.

(60) Provisional application No. 63/334,309, filed on Apr. 25, 2022, provisional application No. 62/885,307, filed on Aug. 11, 2019, provisional application No. 62/846,918, filed on May 13, 2019.

(51) Int. Cl.
  *G10L 19/02* (2013.01)
  *H04R 5/033* (2006.01)
  *H04R 5/04* (2006.01)

(52) U.S. Cl.
  CPC ............ *H04R 5/033* (2013.01); *H04R 5/04* (2013.01); *G10H 2240/056* (2013.01); *G10H 2240/131* (2013.01)

(56) References Cited

U.S. PATENT DOCUMENTS

| | | | |
|---|---|---|---|
| 10,321,842 B2* | 6/2019 | Garten | A61B 5/486 |
| 10,369,323 B2 | 8/2019 | Joseph | |
| 10,534,900 B2* | 1/2020 | Cheong | G06F 21/34 |
| 10,752,488 B2* | 8/2020 | Bey | B67D 1/0035 |
| 10,832,643 B1 | 11/2020 | Trim et al. | |
| 11,140,486 B2* | 10/2021 | Bae | H04M 1/72412 |
| 11,275,778 B2* | 3/2022 | Marvaniya | A61B 5/6898 |
| 11,308,925 B2* | 4/2022 | Senn | G06F 3/015 |
| 11,786,163 B2* | 10/2023 | Garten | A61B 5/375 600/28 |
| 12,029,573 B2* | 7/2024 | Garten | G16H 50/20 |
| 2007/0079691 A1 | 4/2007 | Turner | |
| 2015/0093729 A1 | 4/2015 | Plans et al. | |
| 2015/0297109 A1* | 10/2015 | Garten | A61B 5/38 600/28 |
| 2016/0027423 A1 | 1/2016 | Deuel et al. | |
| 2016/0173982 A1 | 6/2016 | Anderson | |
| 2017/0172523 A1 | 6/2017 | Temko et al. | |
| 2017/0180911 A1 | 6/2017 | Burton | |
| 2018/0246570 A1 | 8/2018 | Coleman et al. | |
| 2019/0038237 A1 | 2/2019 | Chafe et al. | |
| 2019/0056707 A1* | 2/2019 | Pollard | A61B 5/165 |
| 2019/0164156 A1 | 5/2019 | Lindemann | |
| 2019/0187802 A1* | 6/2019 | Roh | G06F 3/0346 |
| 2019/0222918 A1 | 7/2019 | Mackellar et al. | |
| 2019/0288973 A1* | 9/2019 | Liu | G06V 40/176 |
| 2019/0333487 A1 | 10/2019 | Patitucci et al. | |
| 2019/0387998 A1* | 12/2019 | Garten | A61M 21/00 |
| 2020/0302825 A1* | 9/2020 | Sachs | H04N 21/472 |
| 2020/0341548 A1* | 10/2020 | Giordano | G06F 3/02 |
| 2020/0365125 A1 | 11/2020 | Senn | |
| 2021/0038857 A1 | 2/2021 | Chattopadhyay et al. | |
| 2021/0325834 A1 | 10/2021 | Hiemstra et al. | |
| 2022/0319477 A1* | 10/2022 | Senn | G06F 3/016 |
| 2023/0368478 A1* | 11/2023 | Huang | G06F 3/011 |

OTHER PUBLICATIONS

"Logic Pro X," Web page https://www.apple.com/logic-pro/, 17 pages, Apr. 30, 2019, retrieved from Internet Archive Wayback Machine, https://web.archive.org/web/20190430205121/https://www.apple.com/logic-pro/ on Aug. 12, 2020.

"Spire Health: Clinical-Grade Health Monitoring and Insights," Web page https://spirehealth.com/, 7 pages, Apr. 12, 2019, retrieved from Internet Archive Wayback Machine, <http://web.archive.org/web/20190412040851/https://spirehealth.com/> on Aug. 12, 2020.

"The Official MIDI Specification," Web page https://www.midi.org/specifications/, 3 pages, Apr. 30, 2019, retrieved from Internet Archive Wayback Machine https://web.archive.org/web/20190502030218/https://www.midi.org/specifications/ on Aug. 12, 2020.

Humanizing With Automation Envelopes, https://makingmusic.ableton.com/humanizing-with-automation-envelopes, Sep. 2015, 3 pp.

Introduction to OSC, <http://opensoundcontrol.org/introduction-osc> Jan. 2, 2008, 2 pp.

Mind Monitor, https://mind-monitor.com/, May 2010, 7 pp.

UnityOSC, Instruction Sheet, <http://thomasfredericks.github.io/UnityOSC/>, Aug. 5, 2017, 3 pp.

* cited by examiner

1500

| Name of TCCS Parameter | Description | Use of Parameter in Audio Output | Use of Parameter in Video Output |
|---|---|---|---|
| TargetingPlugin | For each input data sample, call targeting plug-in and render appropriate output if threshold hit | Contains the logic that determines how audio stream will be affected if defined parameter ranges (or thresholds) are hit | Contains the logic that determines how video stream will be affected if defined parameter ranges (or thresholds) are hit |
| ProcessingPlugIn | This is code that makes use of defined parameters, and is called for each input data sample and produces output to be sent to Audio and/or Visual Processing Engine. | Contains the logic that determines how the defined parameters will affect the audio stream | Contains the logic that determines how the defined parameters will affect the video stream |
| Audio Engine | This system is responsible for audio production and will be where the instrumentation and other choices are made, for instance Logic Pro on a MAC with MIDI data coming in from Processing Plug-In and sent to MIDI channels. | The system will start the Audio Engine or expect it to be running, with open channels mapped to instruments, waiting for input from Processing Plug-In. | N/A |
| Visual Engine | This system is responsible for video and other visual production and will be where scripted animations, lines/shapes, rotations, scale, positions, colors or other visual structures and regions will be implemented. | N/A | The system will start the Visual Engine or expect it to be running, with threads of execution waiting for input from the Processing Plug-In.<br><br>For instance, a version of Unity on the MAC could be running, with OSC data coming in from Processing Plug-In and processed using C# scripts attached to Unity Game Objects. |

| Name of TCCS Parameter | Description | Use of Parameters in Audio Output | Use of Parameters in Video Output | Example of Usage |
|---|---|---|---|---|
| Divisions | Tells how many notes or beats in each basic division | Allows for introduction of algorithms such that points of emphasis are put in at end of measures, or set based on measure boundary or modified based on measure boundary | Allows for introduction of algorithms such that animation, speed, line/shape, rotation, scale, position, color, boundaries can be set at end of measures, or modified based on measure boundary | Divisions = 2<br>DivisionType = Beats<br>DivisionArray = {4,4}<br>DivisionVocabularyTones = [{A, C#, E}, {E, G#, B}]<br>DivisionVocabularySymbols = [{Circle, Square, Rectangle}, {Triangle, Cube, Line}]<br>Could results in 2 divisions, each 4 beats long. In first division, tones used will be A, C#, and E, and shapes rendered will be Circle for A, Square for C#, and Rectangle for E. |
| NoteLength | Sets the base length of the quarter note | Allows for introduction of algorithms that use this length as a base and modifies it in formulas which include other elements below | Allows for introduction of algorithms that use this length as a base and modifies it in formulas which include other elements below | BaseNoteLength = .2<br>Could result in base length of quarter note being .2 seconds and base length of lines used in shape being .2 millimeter (mm). |
| Fbackground Key (primary pitch set) | Defines notes that will be considered primary | Allows for introduction of algorithms such that when a note is ambiguous, between two pitches in the well tempered system or other system of choice, the notes within the key are favored | Allows for introduction of algorithms such that visual maps are created matching the audio map represented by the well tempered or other system, and when a data value calculates to a point position that is ambiguous, between two regions, animations, animation speed, line/shape, rotation, scale, position, color or other visual boundaries, the point position that matches the | Key = [D, E, F#, G, A, B, C#]<br>AlphaScaleFactor = 100<br>def setPitchforAlpha (alphaVal)<br>  pitch = alphaVal*AlphaScaleFactor<br>  midival = getMidiNote(pitch)<br>  if (midival in Key)<br>    curMidiNote = midival<br>  else<br>    curMidiNote = nearestNote(Key, pitch, tonalCenter1)<br>  endif<br>  return curMidiNote<br>end<br><br>In this example, the biometric data showing current alpha power level is represented by variable alphaval, which is |

| Name of TCCS Parameter | Description | Use of Parameters in Audio Output | Use of Parameters in Video Output | Example of Usage |
|---|---|---|---|---|
| | | | pre-established visual map is favored | scaled up by multiplying by 100 then sent to a function getMidiNote which returns the midi note represented by the scaled value. If the note is not in the key, a function nearestNote is called which returns nearest note in key. The resulting note can be mapped to a visual shape as shown in the Divisions row above. |
| TonalCenter1 | Defines note that will be considered center (allows modes) | Allows for introduction of algorithms biased to produce this note more frequently than others | Allows for introduction of algorithms biased to produce animations, animation speed, line/shape, rotation, scale, position, color or other visual characteristic more frequently than others | Key = [D, E, F#, G, A, B, C#]<br>TonalCenter1 = 'D'<br>Example function in pseudo-code:<br>def nearestNote(key, pitch, tonalCenter)<br>    midival = getMidiNote(pitch)<br>    if (midival in key)<br>        curMidiNote = midival<br>    else<br>        tmp1 = getMidiNote(key, pitch+1)<br>        tmp2 = getMidiNote(key, pitch-1)<br>    # favor tonal center by order of<br>    # conditional checks<br>    if (tmp1 in Key and<br>        tmp1 == tonalCenter)<br>        return tmp1<br>    elseif (tmp2 in Key and<br>        tmp2 == tonalCenter)<br>        return tmp2<br>    elseif (tmp1 in Key)<br>        return tmp1<br>    elseif (tmp2 in Key)<br>        return tmp2<br>    else<br>        return curMidiNote<br>    end<br>end |

| Name of TCCS Parameter | Description | Use of Parameters in Audio Output | Use of Parameters in Video Output | Example of Usage |
|---|---|---|---|---|
| | | | | The resulting note can be mapped to a visual shape as shown in the Divisions row above. |
| Randomness Factor (can be an attribute of every parameter above) | Allows for introduction of randomness in application of other parameters | Could be applied to any parameter to introduce an element of randomness through application of a different algorithm or algorithms, the frequency of which is determined by randomness factor | Could be applied to any parameter to introduce an element of randomness through application of a different algorithm or algorithms, the frequency of which is determined by randomness factor | Random{NoteLength} = .50<br>def varyNoteLength(noteLength)<br>  tmp = RandomRange(0.0, 1.0)<br>  if (tmp < Random{NoteLength})<br>    return noteLength -1<br>  else<br>    return noteLength<br>  endif<br>end<br># function will shorten note length by 1 50% of the time |

| Creative Circuit | Description | Example Usage | Comment |
|---|---|---|---|
| Intrapersonal Spoken/sung/chanted word ←→ Mind | Output Sensory experience is blend of EEG and auditory characteristics of subject's voice | Guided meditation or hypnosis | Individual can interact with their own brain waves, either all or with selected EEG bands (alpha, theta, etc) |
| Intrapersonal Musical Instrument ←→ Mind | Output Sensory experience is blend of EEG and auditory characteristics of instrument | Creative improvisation practice or performance | Individual can interact with their own brain waves, either all or with selected EEG bands |
| Intrapersonal Mind ←→ Mind | Different EEG bands can be set to different algorithmic treatment and channels, Sensory experience is blend of output of individual bands | Setup system so Alpha power level is flute, interacting with violin driven by Beta power | Individual can see and hear the interplay between different EEG wave lengths as a musical/visual experience. |
| Interpersonal Spoken/sung/chanted word ←→ Mind | Output Sensory Experience is blend of EEG outputs from 1, 2 or more individuals and auditory characteristics of 1, 2 or more subjects' voices | 1 person speaks, multiple people wear EEG headsets and listen, or a two person circuit, with both alternately speaking and listening and both wearing headsets | A creative circuit between 1 or more individuals and their audience, or between 2 people interacting, or between 2 groups interacting |
| Interpersonal Musical Instrument ←→ Mind | Output Sensory Experience is blend of EEG outputs from 1, 2 or more individuals and auditory characteristics of 1, 2 or more instruments | 1 musician wearing headset, multiple people wearing headset listening, or multiple musicians playing, wearing headsets | Creative Circuit can be between musicians, between musicians and audience, between audience members, or all of the above |
| Interpersonal Mind ←→ Mind | The Output Sensory Experience produced by 1 person or group's brain waves is recorded and used as base for musical vocabulary of another person or group, so | Could be simply 2 people face to face, wearing headsets | Creative Circuit for "MindMerge" experience between individuals or groups |

| Creative Circuit | Description | Example Usage | Comment |
|---|---|---|---|
| | this output is itself the "User provided content" rather than the spoken word or instrument | | |
| Playback mode<br>EEG file input ←→<br>EEG file input | By looping different files of different lengths with different mappings, continuously varying audio/visual experience can be generated | Background music or texture for massage or relaxation | Creative circuit renewing the past brings it to life and can have overlaid significance for listeners if the files represent content from a significant past event or individual or group. |
| Interpersonal or intrapersonal Hybrid Playback/Real-Time mode<br>EEG file input ←→ Mind | Output Sensory Experience is blend of EEG outputs from 1, 2 or more individuals and EEG output from previously recorded file(s) | A file may hold EEG output from a previous individual or group that a person wants to re-experience and interact with. | Creative circuit between the present and the past can have therapeutic or inspirational value. |
| Interpersonal or intrapersonal Hybrid Recorded Audio ←→ Mind | Output Sensory Experience is blend of EEG outputs from 1, 2 or more individuals audio output from arbitrary audio recording | A favorite song can create an audio texture that the system analyzes and uses as base musical vocabulary for EEG, i.e. music algorithm | Creative circuit between a user's mind and their favorite song. |

```
import keys
cycleLength=128
cycleIterations=600
maxonly=False
enableRecord=False
playInvitation=False
playRecordingPrompts=False
usestarters=False
playstartertones=False
musicalinput=False
recordOnlyOnce=True
pauseLength=0
samplingPace=0
segmentLengths=[32,64,96,128]
primaryNotes=["C","A", "F", "G"]
secondaryNotes=["G","E-","C","B-"]
drumPreferredNotes=["C", "C#", "D", "D#"]
starterScaleNotes=["C#5", "F#4", "C#6","B5", "E4",
   "G6","A#5", "C6", "D6", "G4", "A2", "A4", "G#5"]
starterPreferredNotes=["E", "F#", "G", "A"]
starterTertiaryNotes=["C#", "D", "E", "F#"]
preferredNotesArray=[["A", "E", "F",  "C"],["C", "D", "F",
   "A","G"],["E", "B", "D","C","G"],["A", "D", "F",
   "E","G"],["C", "A", "B", "E", "B","G"]]
#samplingPaces=[30,30,80,20]
samplingPaces=[1,1,1,1]
centralNote="D"
skipNote="D-"
midiInCount=6
midiIn=[0,0,0,0,0,0]
volumeControl="raw4"
dissonanceControl="OFF"
rhythmicControl="beta,gamma"
pitchControl="alpha,theta,raw2,raw3,raw4"
tempoControl="gamma"
intervalControl="delta"
harmonicControl="raw1"
```

| Name of TCCS Parameter | Description | Use of Parameter in Tactile Output | Use of Parameter in Flavor/Scent Output |
|---|---|---|---|
| Targeting Plugin | For each input data sample, call targeting plug-in and render appropriate output if threshold hit. | Contains the logic that determines how tactile output will be affected if defined parameter ranges (or thresholds) are hit | Contains the logic that determines how flavor/scent output will be affected if defined parameter ranges (or thresholds) are hit |
| Processing Plugin | This is code that makes use of defined parameters, and is called for each input data sample and produces output to be sent to appropriate Processing Engine | Contains the logic that determines how defined parameters will affect the audio stream | Contains the logic that determines how defined parameters will affect the audio stream |
| Tactile Engine | This system is responsible for Tactile production, for instance a Smart back massage device with the capability to deliver touch at a given pressure and pulse speed | The system will connect to the Tactile Engine, for instance by establishing a network connection to a Smart back massage device capable of receiving control commands | N/A |
| Flavor/Scent Engine | This system is responsible for Flavor or Scent production, for instance a Smart Drink dispensing device with the capability to deliver a beverage containing different proportions of pre-loaded liquids | N/A | The system will connect to the Flavor/Scent Engine, for instance by establishing a network connection to a Smart drink dispensing device capable of receiving control commands |

| Name of TCCS Parameter | Description | Use of Parameters in Tactile Output | Example of Usage |
|---|---|---|---|
| PressureLevel | Sets the base range for applied pressure (could be a number or word signifying a range of numbers) | Allows for introduction of algorithms that use level as a base and modifies it in formulas that use other elements | PressureLevel = {Light}<br>LightRange = 1.0 - 3.0<br>Will send control commands to Tactile Engine to deliver pressure in range from 1-3, with exact number determined by algorithm, which may take B/N data as input |
| PulseDivisions | Defines number of pulses in each basic division | Allows for introduction of algorithms such that pressure can be applied in timed groups with pauses or emphasis on given beats | PulseDivisions = 2<br>PulseDivisionType = Pulses<br>PulseDivisionArray = [4,4]<br>PulseDivisionVocabularyPressure = [{Light, Medium}, {Medium, Heavy}]<br>Could result in 2 divisions, each 4 pulses long. In first division, pulses used will be Light and Medium Pressure level. |
| Pulse Type | Defines type of pulse | Allows for introduction of algorithms that can take advantage of Tactile Engine's ability to deliver different types of pressure | PulseType = {sequential}<br>A "smart glove" with pressure delivery capability at each finger could have a "sequential" delivery setting, where pulses are delivered to each finger in sequence, or an "all" setting, where pulses are delivered to all fingers at once. |
| Temperature | Defines temperature at pressure delivery point | Allows for introduction of algorithms that can take advantage of Tactile Engine's ability to deliver different temperatures | Temperature = {neutral}<br>A Smart Back massager may have a built in hot-pad capability, such that along with the pressure delivery points there is a surrounding pad that can be set to a certain temp. |

| Name of TCCS Parameter | Description | Use of Parameters in Flavor/Scent Output | Use of Parameters |
|---|---|---|---|
| FlavorScent Category | Defines available Flavors and/or Scents | Allows for introduction of algorithms that can deliver Flavors or Scents of varying types | FlavorScentCategoryArray={{Bitter}, {Sweet}] FlavorScentCategoryDetailArray={{Lemon} {Sugar, Agave}] These are zero based associative arrays. The FlavorScentCategoryArray is a zero-based associative array, such that element n of this array is associated with element n of the FlavorScentCategoryArray. Hence element 1 of the FlavorScentCategoryArray (Sweet), has details of Sugar and Agave in the FlavorscentCategoryDetailArray |
| ScentFlavor Map | Defines which compartment in Flavor/Scent Engine contains which Flavor/Scent | Used by algorithms for sending command information to Flavor/Scent Engine | ScentFlavorMap=[{Lemon, 1}, {Tomato, 2}] Indicates Lemon is in compartment 1 and Tomato is in compartment 2 |

| Creative Circuit | Description | Example Usage | Comment |
|---|---|---|---|
| Intrapersonal Mind ←-> Mind | Output sensory experience is a blend of Audio and Tactile | Setup system so pulse speed of back massager as well as flute volume level is determined by EEG Alpha power | The combination of audio and tactile sensory experience can give user very clear and powerful feedback |
| Interpersonal Musical Instrument ←-> Mind | Output sensory experience is a blend of EEG outputs from 1, 2 or more individuals and auditory characteristics of 1, 2 or more instruments, plus emitted scents | 1 or multiple musicians with some or all wearing EEG headsets, multiple listeners with some or all wearing wrist heartrate monitors, EEG headsets, drum is driven by aggregated heart rate data, lavender scent driven by Aggregated EEG data (Theta power levels) | Scent will feedback on heartrate and EEG levels, as will drum. Easy measurement of these effects provides tool for research.<br><br>Many combinations of sensory feedback modes and input modes can be tested |

| Sensory Experience Category | Examples of Elements of Vocabulary | Methods of Vocabulary formation | Examples of Delivery Mechanism |
|---|---|---|---|
| Sound | Pitch, velocity, attack, sustain, vibrato. (all parameters available from MIDI protocol, including MIDI control messages | Spectral analyzer, MIDI message monitor | Digital Audio Workstation (DAW), such as Logic |
| Sight | Angles{15, 20, 45}, Shapes{Circle, Triangle, Cube}, Colors{hue, saturation, chroma, size, velocity, direction (for animation) | Computer vision - object and shape recognition systems such as Python OpenCV library | Computer graphics, animation system such as Unity |
| Smell/Taste | Category (earthy, fruity, medicinal, minty, musky, smoky, etc.) and the corresponding chemical compounds, intensity | Olfactometry, Gas Chromatography Mass Spectrometry | "Smart" aroma delivery device, with capability to load chemicals needed to express vocabulary<br><br>Smart" food/drink delivery device with capability to load food/drink sources to express vocabulary |
| Touch | Pressure, rate, temperature, wave type (smooth or choppy, circular) | Analysis of device control messages correlated with user feedback gather during use of Smart body stimulation device | "Smart" body stimulation device (back massager or glove) with capability to deliver pressure to points on the body to express vocabulary |

Fig. 28

SYSTEM AND METHOD FOR CREATING A SENSORY EXPERIENCE BY MERGING BIOMETRIC DATA WITH USER-PROVIDED CONTENT

CROSS-REFERENCE TO RELATED APPLICATIONS

This application claims the benefit of U.S. Provisional Patent Application No. 63/334,309 filed Apr. 25, 2022 and is a continuation-in-part of U.S. patent application Ser. No. 17/659,600 filed Apr. 18, 2022, which is a continuation of U.S. patent application Ser. No. 16/872,940 filed May 12, 2020, which is now issued as U.S. Pat. No. 11,308,925 and claims the benefit of U.S. Provisional Patent Application No. 62/885,307 filed Aug. 11, 2019 and U.S. Provisional Patent Application No. 62/846,918 filed May 13, 2019, the entire contents of each of the foregoing applications being hereby incorporated by reference herein.

TECHNICAL FIELD

This application generally relates to biometric data, and more specifically, to creating a sensory experience using biometric and/or neurometric data and user-provided content.

BACKGROUND OF THE INVENTION

The increased availability of low-cost portable devices that capture biometric/neurometric input data has prompted a new generation of applications to become available to the general public. The terms biometric and neurometric are used herein to generally encompass all data that is derived from measurements taken of living organisms, whether this be pulse, blood pressure, or brain wave/electroencephalogram (EEG) data, for example. These terms are often used to refer to authentication and security mechanisms, but are used herein in a wider context. This data can now be utilized outside of clinical environments for purposes ranging from entertainment to fitness to health monitoring and diagnostics. Different bio/neurometric data sources can be merged, and devices can also be networked to create a new generation of data uses where the merged data of multiple individuals can be processed in real-time. An example of a new low end EEG system is the Muse 2016, a portable headset developed by Interaxon Corporation to capture both EEG and heart rate in real-time. Software applications have been written to process this data, such as the demonstration application that comes with the Muse system. This application, which runs on Android or iOS devices, is designed to help a person improve their meditation skills. Several other low end EEG systems are also available, some at lower price points than the Muse. These technological advances are putting EEG, Heart Rate Variability (HRV), and other forms of biometric/neurometric data capture in the hands of more individuals than was possible before. Accordingly, there is a need for systems and/or techniques configured to utilize this data in new and useful ways.

SUMMARY OF THE INVENTION

The invention is defined by the appended claims. This description summarizes some aspects of exemplary embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

Systems and methods are provided herein for using brain waves or other bio/neurometric data to enhance a sensory experience by forming a creative circuit between a user's mind and user-provided content. For example, the user may wear an EEG headset for detecting their own brain activity, or other equipment for collecting bio/neurometric (B/N) data from the user. The B/N data can be measured while the user is creating content, such as, e.g., speaking, singing, chanting, drawing, listening, etc., or experiencing an audio-visual event, such as, e.g., a live performance by another person, a pre-recorded performance, playback of an audio and/or video file, experiencing a tactile sensation such as getting a back massage, or a taste or smell sensation such as smelling a flower or eating an ice cream cone. Techniques described herein are used to create an enhanced sensory output (e.g., audible sound and/or visual data, a tactile experience, a flavor and/or scent experience, or any combination thereof) by merging or blending the user-provided content with corresponding EEG signals. For example, frequencies and overtones detected in the user-provided audio content can be used as the preferred notes for translating biometric data into musical tones. These techniques can be used in some cases to create a feedback loop while the user is producing music (or experiencing a musical performance) by modifying the output, in real time, as the user continues to produce content (or experience the performance), thus providing a customizable interactive sensory experience. In some cases, the enhanced sensory experience can be stored for future retrieval to allow the user to re-experience the event later. In some cases, the EEG signals can be obtained from one or more listeners, rather than the user/performer that is creating the content, and the modified or enhanced content is presented to the performer (e.g., musician). In other cases, the EEG signals of two people interacting with each other can be blended together and provided to each other as musical outputs or other sensory output. Various other uses cases are also possible, as described herein.

While the exemplary content above is music (and audio sensation), the invention can be applied to any of the five human senses. For example, the chemical makeup of given flowers can be analyzed, and the chemicals discovered can be isolated and used as the preferred scents for translating biometric data into scents. Similarly, the chemical makeup of a given beverage can be analyzed, and the chemicals discovered can be isolated and used as the preferred sources for translating biometric data into tastes. In the tactile realm, temperature settings, pressure levels as well as speed and rhythm of applied pressure used in, for example, an automated or manual back massager can be analyzed and used as the preferred set of temperatures, motions, rhythms, and pressures for translating biometric data into tactile experiences. Just as is the case with music, the techniques disclosed herein can, in some cases, be tailored to create a feedback loop while the user is having a sensory experience, such as, a back massage from a "smart" massage system, thus providing a customizable interactive sensory experience. The massage system may be "smart" in the sense of being capable of responding to electronic commands, delivered over a wired or wireless network connection, that control its delivery of heat and vibrations. For some use cases, the device must also be capable of providing its current parameters in real-time over a wired or wireless connection while in operation. In some cases, the enhanced sensory experience can be stored for future retrieval to allow the user to re-experience the event later. In some cases, the EEG signals can be obtained from one or more listeners, rather than the user/performer that is creating the content, and the modified or enhanced content is presented to the performer (e.g., musician). In other cases the EEG signals of two people interacting with each other can be blended together and provided to each other as musical outputs or other sensory output. In other instances, the B/N data of multiple people who are presented with a taste or smell can be used to create a new taste or smell experience that is the product of the blending of the B/N from these multiple participants, and this can be an iterative process. Various other use cases are also possible, as described herein.

One exemplary embodiment provides a method of creating a coherent output based on biometric and/or neurometric data using a computing device comprising one or more processors and memory. The method comprises receiving a first incoming signal from a first bio-generated data sensing device worn by a user; receiving, from a sensory input system, a first input signal representing sensory content experienced by the user in association with generation of the first incoming signal; using the one or more processors, populating a common vocabulary with one or more values determined based on the first input signal, the common vocabulary being stored in the memory; determining, using the one or more processors, a first set of output values based on the first incoming signal, the common vocabulary, and a parameter file stored in the memory, the common vocabulary comprising a list of possible output values, and the parameter file comprising a set of instructions for applying the common vocabulary to the first incoming signal to derive the first set of output values; generating, using the one or more processors, a first output array comprising the first set of output values; and providing the first output array to an output delivery system configured to render the first output array as a first sensory output.

According to some aspects, the first sensory output is a tactile output comprising vibrations determined based on the first output array, and the output delivery system comprises one or more vibration output devices for generating the vibrations. According to other aspects, the first sensory output is an aroma output having a scent determined based on the first output array, and the output delivery system comprises one or more scent output devices for generating the scent. In still other aspects, the first sensory output is a consumable item having a flavor determined based on the first output array, and the output delivery system includes one or more flavor output devices for generating the flavor.

According to one or more aspects, the sensory input system comprises a tactile input source, and the sensory content is vibratory content applied to the user, the first input signal including first data identifying a pressure level of the vibratory content and second data identifying a pulse rate of the vibratory content. According to some aspects, the sensory input system comprises a tactile input source, and the sensory content is tactile content that is applied to the user and comprises temperature and vibratory components, the first input signal including first data identifying a pressure level of the tactile content and second data identifying a temperature setting of the tactile content. According to other aspects, the sensory input system comprises a material analysis device, and the sensory content is a source material consumed by the user, the first input signal comprising data identifying one or more components of the source material.

According to some aspects, the first bio-generated data sensing device is a monitor configured to collect heart rate intensity or heart date variability data of the user. According to other aspects, the first bio-generated data sensing device is a headset configured to collect electroencephalography ("EEG") signals of the user.

According to one or more aspects, the method further comprises receiving a second incoming signal from a second bio-generated data sensing device worn by the user; determining, using the one or more processors, a second set of output values based on the second incoming signal, the common vocabulary, and the parameter file, wherein the parameter file further comprises a set of instructions for applying the common vocabulary to the second incoming signal; generating, using the one or more processors, a second output array comprising the second set of output values; and providing the second output array to the output delivery system, the output delivery system further configured to render the second output array as a second sensory output.

According to some aspects, the method further comprises receiving a second input signal, from an audio/visual input system, representing audio content produced by the user during receipt of the first incoming signal; populating the common vocabulary based further on the second input signal using a spectral analyzer and the one or more processors; determining, using the one or more processors, a third set of output values based on the first incoming signal, the common vocabulary, and the parameter file; generating, using the one or more processors, a third output array comprising the third set of output values; and providing the third output array to the output delivery system, the output delivery system further configured to render the third output array as an audio output. According to further aspects, the third set of output values comprises Musical Instrument Digital Interface ("MIDI") data.

According to one or more aspects, the first set of output values comprises output values corresponding to at least a first variable and a second variable, and determining the first set of output values comprises: selecting a first output value from the list of possible output values for the first variable based on a frequency band of the first incoming signal and the parameter file, and selecting a second output value from the list of possible output values for the second variable based on a power level of the first incoming signal and the parameter file. In some aspects, the first and second variables are configured to control rendering of an audio output, the first variable being pitch and the second variable being velocity. In other aspects, the first and second variables are configured to control rendering of a visual output, the first variable controlling shape and the second variable controlling angle. In other aspects, the first and second variables are configured to control rendering of a tactile output, the first variable controlling pulse speed and the second variable controlling pulse pressure. In other aspects, the first and second variables are configured to control rendering of a taste or smell output, the first variable controlling category of scent or taste and the second variable controlling intensity.

According to aspects, the first input signal includes a frequency component and a power component. In some aspects, the one or more values determined based on the first input signal include a pitch value determined based on the frequency component and a velocity value determined based on the power component. In other aspects, the one or more values includes a shape value and a color value determined based on the frequency component and an angle value determined based on the power component. In still other aspects, the one or more values include a pulse speed value based on the frequency component and a pulse pressure value based on the power component.

According to one or more aspects, the method further comprises receiving, from the input system, a set of input signals over a time period representing varying tactile content experienced by the first user in the form of temperature, pulse pressure, speed, and rhythm values that can be sent to the system from a "smart" tactile delivery system. The tactile delivery system can output the parameters as it is in operation. Various settings tried by the user can be used to dynamically create a vocabulary. These scenarios can be extended such that settings of the "smart" delivery devices discussed above can be correlated with biometric data gathered as the user is experiencing these sensations, and preferred settings can be chosen that illicit the target responses as indicated by user feedback and B/N data.

According to one or more aspects, the common vocabulary is populated with values determined based on different types of sensory experiences, the first input signal being associated with a first sensory experience, and the output array being associated with a second sensory experience that is different from the first sensory experience.

Another exemplary embodiment provides a system comprising a first bio-generated data sensing device worn by a first user and configured to detect a first electrical signal representing biometric and/or neurometric data of the first user; a sensory input system configured to provide a first input signal representing sensory content experienced by the user in association with detection of the first electrical signal; a memory configured to store a parameter file and a common vocabulary; one or more processors configured to: receive the first input signal from the sensory input system, populate the common vocabulary with one or more values determined based on the first input signal, determine a first set of output values based on the detected signal, the common vocabulary, and the parameter file, and generate a first output array comprising the first set of output values; and an output delivery system configured to render the first output array as a first sensory output, wherein the common vocabulary comprises a list of possible output values, and the parameter file comprises a set of instructions for applying the common vocabulary to the first electrical signal to derive the first set of output values.

According to some aspects, the bio-generated data sensing device is a headset configured to collect electroencephalography ("EEG") signals of the first user. According to other aspects, the bio-generated data sensing device is a monitor configured to collect heart rate intensity or heart date variability data of the user.

According to some aspects, the first sensory output is a tactile output comprising vibrations and/or temperature-related sensations (e.g., heat) determined based on the first output array, and the output delivery system comprises one or more vibration output devices configured to generate the vibrations and/or temperature output devices configured to generate the temperature-related sensations. In some aspects, the one or more vibration output devices are configured to generate vibrations with a specified temperature setting or level selected based on the first output array. According to other aspects, the first sensory output is an aroma output having a scent determined based on the first output array, and the output delivery system comprises one or more scent output devices for generating the scent. According to still other aspects, the first sensory output is a consumable item having a flavor determined based on the first output array, and the output delivery system includes one or more flavor output devices for generating the flavor.

According to some aspects, the sensory input system comprises a tactile input source, and the sensory content is vibratory content applied to the user, the first input signal including first data identifying a pressure level of the vibratory content and second data identifying a pulse rate of the vibratory content. According to some aspects, the sensory input system comprises a tactile input source, and the sensory content is temperature and/or vibratory content applied to the user, the first input signal including first data identifying a pressure level of the vibratory content and second data identifying a temperature level of the vibratory content. According to other aspects, the sensory input system comprises a material analysis device, and the sensory content is a source material consumed by the user, the first input signal comprising data identifying one or more components of the source material.

In some aspects, the input system comprises a gas-chromatography device to identify chemicals producing a given scent or taste, representing a smell and/or taste component of the user provided content.

According to one or more aspects, the output delivery system comprises a tactile engine configured to generate a tactile output signal based on the output array and provide said signal to a tactile sensation delivery device. In some aspects, the first set of output values corresponds to a plurality of tactile variables for rendering a tactile output, the tactile variables comprising temperature, pressure, speed, and rhythm.

According to one or more aspects, the system further comprises a second bio-generated data sensing device worn by the user and configured to detect a second electrical signal representing biometric and/or neurometric data of the user, wherein the one or more processors are further configured to: determine a second set of output values based on the second electrical signal, the common vocabulary, and the parameter file, wherein the parameter file further comprises a set of instructions for applying the common vocabulary to the second electrical signal; and generate a second output array comprising the second set of output values, and wherein the output delivery system is further configured to render the second output array as a second sensory output.

According to one or more aspects, the system further comprises an audio/visual input system configured to provide a second input signal representing audio content produced by the user during detection of the first electrical signal; and a spectral analyzer configured to identify one or more aspects of the second input signal, wherein the one or more processors are further configured to: populate the common vocabulary based further on the identified aspects of the second input signal; determine a third set of output values based on the first electrical signal, the common vocabulary, and the parameter file; generate a third output array comprising the third set of output values; and provide the third output array to the output delivery system, wherein the output delivery system is further configured to render the third output array as an audio output. According to further aspects, the third set of output values comprises Musical Instrument Digital Interface ("MIDI") data.

According to one or more aspects, the common vocabulary comprises a tactile vocabulary for selecting different tactile characteristics based on various aspects of the detected signal. Elements of the tactile vocabulary may be temperature, pressure, pulse speed, or pulse rhythm.

According to one or more aspects, the common vocabulary comprises a smell/taste vocabulary for selecting different smell or taste characteristics based on various aspects of the detected signal. Elements of the smell/taste vocabulary could be either subjective terms such as "bitter," "sweet," "salty," or "lavender," classes of elements or compounds such as "ketones," names for elements or compounds such as "iodine," names for foods such as "ginger," or aromatic substance names such as "violet."

Another exemplary embodiment includes a system, comprising a first bio-generated data sensing device worn by a first user and configured to detect a first electrical signal representing biometric and/or neurometric data of the first user; a second bio-generated data sensing device worn by a second user and configured to detect a second electrical signal representing biometric and/or neurometric data of the second user; a memory configured to store a parameter file and a common vocabulary; one or more processors configured to: determine a set of output values based on the first electrical signal, the second electrical signal, the common vocabulary, and the parameter file, and generate an output array comprising the set of output values; and an output delivery system configured to render the first output array as a first sensory output for the first user and a second sensory output for the second user, wherein the common vocabulary comprises a list of possible output values, and the parameter file comprises a set of instructions for applying the common vocabulary to each of the first electrical signal and the second electrical signal to derive the set of output values.

According to one or more aspects, the system further comprises a sensory input system configured to provide: a first input signal representing sensory content experienced by the first user in association with detection of the first electrical signal, and a second input signal representing sensory content experienced by the second user in association with detection of the second electrical signal, wherein the one or more processors are further configured to: receive the first and second input signals from the sensory input system, and populate the common vocabulary with one or more values determined based on the first input signal and the second input signal.

According to one or more aspects, each of the first bio-generated data sensing device and the second bio-generated data sensing device is a headset configured to collect electroencephalography ("EEG") signals or the is a monitor configured to collect heart rate intensity or heart date variability data.

While certain features and embodiments are referenced above, these and other features and embodiments of the invention will be, or will become, apparent to one having ordinary skill in the art upon examination of the following figures and detailed description. It is intended that all such additional embodiments and features included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 15 depicts a table describing exemplary parameters in a parameter file that may be used to generate audio and/or video outputs, in accordance with embodiments.

FIGS. 16A, 16B, and 16C depict a table describing exemplary parameters that may be used by a processing plug-in to generate audio and/or video outputs, in accordance with embodiments.

FIGS. 17A and 17B depict a table describing example uses of a creative circuit system, in accordance with embodiments FIG. 18 depicts the contents of an exemplary parameter file, in accordance with embodiments

FIG. 24 depicts a table describing exemplary parameters in a parameter file that may be used to generate tactile, flavor, or scent outputs, in accordance with embodiments.

FIG. 25 depicts a table describing exemplary parameters that may be used by a processing plug-in to generate tactile outputs, in accordance with embodiments.

FIG. 26 depicts a table describing exemplary parameters that may be used by a processing plug-in to generate flavor or scent outputs, in accordance with embodiments.

FIG. 27 depicts a table describing example uses of a creative circuit system, in accordance with embodiments.

FIG. 28 depicts a table describing example aspects of different sensory vocabulary components and their creation, in accordance with embodiments.

DETAILED DESCRIPTION

Figure 1:
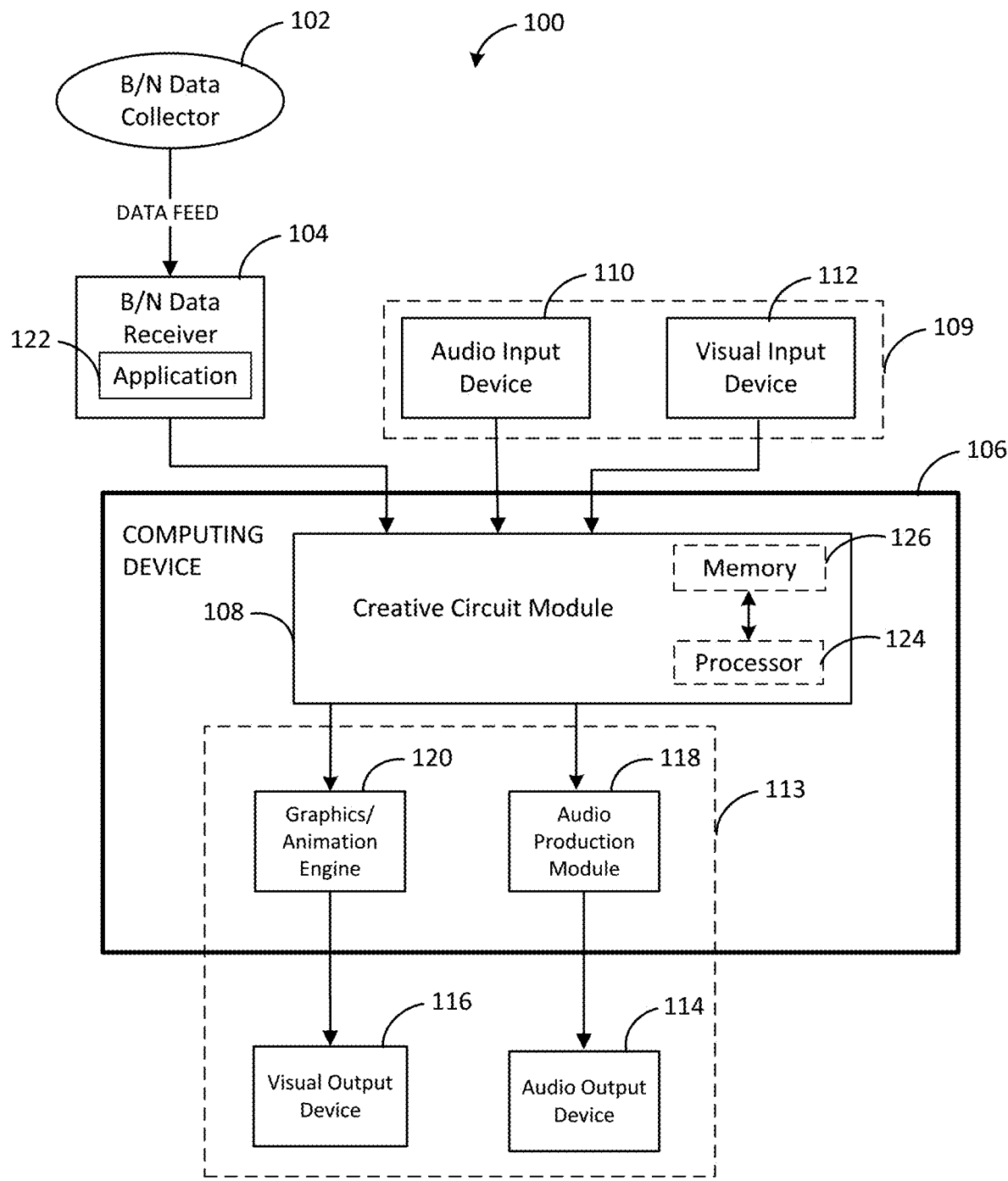
FIG. 1 is a block diagram depicting an exemplary creative circuit system for capturing bio/neurometric data and producing a coherent output based thereon, in accordance with embodiments.

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

Embodiments described herein include a system that allows biometric/neurometric data (also referred to herein as "bio/neurometric data") to be transformed into audio and visual artistic and/or therapeutic works, and/or other sensory experiences, such as tactile experiences, flavor experiences, scent experiences, or any combination thereof, including a capability to adjust to brain responses in real-time, thus producing an audio, visual, tactile, scent, flavor, and/or other sensory output that becomes more and more impactful, as the user (or users) learn what brain waves produce their favorite results and control the output consciously or unconsciously, for example. This interaction between the system and the user can be described as creating a circuit, hence the name Creative Circuit. The system may be part of a suite of tools introduced under the name Theta-u, hence the name Theta-u Creative Circuit System (TCCS).

The advances described above also lay the groundwork for merging different biometric data sources, and networking multiple devices to create a new generation of bio/neurometric data uses where the data of multiple individuals can be processed in real-time and output in the form of sound, images, or other sensory output modes. In order to allow these new network-enabled capabilities to produce a coherent, useful result, a common structure underlying the multiple streams of data is provided. For example, multiple individuals can wear EEG headsets, and the data coming from these headsets can be processed in a manner that produces sound which varies in pitch or amplitude according to the brain waves, as described for instance in U.S. Pat. No. 10,369,323, and/or visual stimuli with the generated images varying according to the fluctuations in EEG data. But if such a configuration was created and the resulting audio or video stream played or displayed, it is likely that the result would be chaotic and with limited usefulness, since the likelihood that these multiple streams would produce a coherent audio or visual result is quite low. For our purposes, we describe audio or visual stimuli as "coherent" when it conforms at least loosely to one of the concepts we use to process sound and images in a given culture, either as music or language in the case of audio, or as an image, or with geometric consistency or symbolic association in the case of images. Even within one stream, the result in our example would not have a structure which we would find coherent in this sense, since it would conform to none of the rules we have formed for music or language or meaningful visual images for our particular culture.

The system described here provides that underlying structure that will make streams of output data both internally coherent and coherent with one another, through the mapping of the bio/neurometric data to a tactile, flavor, scent, sonic, and/or visual "vocabulary." The term vocabulary is usually used in connection with simply words or phrases, but can also be used in an artistic sense, as in a musical vocabulary. For instance, when jazz musicians improvise against a song, they are often following a set of rules which dictate what chords and tones are meant to be stressed at each point in the song. Simplified, a song might be in the key of D, and in that case the pitch "vocabulary" of the song centers around the tones of the D major scale: D, E F#, G, A B C#. Similarly, the system described herein maps bio/neurometric data to a sonic vocabulary which is expressed as a collection of musical pitches (or a set of possible values for the pitch variable), as well as via harmonic and rhythmic element, as well as a visual vocabulary which is expressed as a collection of shapes, colors and angle (or a set of possible values for each of these variables). The concept can be applied as well to tactile sensory experiences, where the vocabulary can be expressed as, for instance, a collection of vibrational pressure levels, delivery rates, and temperature settings, or a flavor/scent sensory experience, where the vocabulary can be expressed, for instance, as a collection of flavor categories (e.g., "bitter", "salty," etc.) or as a collection of elements or compounds that have particular scents or flavors. Using this system, multiple individuals could wear the EEG headsets as described above, and produce a musically coherent merged result. Also, a single individual could process different data streams, each emanating from just one person, and produce a coherent result. The system also provides a mechanism for mapping bio/neurometric data to a visual or image vocabulary which is expressed as a collection of visual symbols, shapes, dimensions, angles, or other geometric constructs. Using this system, multiple individuals could wear the EEG headsets as described above, and produce a musically and visually coherent merged result. Also, a single individual could process different data streams, each emanating from just one person, and produce a musically and visually coherent result. In the same manner, the system provides a mechanism for mapping bio/neurometric data to a tactile or flavor/scent vocabulary.

Regarding creation of audio textures, the human ear can hear frequencies in the approximate range of 20 hertz (Hz) to 18 kilohertz (kHz). We start with the principle that given an x and y axis, with x being time, all time series data can be made into frequency data in this range by performing a function on the y axis values that transforms the data into this range. For instance, an EEG system might record frequency at an electrode site of 3 Hz (e.g., determined by Fast Fourier Transform (FFT) from raw EEG). By applying a scale factor, this rate can be transformed into a range within human hearing range, for instance, by multiplying by 100 to get a 300 Hz value. Any y-axis data can be used, not just EEG frequency. For example, suppose we are plotting raw EEG time series data, where the y-axis is power in microvolts (µV) of a signal at a given electrode site on the scalp. If the average values are in the range 0.3 µV to 1.5 µV, again we can apply a scale factor to bring these numbers into, for example, the range 51-880 hertz (Hz), or the frequency range A1 to A5 on a piano keyboard, and use the resulting values as frequency data to drive a piece of music. The values could even be outside of the realm of bio/neurometric data, such as, for example, data plotting stock prices or foreign exchange rates of currency pairs. Any time series data can be transformed by a scaling function and used as frequency data. Similarly, for production of visual textures, a data point in a time series can be interpreted as a visually accessible data value, such as, a point on a line, or a color or a rotation.

By applying these principles for audio and visual transformations, bio/neurometric time series data can be translated into for instance a creative animation that is synchronized with the audio component with the same data source driving the creation. Once an individual or groups' brain activity is rendered as auditory or visual stimuli in this manner, it can influence both the person/people producing the output and others, creating feedback loops as an individual responds to his own rendered brain output which changes his thought process which in turn changes the output. This is what we refer to as a Creative Circuit. The system described herein implements this concept through software-based processing of signals from one or more bio/neurometric data capture devices combined with audio and/or visual input, and linking these input streams via a common "vocabulary" creating output signals that can be rendered as audio or video textures that form a coherent whole when played or viewed together. The examples provided herein should be taken only as examples to illustrate how the system allows for any type of sensory vocabulary (e.g., audio, visual, tactile, flavor, and/or scent) included as an input source to be mapped to the same or a different sensory vocabulary on the output side through a transformation supported by the software architecture.

The generality of the system, allowing it to process multiple different forms of bio/neurometric data, comes from two main architectural features: the provision for use of custom parameters which can represent any domain value or type of data desired, for instance, heart rate in the case of HRV data and microvolts (µV) in the case of EEG power, combined with use of a "plug-in" architecture that allows custom functions to be written to handle this arbitrary bio/neurometric data. The examples given in this document illustrating, for instance, a function to calculate pitch from EEG power, should not be taken to be any more than examples, to show possible embodiments of the invention.

According to embodiments, the vocabulary described herein may be stored in a vocabulary database that is either pre-populated (i.e. static) with a common vocabulary, or dynamically populated with a real-time vocabulary based on an analysis of incoming data, audio and/or visual (e.g., from a live performance). In the case of static vocabulary, the vocabulary datastore information may be stored or held in the parameter file and may be represented by arrays of notes, for example, or a list of possible output values for each variable represented in the vocabulary. In the case of real-time vocabulary, the vocabulary datastore information may be stored or held in a separate file capable of being dynamically populated or updated, such as, for example, a JSON file containing JSON arrays, with each JSON object representing a note. Which vocabulary datastore implementation is chosen can be based on system requirements, such as, e.g., performance and ease of access. In some embodiments, the vocabulary datastore may be implemented as a database, such as, e.g., relational, document-oriented, or other suitable database types.

FIG. 1 depicts an exemplary creative circuit system 100 configured to capture bio/neurometric data from a user and produce a coherent audio and/or visual output based thereon, in accordance with embodiments. As shown, the creative circuit system 100 (also referred to herein as "Theta-u creative circuit system" or "TCCS") comprises at least one bio/neurometric (or B/N) data collector 102 and at least one bio/neurometric data receiver 104 communicatively coupled to the data collector 102 for receiving a data feed therefrom. The exact number of data collectors 102 and data receivers 104 may be depend on the number of users simultaneously using the creative circuit system 100 and/or a functional capacity of the system 100. The creative circuit system 100 further comprises a computing device 106 communicatively coupled to the B/N data receiver 104 for processing bio/neurometric data obtained from the (or each) data receiver 104 and generating an output based thereon. In some embodiments, the computing device 106 can be configured to simultaneously process multiple streams of data from multiple users, and produce a combined output based on all said streams.

The B/N data collector 102 (also referred to herein as a "bio-generated data sensing device") is configured to capture or detect electrical signals representing a biometric and/or neurometric response of a user (e.g., human) wearing the data collector 102, or otherwise connected thereto. The B/N data collector 102 can be implemented in hardware, software, or a combination thereof, and can include any type of device or system capable of capturing an input representing bio-generated data, or biometric and/or neurometric data, such as, for example, heart rate, galvanic skin response, brain wave/EEG activity, muscle movement, eye movement, blood pressure, breath measurements, or the like.

For example, in some embodiments, the B/N data collector 102 includes an electroencephalography (EEG) system, including electrodes configured for placement along the scalp of a wearer, for sensing and recording an electrical activity of the brain of the wearer. In some cases, the B/N data collector 102 may include one or more systems for collecting data related to heart activity, such as, e.g., a photoplethysmography (PPG) system, including a light source and a photodetector configured for placement at the surface of the wearer's skin, for measuring and monitoring a heart rate of the wearer, and/or a pulse oximetry system, including a probe configured for placement on a finger, ear lobe, or other suitable body part, for measuring an oxygen level in the blood of the wearer. In some instances, the PPG system may also be used to measure a breathing activity of the wearer. In some cases, the B/N data collector 102 may include one or more accelerometers for detecting muscle and other body movements of the wearer. In some cases, the B/N data collector 102 may include all of the above-listed biometric data collection systems and devices, or any other combination thereof. In one exemplary embodiment, the B/N data collector 102 is an EEG headset that captures EEG data and other biometric data of a user wearing the headset, such as, for example, the "Muse 2" headset manufactured by Interaxon Corporation.

The B/N data collector 102 is further configured to transmit the captured signals to the B/N data receiver 104 using a wired or wireless connection (e.g., Bluetooth, WiFi, and the like). In a preferred embodiment, the data collector 102 uses Bluetooth technology to send the data feed to the data receiver 104. The B/N data collector 102 may include a communications module configured to communicate with the B/N data receiver 104. For example, said communications module may include one or more transmitters, receivers, antennas, modems, and other circuitry for carrying out the communication features described herein.

The B/N data receiver 104 is configured to receive a data feed from the data collector 102 and provide the received data to the computing device 106. The B/N data receiver 104 (also referred to as a "receiver node") can be implemented in hardware, software, or a combination thereof, and can be any type of electronic device or system with an interface capable of communicating with the B/N data collector 102 and processing the received data. For example, the B/N data receiver 104 may be a mobile or portable device (e.g., smartphone, smartwatch or other connected wearable device, personal digital assistant (PDA), MP3 player, gaming device, tablet, laptop computer, etc.), or a non-portable or stationary electronic computing device (e.g., a desktop computer, a server computer, etc.). In a preferred embodiment, the B/N data receiver 104 is a smartphone operating on an Android platform from Google, Inc. In other embodiments, the data receiver 104 may be a smartphone operating on iOS from Apple Inc., Windows Phone from Microsoft Corporation, Symbian from Nokia Corporation, or other suitable platform or operating system.

In some embodiments, the B/N data receiver 104 is configured to store and/or execute a software application 122 for interfacing with the B/N data collector 102 and receiving bio/neurometric data therefrom. In some cases, this software application 122 is proprietary software provided by the makers of the particular B/N data collector 102 being used. In other cases, the software application 122 may be a readily-available, third-party application configured for use with an existing biometric data collection device, such as, e.g., the "Mind Monitor Application" designed for use with the Interaxon Muse headset, which is shown and described at the web site "mind-monitor.com", the contents of which are incorporated by reference herein. In still other embodiments, the software application 122 may be novel software developed for use with any type of B/N data collector 102 connected to the creative circuit system 100.

Though not shown in FIG. 1, the B/N data receiver 104 may include a memory configured to store the software application 122, a processor configured to execute the application 122, and a communications module configured to communicate with the B/N data collector 102 and the computing device 106, as well as other components for carrying out the operations described herein. The communications module, in particular, may include one or more transmitters, receivers, antennas, modems, and other circuitry for carrying out the communication features described herein.

The B/N data receiver 104 can be configured to transmit the bio/neurometric data received from the B/N data collector 102 to the computing device 106 using an appropriate communication protocol. In a preferred embodiment, the data receiver 104 transmits this data to the computing device 106 over a WiFi network using an Open Sound Control (OSC) protocol, which is shown and described at the website "opensoundcontrol.org/introduction-osc". the contents of which are incorporated by reference herein. Other types of wireless or wired communication protocols compatible with transmitting bio/neurometric data in real-time (or near real-time) may also be used, as will be appreciated.

Likewise, the computing device 106 can be communicatively coupled to the B/N data receiver 104 via a wired connection (e.g., USB, Ethernet, or other data cable) or a wireless connection (e.g., WiFi, Bluetooth, cellular, or other wireless technology). The computing device 106 may include a communications module (not shown) configured to communicate with the B/N data receiver 104. For example, said communications module may include one or more transmitters, receivers, antennas, modems, and other circuitry for carrying out the communication operations described herein.

According to embodiments, the computing device 106 comprises a creative circuit module 108 configured to process the received bio/neurometric data of the user and determine an output based thereon. The creative circuit module 108 may include one or more software applications and/or programming code comprising a set of instructions to be performed by one or more processors 124 of the computing device 106 in order to implement steps and/or elements for carrying out the techniques described herein.

The computing device 106 may be any type of electronic device capable of supporting the creative circuit module 108 or otherwise processing the bio/neurometric data received via the data receiver 104. For example, the computing device 106 may be a desktop computer, a server computer, a laptop computer, a tablet, or the like. In one embodiment, the computing device 106 is a Mac Pro computer from Apple, Inc. In other embodiments, the computing device 106 may be implemented as a distributed computing system comprising a plurality of computers or other computing devices in communication with each other over a network. In another embodiment, the computing device 106 and the B/N data receiver 104 may be integrated into one device configured to receive the bio/neurometric data directly from the B/N data collector 102, process the same, and generate an output based thereon.

In some embodiments, the computing device 106 is configured to operate as a network server that uses the creative circuit module 108 (also referred to as a "TCCS server application") to simultaneously process multiple streams of bio/neurometric data of various users. For example, the computing device/network server 106 may include an interface configured to communicate with multiple B/N data receivers 104 (or receiver nodes) at once, each data receiver 104 conveying bio/neurometric data received from a separate B/N data collector 102.

Figure 2:
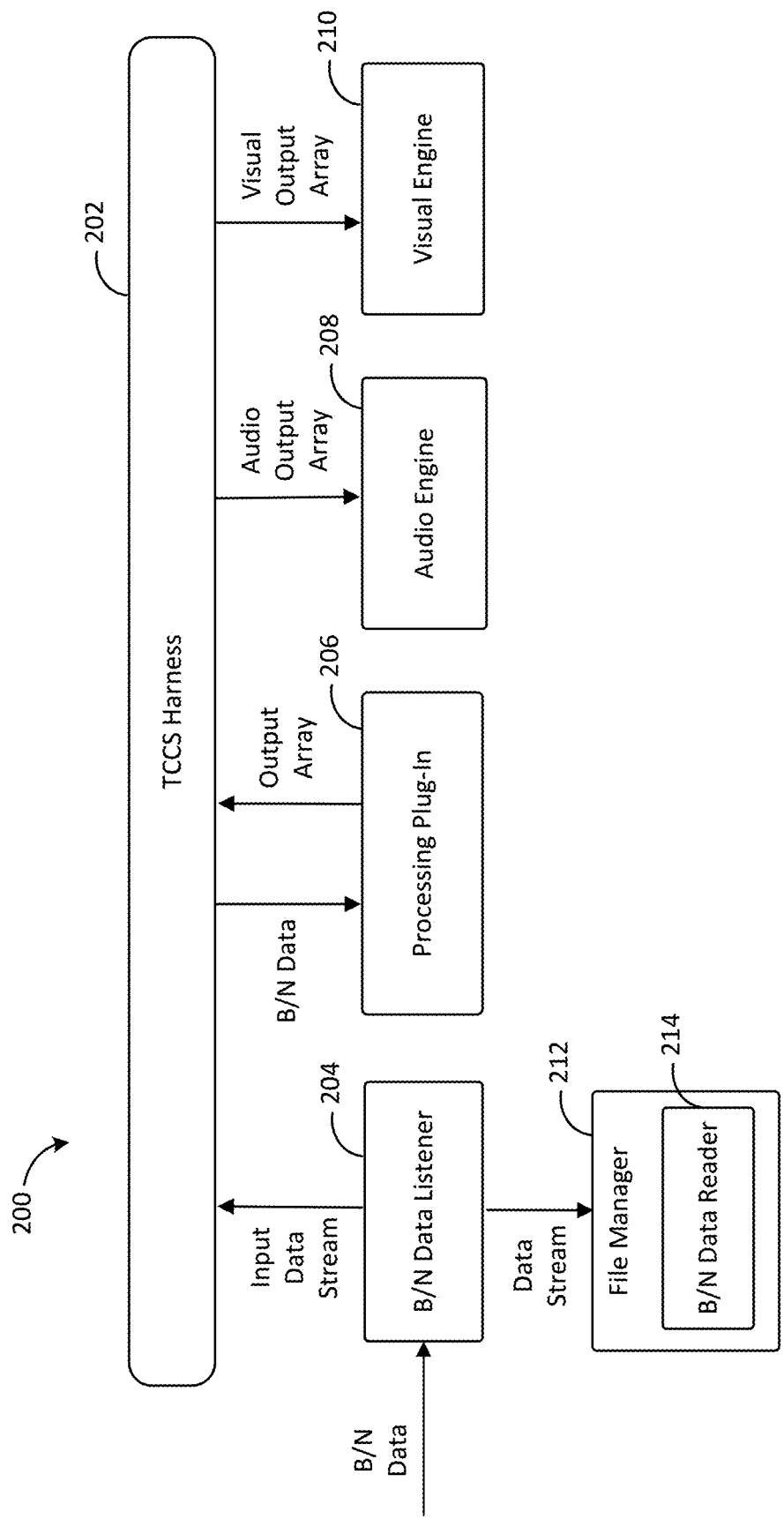
FIG. 2 is a block diagram depicting an exemplary creative circuit module configured for real-time processing of captured bio/neurometric data and producing a coherent output based thereon, in accordance with embodiments.

According to embodiments, the creative circuit module 108 may include logic for receiving the incoming bio/neurometric data and may use one or more algorithms (for example, as specified by processing plug-in 206 shown in FIG. 2), in conjunction with a parameter file and a vocabulary datastore, to process the incoming data. The vocabulary datastore can be shared by multiple threads or streams of incoming data to produce an output, which can then be rendered as audio and/or video. In some cases, the creative circuit module 108 may also include an aggregation component (e.g., within TCCS harness 202 shown in FIG. 2) for processing and/or combining multiple data streams before producing the output.

In some embodiments, the creative circuit module 108 also receives audio and/or visual inputs (also referred to herein as "user-provided content") from an audio/visual input system 109 included in the system 100 and is configured to incorporate those inputs into its output. For example, as shown in FIG. 1, the input system 109 may comprise an audio input device 110, such as, e.g., a microphone or other audio device for capture audio data or signals generated by, or otherwise associated with, the user. As also shown, the input system 109 may also comprise a visual or video input device 112, such as, e.g., a camera, video recorder, webcam, or other video device for capturing images, video, or other visual data generated by or associated with the user.

In such cases, the creative circuit module 108 may be configured to apply algorithms, as described herein, to map the received bio/neurometric data to the received audio and visual representations using a vocabulary datastore and parameter file, send resulting instructions to an audio/visual output delivery system 113, and modify metadata to change the processing behavior of these algorithms in real-time based on the incoming data. In some cases, the audio/visual inputs may represent live data being recorded by the input system 109 and streamed to the creative circuit module 108 in real-time (or near real-time), such as, e.g., a live vocal (e.g., singing, spoken word, etc.) and/or musical performance being produced by the user, or being produced by another individual and experienced by the user. In other cases, the audio/visual inputs may represent previously-recorded data that was captured by the same devices, or data stored in a memory of the input system 109 and/or the computing device 106, such as, e.g., playback of an audio track or video file.

In some embodiments, the input system 109 comprises a plurality of audio input devices 110 and/or a plurality of visual input devices 112 and is configured to record and/or stream live audio and/or video from multiple sources (or users). In such cases, the multiple data streams may be sent to the aggregation component of the creative circuit module 108 before being processed further.

In some cases, the audio input device 110 and the visual input device 112 may be combined into a single device, such as, e.g., a video camera or the like. In other cases, each of the audio input device 110 and the visual input device 112 may operate independently and therefore, may have a separate connection to the computing device 106, as shown. Either way, each of the audio input device 110 and the visual input device 112 may be communicatively coupled to the computing device 106 using a wired (e.g., USB, etc.) or wireless (e.g., Bluetooth, WiFi, cellular, etc.) connection.

In other embodiments, one or more of the audio input device 110 and visual input device 112 may be included in the B/N data receiver 104 or communicatively coupled thereto. In such cases, the B/N data receiver 104 may transmit the bio/neurometric data feed to the computing device 106 along with the audio/visual data feed using one or more appropriate communication protocols, and the creative circuit module 108 may be configured to receive and process both types of data. In still other embodiments, one or more of the audio input device 110 and the visual input device 112 may be included in the computing device 106, for example, as a native microphone and/or camera system.

The audio/visual output delivery system 113 can be configured to receive signals from the creative circuit module 108 or other components of the computing device/network server 106, and render audio and/or visual outputs in accordance with those signals. The output delivery system 113 may include at least one of an audio output device 114 for playing an audio output (e.g., music, voice, etc.) and a visual output device 116 for displaying a visual output (e.g., images, videos, etc.). Delivery via these devices 114 and 116 may be the last step in providing an audio and/or visual output according to the signals sent to the output system 113 by the creative circuit module 108.

In embodiments, one or more components of the output delivery system 113 may be included within the computing device 106, or may be communicatively coupled thereto, as shown in FIG. 1. For example, in some embodiments, the visual output device 116 may be an external monitor communicatively coupled to the computing device 106 (e.g., via an HDMI cable or the like). In other embodiments, the visual output device 116 may be a native display screen of the computing device 106, or otherwise integral thereto. Likewise, in some embodiments, the audio output device 114 may be an external speaker system or personal listening device communicatively coupled to the computing device 106 (e.g., via an audio cable or a wireless connection, such as Bluetooth). In other embodiments, the audio output device 114 may be native or internal speakers of the computing device 106, or otherwise integral thereto.

As also shown in FIG. 1, the output delivery system 113 further comprises one or more processing components for generating the audio and/or visual output according to the instructions supplied by the creative circuit module 108. In particular, an audio production module 118 may be configured to generate an audio output and provide it to the audio output device 114 in order to play the audio output for the user. Likewise, a graphics/animation engine 120 may be configured to generate a visual output and provide it to the visual output device 116 in order to display the visual output for the user. These components may be implemented in hardware, software, or a combination thereof. In some embodiments, the audio production module 118 and/or the graphics/animation engine 120 may be integrated into, or form one of the components of, the creative circuit module 108, such as, e.g., audio/visual engine 619 shown in FIG. 6.

In some embodiments, the creative circuit module 108 is configured to generate corresponding Musical Instrument Digital Interface ("MDI") data based on the received B/N data feed and send instructions to the audio production module 118 in MIDI format. The audio production module 118 is configured to process the incoming MIDI data and generate an appropriate audio output signal based thereon. And the resulting audio output signal is played back to the user via the audio output device 114. In one embodiment, the audio production module 118 may be implemented using a digital audio workstation, such as, e.g., Logic Pro by Apple Inc., or other compatible software program for recording, editing, and/or producing audio files, including MIDI files.

As an example, the MIDI format instructions generated by the creative circuit module 108 may specify parameter values for channel (e.g., 0 to 15), pitch (e.g., 0 to 127), and velocity (e.g., 0 to 127), and may indicate control of a note length by sending "note_on" and "note off" instructions, or the like. For example, the note may begin playing once the NoteOn message is received and may continue to play until the NoteOff message is received, thus setting the length of the note. The velocity value may be indicated as a separate variable sent with the NoteOn message (e.g., velocity=90). Tempo may also be set by a separate temp variable to include the speed of a quarter note, as will be appreciated. In some embodiments, the channel parameter allows a processing plug-in of the creative circuit module 108 to instruct the audio production module 118 to play different tones on different software instruments. For example, channel 1 may be assigned to a saxophone, channel 2 to a piano, channel 3 to a drum, etc. As a result, in embodiments that include a plurality of B/N data collectors 102, each data collector 102 can be mapped to a different channel, such that the B/N data of each user can be represented by a different instrument or sound in the audio output produced by the system 100.

The creative circuit module 108 may also generate visual output data and use the Open Sound Control ("OSC") protocol, or other communication protocol, to send the visual output data to the graphics/animation engine 120. This engine 120, in turn, may be configured to convert the OSC to a visual representation. For example, the graphics/animation engine 120 may be configured to use a library designed to handle OSC data to receive the visual output data provided by the creative circuit module 108 and provide custom logic to render this data as moving geometric designs. One example of such a library is shown and described in the website found at "thomasfredericks.github.io/UnityOSC/", the contents of which are incorporated by reference herein. In some embodiments, each receiver node/data receiver 104 may establish a connection to the network server/computing device 106 using User Datagram Protocol ("UDP") or other appropriate communications protocol, and may send the bio/neurometric data to the network server 106 using the OSC protocol. In one embodiment, the graphics/animation engine 120 is a Unity engine comprising software written in C# programming language.

As shown in FIG. 1, the computing device 106 comprises one or more processors 124 and memory 126. In some embodiments, the one or more processors 124 and memory 126 may be dedicated to carrying out operations associated with the creative circuit module 108, as illustrated. In other embodiments, the processor(s) 124 and memory 126 may be part of the larger computing device 106, and memory 126 may be configured to store the creative circuit module 108, or the software used to implement said module 108, along with other software.

The one or more processors 124 can be a hardware device for executing software, particularly software stored in the memory 126. For example, during operation of the creative circuit module 108, the processor(s) 124 may be configured to retrieve software instructions stored in memory 126 for implementing the creative circuit module 108, and execute the same to carry out desired operations. The processor(s) 124 can be any custom made or commercially available processor, such as, for example, a Core series or vPro processor made by Intel Corporation, or a Phenom, Athlon or Sempron processor made by Advanced Micro Devices, Inc. In the case where computing device 106 is a server, the processor(s) 124 may be, for example, a Xeon or Itanium processor from Intel, or an Opteron-series processor from Advanced Micro Devices, Inc. The one or more processors 124 may also represent multiple parallel or distributed processors working in unison.

Memory 126 can include any one or a combination of volatile memory elements (e.g., random access memory (RAM, such as DRAM, SRAM, SDRAM, etc.)) and non-volatile memory elements (e.g., ROM, hard drive, flash drive, CDROM, etc.). It may incorporate electronic, magnetic, optical, and/or other types of storage media. Memory 126 can have a distributed architecture where various components are situated remote from one another, but are still accessed by processor(s) 124. These other components may reside on devices located elsewhere on a network or in a cloud arrangement.

Software stored in memory 126 may include one or more separate programs. The separate programs comprise ordered listings of executable instructions for implementing logical functions. In embodiments, memory 126 may be configured to store software instructions for implementing the creative circuit module 108. Such software may be written in any suitable computer programming language, such as, e.g., C, C++, C#, Pascal, Basic, Fortran, Cobol, Perl, Java, Ada, Python, and Lua, or a proprietary language developed to interact with these known languages. In a preferred embodiment, the creative circuit module 108 comprises one or more software applications written in Python.

Figure 3:
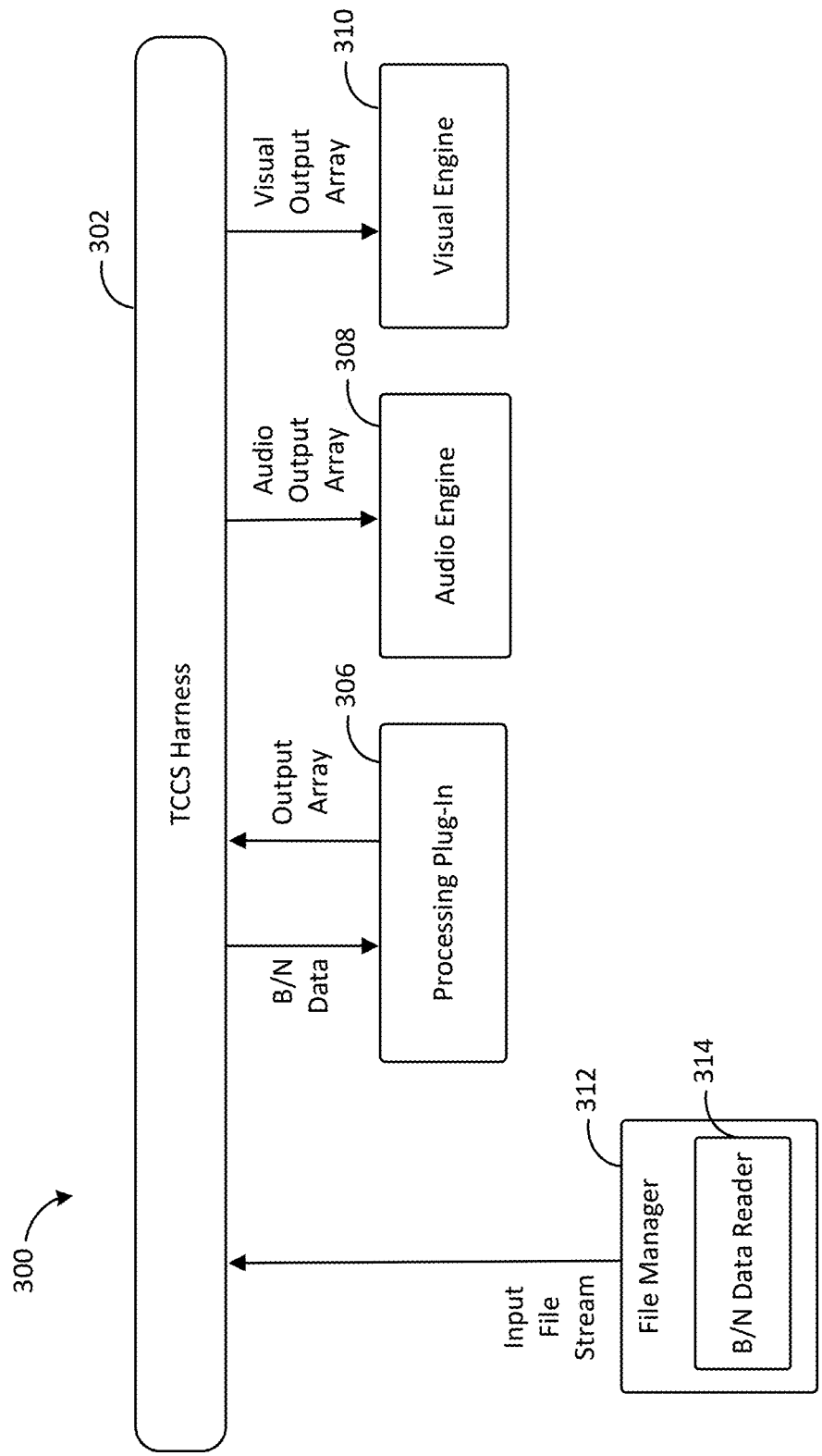
FIG. 3 is a block diagram depicting an exemplary creative circuit module configured for "playback" processing of previously-recorded bio/neurometric data and producing a coherent output based thereon, in accordance with embodiments.

Various components of the system 100 shown in FIG. 1 may be implemented using software executable by one or more servers, computers, or other computing devices using a processor and a memory included therein, such as, e.g., the processor(s) 124 and memory 126 shown in FIG. 1. In addition, some aspects of the invention described herein may be implemented through interactions between the various components of the system 100, the interactions also being facilitated by software executing on one or more computer processors associated with said components. As an example, FIGS. 2 and 3 illustrate exemplary software components that may be used to implement some of these interactions with the creative circuit module 108 of the system 100. Other software components may also be used, as will be appreciated.

FIG. 2 illustrates an exemplary creative circuit module 200 comprising various software components for implementing real-time processing of incoming bio/neurometric data and live user-provided content, in the form of audio and/or video data, production of a coherent output based thereon, and recording of the received data for playback at a later time, in accordance with embodiments. The creative circuit module 200 may be representative of the creative circuit module 108 shown in FIG. 1. As shown, the creative circuit module 200 (also referred to as a "TCCS module") comprises a processing harness 202, a bio/neurometric data listener 204, a processing plug-in 206, an audio engine 208, a visual engine 210, and a file manager 212. The creative circuit module 200 may also include other components not shown in FIG. 2, such as, e.g., an aggregation component.

In embodiments, the processing harness 202 (also referred to as a "TCCS harness") may be a software component configured to coordinate the activities of the other underlying components of the module 200. In particular, the processing harness 202 may be configured to initialize the creative circuit module 200 based on pre-defined parameters (also referred to as "TCCS parameters") stored in a parameter file, start an input data stream (e.g., by instructing the bio/neurometric data listener 204 to start receiving bio/neurometric (B/N) data from a user and/or sending received data to the harness 202), dispatch or send the received bio/neurometric data to the processing plug-in 206, receive an output array (also referred to as "OutputArray") generated based on the received data from the processing plug-in 206, and send the output array to the audio engine 208 and the visual engine 210 for output generation.

The B/N data listener 204 is configured to receive bio/neurometric data from source equipment worn by a user, such as, e.g., the B/N data collector 102 shown in FIG. 1 and described herein, or other B/N data collection device. As shown, the B/N data listener 204 is further configured to send the received data to the processing harness 202 as an input data stream, in order to make the data available for real-time processing. The B/N data listener 204 also sends the received data to the file manager 212 in order to write the data to a file for future analysis and processing.

The processing plug-in 206 is configured to receive bio/neurometric data from the processing harness 202, analyze each incoming data sample, create appropriate output data values based on the analysis of the input data and an application of the parameters stored in the parameter file, and produce an output array comprising values configured to describe the output to be rendered.

The audio engine 208 is configured to receive the output array, or more specifically, an audio output array comprising values configured to describe the audio output to be rendered, from the processing harness 202, and render an appropriate audio output based thereon. The audio output array may include MIDI values selected based on the received B/N data, as described herein. In some embodiments, the audio engine 208 includes a preconfigured multi-track setup that receives the MIDI instructions and converts them into sound in accordance with the instrumentation choices included in the MIDI file. In some embodiments, the audio engine 208 may be the audio production module 118 shown in FIG. 1 and may be in communication with the audio output device 114 for delivery of the audio output to the user. In other embodiments, the audio engine 208 may be configured to communicate the audio output array to the audio production module 118, which in turn renders the audio output via the audio output device 114.

Likewise, the video engine 210 is configured to receive the output array, or more specifically, a visual output array comprising values configured to describe the visual output to be rendered, from the processing harness 202, and render an appropriate visual output based thereon. In some embodiments, the video output may be a preconfigured scene that is driven by data values included in the video output array. For example, the video output array may include data driving parameters, such as, e.g., line length, color, animation speed, object size, and field of view, for changing an appearance of the preconfigured scene based on the received B/N data.

The file manager 212 can be configured to implement file reading and writing services to enable data to be recorded. Said data may be retrieved later, for example, during operation in a playback mode, as shown in FIG. 3. As shown, the file manager 212 may comprise a bio/neurometric data reader 214 (also referred to herein as "data recorder") for capturing and recording the real-time data stream received from the bio/neurometric data listener 204. In some embodiments, the data recorder 214 is also configured to record user-provided content received via, for example, the audio input device 110 and/or visual input device 112 shown in FIG. 1.

FIG. 3 illustrates an exemplary creative circuit module 300 comprising various software components for implementing "playback" processing of previously-recorded bio/neurometric data and user-provided content, in the form of audio and/or video data, and production of a coherent output based thereon, in accordance with embodiments. The creative circuit module 300 may be representative of the creative circuit module 108 shown in FIG. 1 and may be substantially similar to the creative circuit module 200 shown in FIG. 2, except for the absence of a bio/neurometric data listener. In some embodiments, the creative circuit module 200 may be configured to operate like the creative circuit module 300 shown in FIG. 3 during a playback processing and only operate as shown in FIG. 2 during real-time processing.

As shown in FIG. 3, the creative circuit module 300 comprises a processing harness 302 configured to coordinate the activities of underlying components, similar to the harness 202. In particular, the processing harness 302 may be configured to initialize the creative circuit module 300 based on pre-configured TCCS parameters, open an input file stream (e.g., by requesting the file from file manager 312), dispatch or send bio/neurometric (B/N) data samples to processing plug-in 306, receive an output array from the same, and send the output array to audio engine 308 and visual engine 310.

The file manager 312 can be configured to send a requested file containing pre-corded B/N data to the processing harness 302. The file manager 312 may include a bio/neurometric data reader 314 configured to implement read access to previously recorded B/N data files. In some embodiments, the file manager 312 may have acquired the B/N data files by recording live input data streams, like the file manager 212 shown in FIG. 2.

The processing plug-in 306 included in the creative circuit module 300 can be configured to receive B/N data from the processing harness 302 and create output data values based on an analysis of the input data and an application of the parameters in the TCCS parameter file and appropriate vocabulary from the vocabulary datastore, like the processing plug-in 206 shown in FIG. 2. The output values can be provided to the processing harness 302 as an output array describing the audio and/or visual output to be rendered.

The audio engine 308 of the creative circuit module 300 receives the output array from the processing harness 302, or an audio output array portion thereof, and renders an audio output based thereon, similar to the audio engine 208. The audio output array can include MIDI values or instructions that are plugged into a preconfigured multitrack setup included in the audio engine 308. This setup renders sound according to the instrumentation choices in the received MIDI file.

Likewise, the visual engine 310 is configured to receive the output array from the processing harness 302, or more specifically a visual output array portion thereof, and render a visual output based thereon, similar to the video engine 210. The video engine 310 may include a preconfigured scene that can be driven by the received output data. For example, the visual output array may include data driving parameters such as, e.g., line length, color, animation speed, object size, and field of view.

Figure 4A:
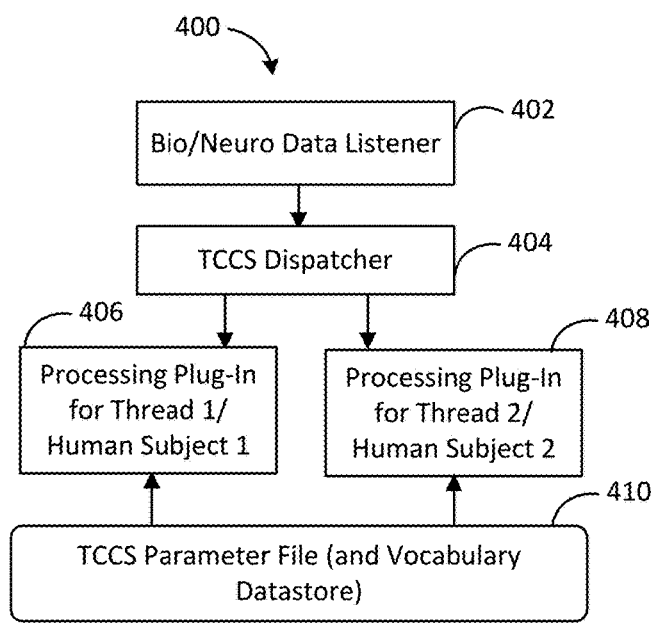
FIGS. 4A and 4B are flowcharts depicting exemplary operations for concurrently processing multiple threads of bio/neurometric data using a common, pre-defined vocabulary and parameter file and producing coherent musical outputs based thereon, in accordance with embodiments.

FIG. 4A illustrates an exemplary process 400 for concurrently processing multiple threads or streams of bio/neurometric data using a common predefined vocabulary and parameter file, in accordance with embodiments. The process 400 may be carried out using one or more components of a creative circuit module, such as, e.g., the module 200 shown in FIG. 2, or using any computing device having corresponding software stored on a computer readable medium and executable by one or more computer processors. While FIG. 4A specifically shows concurrent processing of data streams obtained from two separate human subjects, it should be appreciated that the incoming data of three or more human subjects may be concurrently processed using similar techniques.

As shown, the process 400 may begin with a bio/neurometric data listener 402, such as, e.g., the data listener 204 shown in FIG. 2, providing the incoming data streams or threads from individual human subjects to a TCCS dispatcher 404, such as, e.g., the TCCS harness 202 shown in FIG. 2. The data listener 402 may be configured to make multiple connections to multiple data collection devices (such as, e.g., B/N data collector 102 shown in FIG. 1), and hence multiple human subjects.

The TCCS dispatcher 404 assigns a respective one of a plurality of processing plug-ins 406 and 408 to each human subject and provides the corresponding thread to the identified processing plug-in ("PPI"). As shown, each plug-in 406, 408 also receives parameters from a TCCS parameter file 410, which may provide common pitch and/or rhythm data, or vocabulary, to be used for both threads. As shown, the process 400 enables concurrent processing of both data threads, thus producing simultaneous outputs that are musically coherent.

As shown, the TCCS system (e.g., creative circuit module 200/300) makes use of parameter files, consisting of name-value pairs, where the value could be a list or a primitive value. An exemplary parameter file 1800 is shown in FIG. 18, for the sake of illustration only. In some cases, a global parameter file is shared by the whole system and is configured to define a common vocabulary to be used by all. For example, FIG. 4A illustrates an embodiment in which the parameter file 410 comprises a vocabulary datastore from which the common vocabulary can be derived, and multiple threads are able to access the same parameter file 410, via processing plug-ins 406 and 408, to make use of the information contained in the file 410.

In some embodiments, each thread can also have its own private parameter file where different parameters are defined, such as, e.g., MIDI channel mappings and log file name. For example, data may be logged separately for each thread in its own log file for troubleshooting purposes, and different MIDI channels may be selected for each thread by including corresponding data values in each private parameter file. In FIG. 4A, for instance, the data for a first human subject (or a first thread) may be fed to a first MIDI channel, which is assigned to a first instrument (e.g., cello), and the data for a second human subject (or a second thread) may be fed to a second MIDI channel, which is assigned to a second instrument (e.g., piano). The processing plug-ins 406 and 408 for both threads can then use the common vocabulary datastore to create a coherent musical output from these threads, such as, for example, a piano-cello duet in the key of D. In such cases, each processing plug-in 406, 408 may provide a separate audio output to the audio engine, and the audio engine can be configured to produce the outputs as individual musical tracks which are played simultaneously to create a single, merged output (e.g., the piano-cello duet). In other embodiments, the data for both threads can be provided to the same MIDI channel, and thus, assigned to the same instrument, and the audio engine can be configured to merge the two audio streams into one audio track (e.g., a piano-piano duet).

Figure 4B:
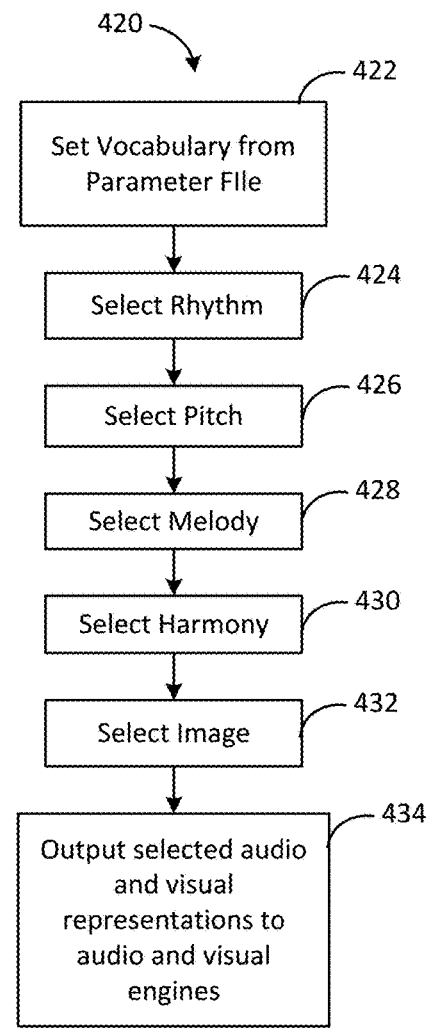

FIG. 4B illustrates an exemplary process 420 that may be used by one of the concurrently running processing plug-ins 406, 408 to process incoming data, in accordance with embodiments. Each processing plug-in may receive input data from a given human subject that includes bio/neurometric data, as well as user-provided content, in some cases (such as audio and/or video data). As shown, the process 420 may begin at step 422 with setting vocabulary from the global parameter file (e.g., TCCS parameter file 410), or retrieving the vocabulary terms (or variables) that will be used to render an output based on the incoming B/N data. In the illustrated embodiment, the vocabulary originates from a vocabulary datastore that is included in the parameter file, for example, as shown in FIG. 4A. In such cases, the parameter file may include a collection of variables or data fields representing the common vocabulary. For example, the parameter file may include an array of notes (or "preferredNotesArray"), arranged in name, value pairs, that represents the pitch vocabulary, thus defining the pitches that will be used in the PPI to select a note for incoming data, using the algorithms described herein.

Figure 10:
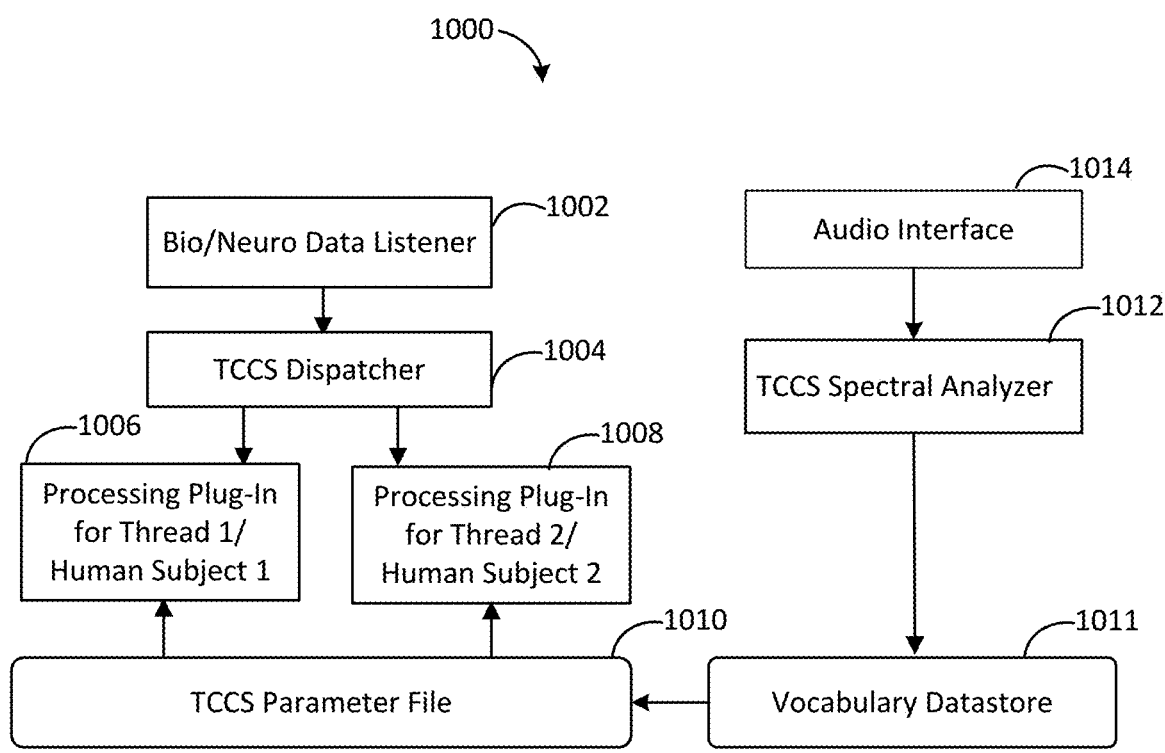
FIG. 10 is a flowchart depicting exemplary operations for concurrently processing multiple threads of bio/neurometric data using a common vocabulary derived from spectral analysis of live audio input, and simultaneously producing coherent video and audible outputs based thereon, in accordance with embodiments.

In embodiments, the vocabulary datastore may be implemented as a list, table, or database configured to store a plurality of variables and associated data fields for representing different vocabulary. As an example, in some embodiments, the vocabulary datastore may be a relational database, such as, e.g., MySQL, or document oriented, such as, e.g., Mongo. In some cases, the contents of the vocabulary database may be static, or pre-populated based on human/user input, in order to develop a common vocabulary for all data threads. In such cases, the vocabulary datastore may be included in the common parameter file, for example, as shown in FIG. 4A. In other cases, the contents of the vocabulary database may be dynamically populated in real-time based on spectral analysis of user-provided content, for example, as shown in FIG. 10. In such cases, the vocabulary datastore may exist separately from the parameter file, as also shown in FIG. 10. As an example, the vocabulary datastore may be stored in a file using JSON format or other format that allows vocabulary to be populated in real-time.

The vocabulary datastore may include pitch vocabulary and rhythm vocabulary, in some embodiments. The pitch vocabulary may include, for example, data fields (or name, value pairs) configured to define a first tonal center (or "Tonal Center 1") representing a D major scale (or the key of D) with pitches D, E, F# (or sharp), G, A, B, C# (or sharp), and a second tonal center (or "Tonal Center 2") representing an A major scale (or the key of A) with pitches A, B, C sharp, D, E, F# (or sharp), and G# (or sharp). The rhythm vocabulary may include, for example, data fields configured to define four preset segments (also referred to herein as "divisions") for creating a 4 by 4 (or 4/4) time signature (also known as "common time"), and within each segment, data fields to define a number of seconds per note (e.g., each quarter note could have a duration of 0.5 seconds for segment 1, 0.75 seconds for segment 2, and 0.5 seconds for segment 3, for example, as represented by the array {0.5, 0.75 0.5}). In some embodiments, the processing plug-ins 406, 408 may use the rhythm vocabulary to assign different speeds to different EEG bands based on the parameters in the parameter file (e.g., quarter notes may represent samples in the Alpha range, eighth notes may represent samples in the Beta range, etc.)

As shown in FIG. 4B, the vocabulary datastore may also store other types of vocabulary for creating the musical or other audio output, such as, e.g., a melody vocabulary, a harmony vocabulary, etc. In addition, the vocabulary datastore may include one or more types of image vocabulary for creating a visual output.

Referring back to FIG. 4B, step 424 of the process 420 includes selecting one or more values from the rhythm vocabulary based on the input B/N data. For example, the input B/N data may consist of a sample in the Alpha range, and the parameter file 410 may indicate that the speed of a quarter note for this segment should be 0.4 seconds. Thus, the processing plug-in algorithm may be coded such that Alpha data is rendered as eighth notes, resulting in a calculated note length of 0.2 seconds.

Figure 11:
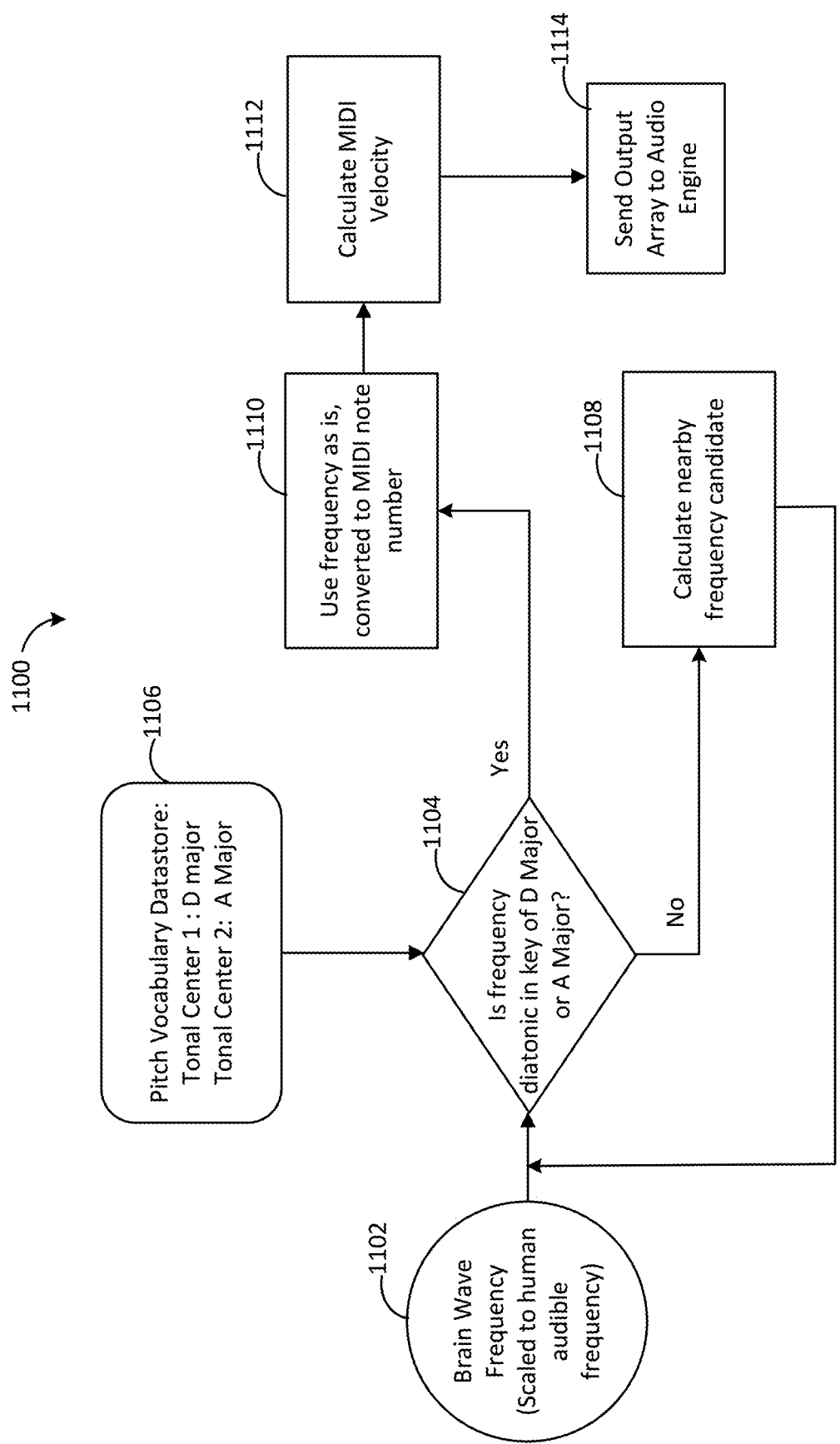
FIG. 11 is a flowchart depicting exemplary operations for mapping bio/neurometric data to appropriate audio representations using parameter file and vocabulary datastore, in accordance with embodiments.

Step 426 includes selecting one or more values (e.g., pitch values) from the pitch vocabulary based on the input data, for example, using techniques described herein (e.g., process 1100 shown in FIG. 11). The process 420 may also include, at step 428, selecting one or more values (e.g., melody values) from the melody vocabulary based on the input data. As will be appreciated, pitch refers to a single note, while a melody is composed of multiple notes played sequentially and thus, denotes at least 2 notes. In some embodiments, the melody value selected from the melody vocabulary may depend on the pitch value selected from the pitch vocabulary. For example, the melody value may include the pitch selected at step 426 plus at least one of a first pitch that is sequentially before the selected pitch and a second pitch that is sequentially after the selected pitch, or other combination of multiple pitches that forms a musical phrase (e.g., a melodic fragment) comprising the pitch selected at step 426. Other algorithms or techniques for selecting melody values are also contemplated, such as, for example, playing the note that is a half-step above or below the pitch selected at step 426, along with the selected pitch.

The process 420 may further include, at step 430, selecting one or more values from the harmony vocabulary based on the input data. In some embodiments, the harmonic values may be selected based on the pitch value(s). For example, based on a collection of pitches, a set of chords can be determined which contain those pitches and thereby, form the harmonic vocabulary. The harmonic vocabulary can be derived either from the result of spectral analysis (e.g., as shown in FIG. 10) or defined statically (e.g., as in FIG. 4A), indicating the chords corresponding to each time segment that are musically coherent with the pitch set for that segment. For example, spectral analysis may be used to produce the following JSON array with pitches in order of amplitude or volume {"F", "A", "D", "B", "A", "C#"}, which may be stored as the pitch vocabulary in the parameter file 410, and based thereon, the processing plug-in may analyze the data in pairs and produce chord candidates (e.g., by matching pitches F and A to chord F Major, matching pitches D and B to chord B minor, and matching pitches A and C# to chord A Major).

Figure 12:
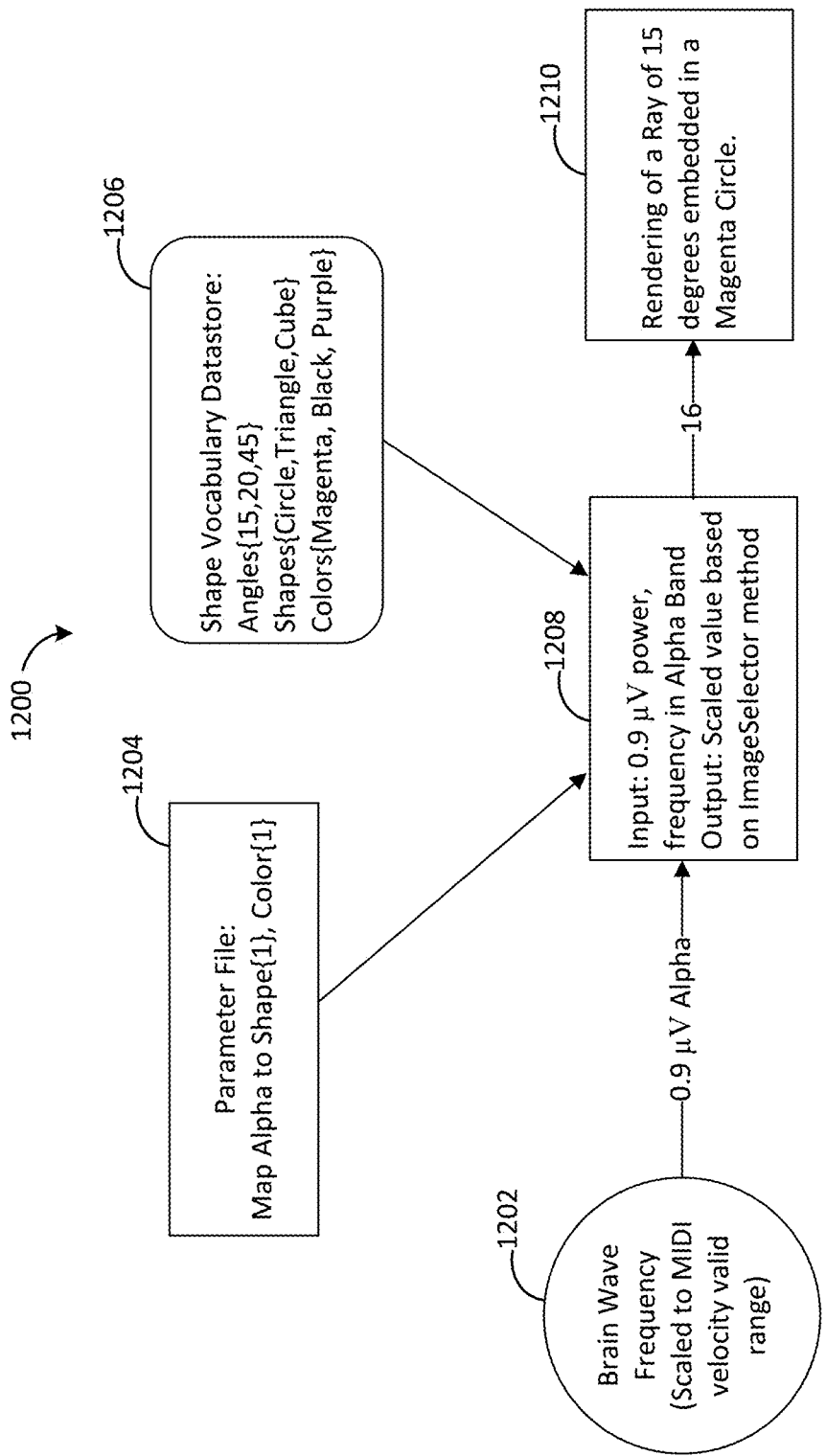
FIG. 12 is a flowchart depicting exemplary operations for mapping bio/neurometric data to appropriate visual representations using parameter file and vocabulary datastore, in accordance with embodiments.

At step 432, the process 420 includes selecting one or more values from the image vocabulary based on the input data, for example, using techniques described herein (e.g., process 1200 shown in FIG. 12). It should be appreciated that in some embodiments, the process 420 may not include one or more of the steps 424 through 432 if the corresponding vocabulary is not included in the vocabulary set at step 422 after analyzing the parameter file, for example.

At step 434, the process 420 includes outputting the selected audio and visual representations, or the values selected in steps 424 through 432, to audio and/or visual engines, as appropriate. This may be shown in, for example, FIG. 2, by the audio engine 208 receiving an audio output array from the processing plug-in 206 via the TCCS harness 202, and the visual engine 210 receiving a visual output array from the same.

To avoid hard-wiring of methods and algorithms and allow maximum flexibility, the system supports a plug-in architecture (e.g., processing plug-ins 406 and 408), where new code can be easily inserted to process new data streams or accommodate new purposes (for example, as shown in FIG. 10). The configurable nature of the plug-in architecture is illustrated in FIG. 15, for example, which provides examples to show how values in the TCCS parameter file can determine which targeting plug-in, processing plug-in, audio engine, and video or visual engine to use. As will be appreciated, other architectures may be used to implement the techniques described herein.

To illustrate what an exemplary plug-in might look like, FIGS. 16A-16C depict a table 1600 describing an exemplary set of parameters, and showing how these parameters could be used within the exemplary processing plug-in. This example illustrates how multiple threads of execution executing the provided code with a common parameter file can result in a coherent audio/visual result. In table 1600, the parameters may be used in the audio output to influences data values passed to the sound generation system, for instance, using MIDI, OSC, or other audio streaming protocols. Likewise, the parameters may be used in the video output to influence data values passed to the visual generation system, for instance, using OSC or other streaming data protocols. The usage examples provided in the last column of table 1600 use variable names defined in other parameter examples within the same column, showing possible ways parameters can be used in formulae with one another (i.e. not hard-wired). It should be assumed that each function is called in a loop (e.g., called at least once for each sample). For purposes of simplicity, it should also be assumed that all variables are Global in Scope. The "defined parameters" mentioned in table 1500 may refer to the parameters listed in table 1600, according to embodiments.

Below is an exemplary pseudo-code implementation of processing plug-in logic flow to show that the process (e.g., process 400 and/or process 420) can accommodate real-time stream of EEG and other bio/neurometric data, in accordance with embodiments. The below-mentioned custom parameters "C1-C10" are present to accommodate any arbitrary purpose including neurometric/biometric data values that may be produced by B/N data collection devices other than an EEG headset, such as, for example, a respiration measurement device (e.g., as provided by Spire Health) or other wearable breath tracker, or a blood pressure monitor. In some embodiments, the "PluginChoice" value may be obtained as specified in table 1500 of FIG. 15, and the "TCCS Parameters" may be obtained as specified in table 1600 of FIGS. 16A, 16B, and 16C. The exemplary pseudo-code may include the following operations:

With (real-time biometric data stream)
    For each record x in data stream)
        A=alphaEEGpower
        B=betaEEGpower
        G=gammaEEGpower
        T=thetaEEGpower
        D=deltaEEGpower
        H=heartRate
        C1-C10=CustomBioMetric1-CustomBioMetric10
        rawEEG=RawEEGpower
    outputArray=ApplyPlugIn (PluginChoice, TCCSParameters, A, B, G, T, D, H, C1-C10, RawEEG)
    SendData (audio engine, video engine, outputArray)
    Loop until data stream closed or end command received.

In the above, it should be understood that "Alpha" refers to brainwaves (or EEG power) with a frequency band or range of 8-12 hertz (Hz), "Beta" refers to brainwaves in a frequency range of 12.5-30 Hz, "Gamma" refers to brainwaves in a frequency range of 25-140 Hz, "Theta" refers to brainwaves in a frequency range of 4-7 Hz, and "Delta" refers to brainwaves in a frequency range of 0.5 to 4 Hz. In embodiments, the creative circuit module may be configured to analyze the incoming signal to determine which of these frequency bands are included in signal. The identified frequency bands are then used to determine which pitch values and other output values are included in the output array for rendering a coherent output. For example, in some embodiments, an output array may be generated in which each EEG band is associated with, or assigned to, a different MIDI channel or instrument (e.g., Alpha=flute, Beta=violin, etc.), and the MIDI pitch number for each channel may be derived based on the frequency of each EEG band and the overtones in the user-provided content (or the vocabulary developed based thereon).

In some embodiments, the processing plug-in may use different pitch selectors for different EEG bands. For example, the pitch selector method for the Muse 2 EEG headset may call methods that calculate what pitch to produce for Alpha EEG bands differently than for Beta EEG bands. In the below example, the custom parameter C1 contains an array of 127 elements representing all possible MIDI pitch levels, with each array entry indicating the volume detected of a frequency matching that pitch (i.e. the real-time pitch vocabulary). The following pseudo code shows a possible flow of such processing plug-in logic:

```
def processingplugin(bioData)
    processDivisions( )
    processNoteLength( )
    setPitchForAlpha(bioData[alpha], biodata[C1])
    setPitchForBeta(bioData[beta], biodata[C1])
```

As an example, the algorithm for the above setPitchForAlpha method may include (1) create a list of all pitches in the live audio input that have volumes above a certain threshold or level, rank ordered by volume (e.g., an array in JSON file format), said pitches being identified using, for example, spectral analysis as described in FIG. 10, (2) add said list to the current list represented in the "TonalCenter1" variable in the TCCS parameter file (or as a key variable of that file) and remove any repeats in pitch values to create a merged list, and (3) derive a MIDI pitch value for biodata [alpha] (or the given band of the EEG signal) using the newly populated TonalCenter1 as the key variable and by a mathematical transformation that is similar to that described above. This algorithm may be repeated for each band of the EEG signal (e.g., Alpha, Beta, Theta, etc.). It should be appreciated that in other embodiments, the setPitchforAlpha algorithm may be written to append to a different variable, such as, e.g., "TonalCenter2". In some embodiments, each EEG band may be appended or added to a different variable (e.g., Alpha to TonalCenter1 and Beta to TonalCenter2), such that the MIDI pitch values for each EEG band are derived based on different lists. Also, while the above example describes creating a list, in other embodiments, the method may populate the pitch vocabulary with the new data by creating an array of pitch values (represented as MIDI note numbers) and corresponding volume levels at step 1 and appending said array to the current array at step 2, or otherwise merging the two arrays.

In embodiments, standard audio signal processing techniques may be used to extract any desired characteristic of an audio stream representing user-provided content, and then provide the extracted data to the processing plug-in, as real-time vocabulary. In this manner, the user-provided content can influence the output of the algorithm for converting the brain waves to audible sound, thus creating a creative circuit where the user is influenced by the coherent output generated based on their brain waves.

Figure 5:
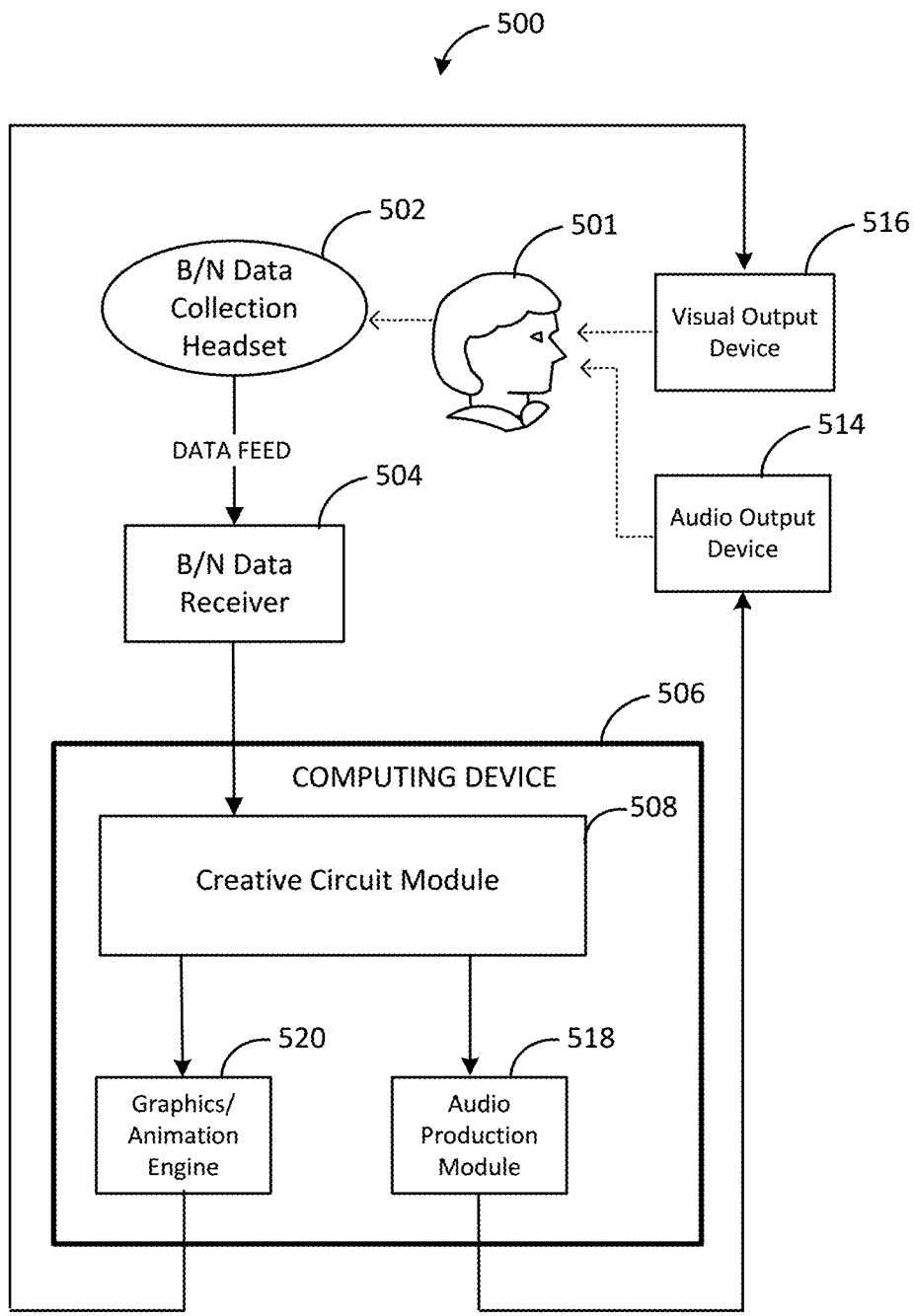
FIG. 5 is a block diagram depicting an exemplary creative circuit system for creating a feedback loop, in accordance with embodiments.

FIG. 5 illustrates an exemplary creative circuit system 500 configured for creating a feedback loop while being used by a human subject (or user) 501, in accordance with embodiments. As shown, the system 500 comprises a bio/neurometric (B/N) data collecting headset 502 worn by the user 501 and output devices for presenting a coherent, visual and audible output to the user based on the data collected by the headset 502. As also shown, the output devices include an audio output device 514 for delivering an audible or audio output to the user 501 and a visual output device 516 for delivering a visual or video output to the user 501. In embodiments, a feedback loop may be created by continuously updating the visual and/or audio outputs based on the real-time bio/neurometric data feed received via the B/N data collection headset, the real-time data feed including one or more "feedback signals," or B/N data representing a response of the user upon experiencing each audio and/or visual output.

The components of the system 500 may be substantially similar to corresponding components of the creative circuit system 100 shown in FIG. 1 and therefore, will not be described in detail here for the sake of brevity. For example, the B/N data collection headset 502 may be substantially similar to the B/N data collector 102, the B/N data receiver 504 may be substantially similar to the B/N data receiver 104, the computing device 506 may be substantially similar to the computing device 106, and the creative circuit module 508 may be substantially similar to the creative circuit module 108. Also, the audio production module 518 and the graphics/animation engine 520 may be substantially similar to the audio production module 118 and graphics/animation engine 120, respectively. In one embodiment, the B/N data collection headset 502 may an EEG headset manufactured by Interaxon corporation (such as, e.g., the Muse 2 headset).

Moreover, like the audio output device 114, the audio output device 514 may be external to the computing device 506 (e.g., external speakers, personal listening device, etc.), as shown in FIG. 5, or may be integrated into the computing device 506 (e.g., as native/internal speakers). And like the visual output device 116, the visual output device 516 may be an external display screen coupled to the computing device 506 (e.g., computer monitor), as shown in FIG. 5, or may be integral to the computing device 506 (e.g., a laptop or desktop computer). In one embodiment, the visual output device 516 and audio output device 514 may be integrated into one unit, such as, e.g., a television or the like. In some embodiments, the system 500 may be implemented using the system 100, for example, by forgoing the audio and visual input devices 110, 112.

During operation, the user 501 may experience an output generated by the computing device 506 by viewing the visual portion of the output using the visual output device 516 and/or listening to the audio portion of the output using the audio output device 514. This experience may influence a thought process of the user 501, which can be registered or captured by the B/N headset 502 as EEG data or other bio/neurometric data (also referred to herein as a "feedback signal"). The headset 502 can be configured to collect the feedback and other electrical signals from the user 501 wearing the device and send the captured human activity to the B/N data receiver 504 (e.g., over a Bluetooth network connection). The data receiver 504 can be configured to transmit the received data feed to the computing device 506, for example, over a WiFi connection using the Open Sound Control (OSC) communication protocol (OSC). The creative circuit module 508 can be configured to process the incoming data and produce a new output array (also referred to herein as a "feedback output array") using algorithms specified in a processing plug-in and in conjunction with a parameter file and vocabulary datastore, for example, as shown in FIG. 4A and described herein. The output array may be provided to the audio production module 518 (or "audio engine") and the graphics/animation engine 520 (or "visual engine") in order to generate a new audible output for delivery to the user via the audio output device 514 and a new visual output for delivery to the user via the visual output device 516, respectively. This creates a feedback loop, as the user's mind, and therefore the EEG data feed, is again influenced by the new audio and/or visual content.

Figure 6:
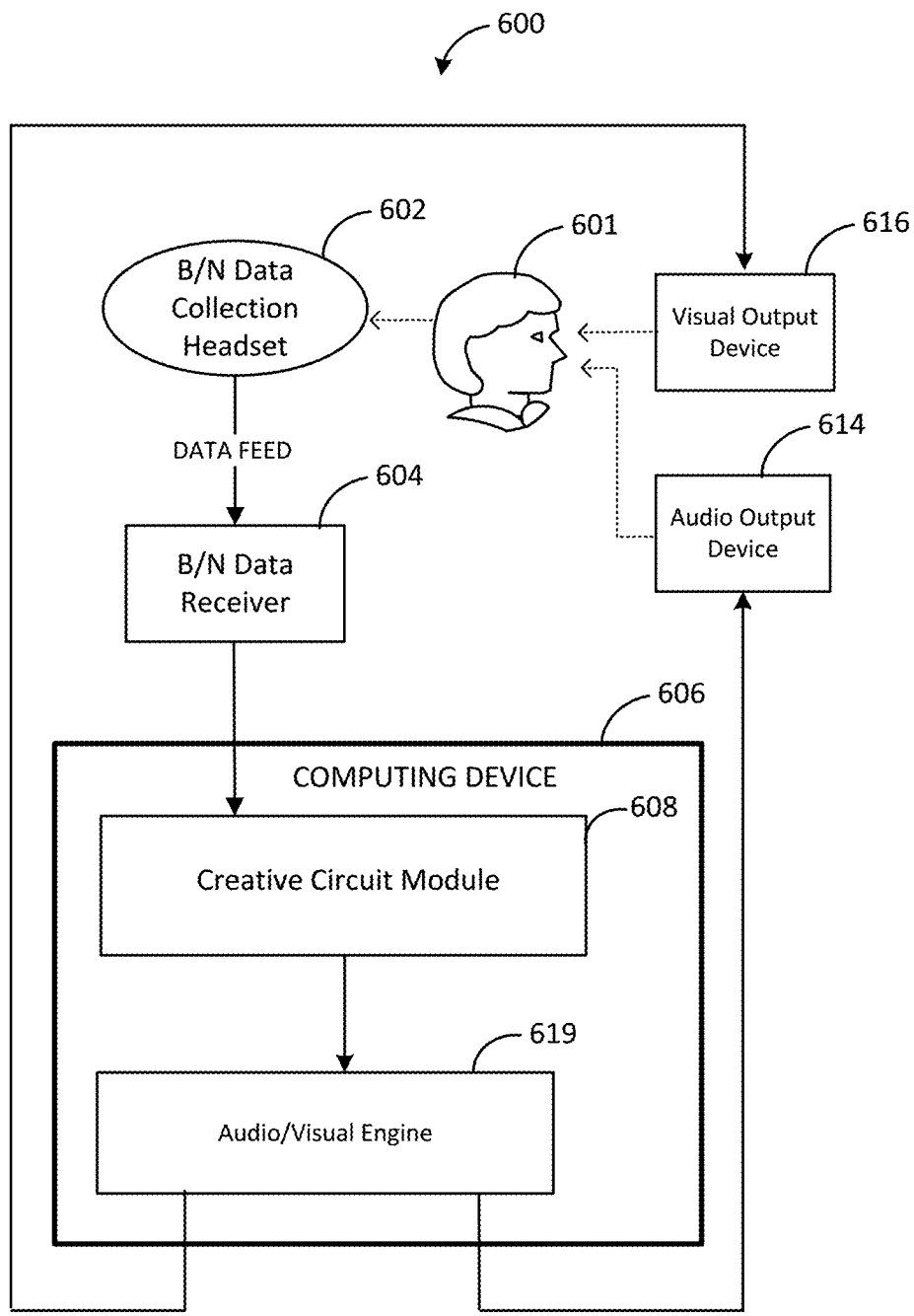
FIG. 6 is block diagram depicting another exemplary creative circuit system for creating a feedback loop, in accordance with embodiments.

FIG. 6 illustrates another exemplary creative circuit system 600 configured to create a feedback loop for a person or user 601 wearing a B/N data collection headset 602 while experiencing an audio/visual output presented by the system 600. In embodiments, the feedback loop may be created by continuously updating the visual and/or audio outputs based on the real-time bio/neurometric data feed received via the B/N data collection headset 602. The system 600 may be substantially similar to the system 500 of FIG. 5, except that the computing device 606 includes a single audio/visual engine 619 for generating the audio and/or visual outputs, rather than the dedicated audio engine and visual engine shown in FIG. 5. Accordingly the common components of the system 600 will not be described in detail here for the sake of brevity.

In embodiments, the audio/visual engine 619 may be configured to receive an output array from the creative circuit module 608 comprising audio and visual output information selected based on the incoming B/N data, as described herein. In some embodiments, the audio/visual engine 619 may be implemented using existing visual programming software for creating real-time audiovisual works, such as, for example, Max/MPS/Jitter provided by Cycling '74, or other interactive media software capable of working with the creative circuit module 608 to present a coherent, visual and audible output to the user 601 based on the data collected by the headset 602.

Figure 7:
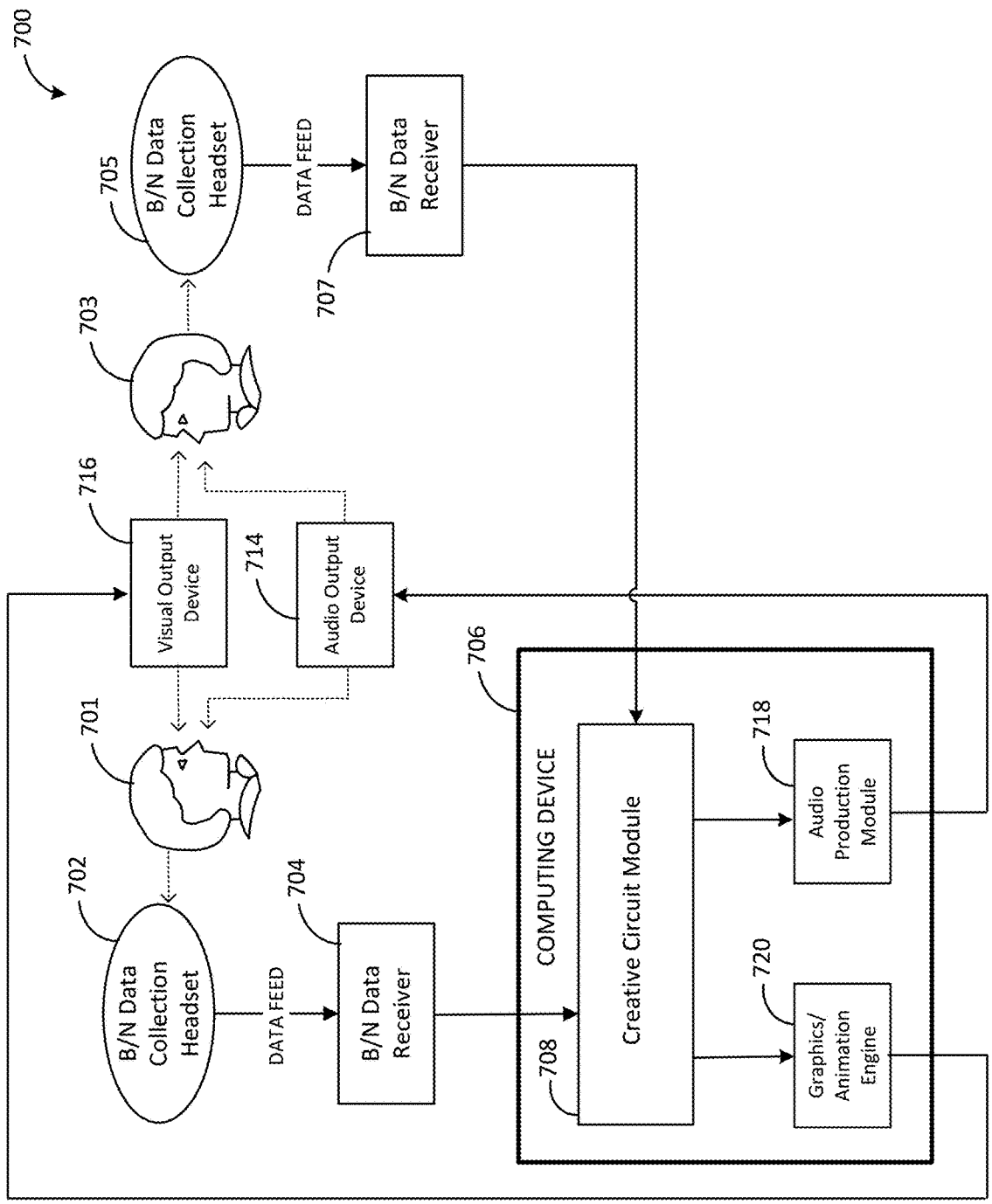
FIG. 7 is a block diagram depicting an exemplary creative circuit system for creating a feedback loop while two users are interacting with the system, in accordance with embodiments.

FIG. 7 illustrates an exemplary creative circuit system 700 configured to create a feedback loop while being used by two people: a first user 701 wearing a first B/N data collection headset 702 communicatively coupled to a first B/N data receiver 704, and a second user 703 wearing a second B/N data collection headset 705 communicatively coupled to a second B/N data receiver 707, in accordance with embodiments. The feedback loop may be created by collecting bio/neurometric data while the two users are experiencing an audio/visual output presented by the system 700, and continuously updating that output based on the data collected from both users.

The system 700 may be substantially similar to the system 500 of FIG. 5, except for the addition of a second user and the additional devices associated therewith. Accordingly, the common components of the system 700 will not be described in detail here for the sake of brevity. The B/N data collection headset 705 may be substantially similar to the B/N data collection headset 702 worn by the first user 701, such as, e.g., a Muse 2 headset. The B/N data receiver 707 may also be substantially similar to the B/N data receiver 704 of the first user 701. For example, both data receivers 704 and 707 may be Android smartphones. In other embodiments, the data receiver 707 may be another type of smartphone (e.g., an Apple iPhone) or a different type of electronic device (e.g., a gaming device, etc.). In either case, the data receiver 707 may be communicatively coupled to both the B/N data collection headset 705 (e.g., via a Bluetooth connection) and to a computing device 706 (e.g., via a WiFi connection) in order to convey the captured B/N data to a creative circuit module 708 included in the computing device 706.

Using techniques described herein, the creative circuit module 708 may be configured to generate an output based on the B/N data received from both users, and provide an output array to an audio production module 718 and/or a graphics/animation engine 720 for delivering updated audio and/or visual outputs to both users via one or more of audio output deice 714 and visual output device 716. For example, the creative circuit module 708 may use a common vocabulary and parameter file to analyze the individual data streams obtained from each of the users 701 and 703, and may combine the results of that analysis to obtain a common output for delivery to both users.

Figure 8:
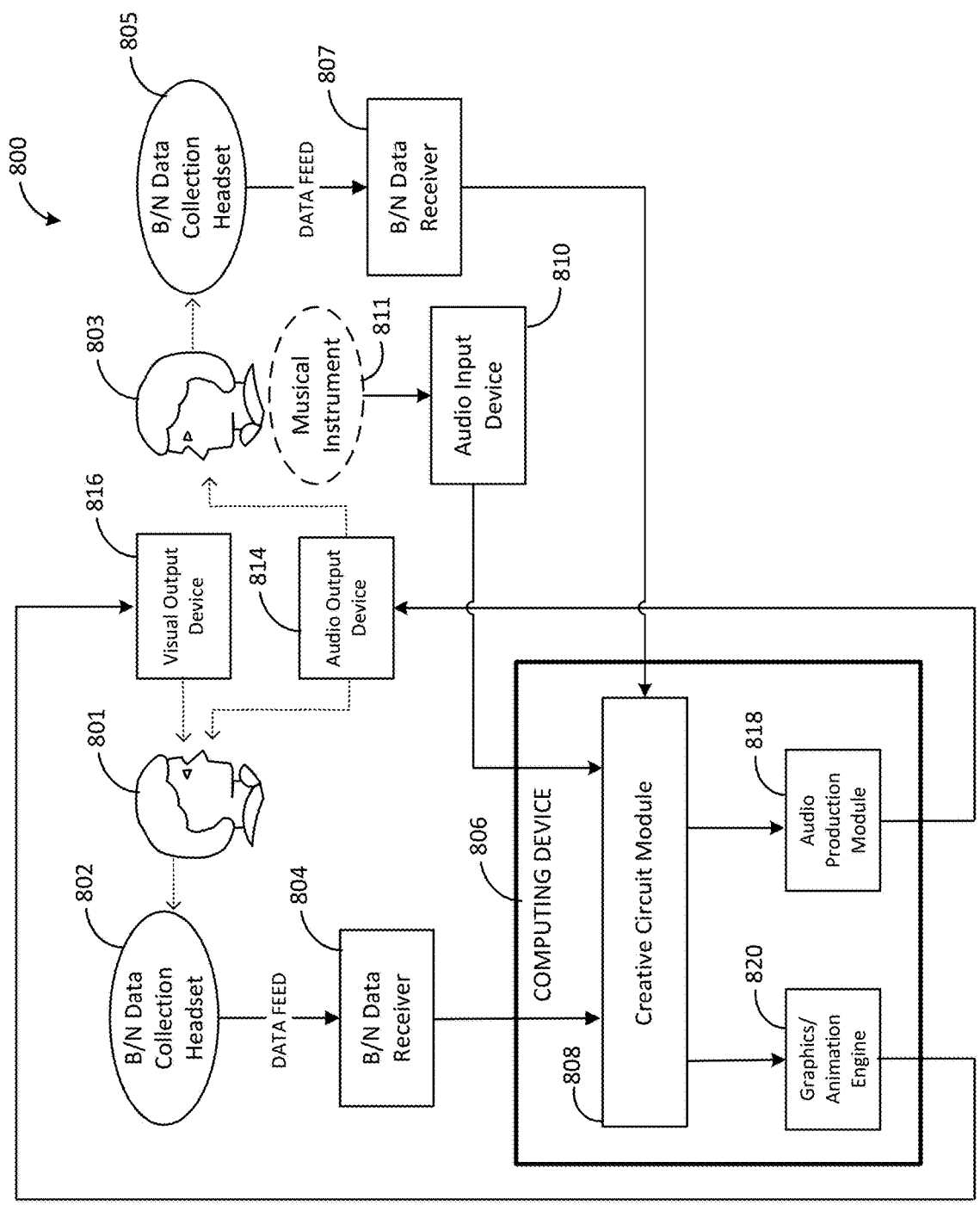
FIG. 8 is a block diagram depicting an exemplary creative circuit system for creating a feedback loop while two users are interacting with the system and experiencing a live performance, in accordance with embodiments.

FIG. 8 illustrates an exemplary creative circuit system 800 configured to create a feedback loop a first user 801 is listening to, or otherwise experiencing, a live performance produced by a second user 803, in accordance with embodiments. The feedback loop may be created by collecting bio/neurometric data from the two users during the live performance, generating an output (audio and/or visual) based on the B/N data of both users, as well as live input data representing the live performance, then presenting the output to the users, and continuously updating that output as new B/N data and/or live input data is received. In some cases, the second user 803 may only receive an audio output representing feedback from the first user 801, or the listener of the second user's performance. In such cases, the visual output may only be provided to the first user 801 in order to enhance the first user's sensory experience.

Other than the addition of a musical instrument 811 and an audio input device 810, the system 800 may be substantially similar to the system 700 of FIG. 7 and may use similar techniques to create the feedback loop. Accordingly, the common components of the system 800 will not be described in detail here for the sake of brevity.

As shown in FIG. 8, the creative circuit system 800 comprises a computing device 806 configured to receive, via a first B/N data receiver 804, live bio/neurometric data collected by a first B/N data collection headset 802 from the first user 801, and live bio/neurometric data, via a second B/N data receiver 807, collected by a second B/N data collection headset 805 from the second user 803. The system 800 also comprises audio input device 810 (e.g., a microphone, similar to the audio input device 110 shown in FIG. 1) for capturing audio associated with the live performance and providing the captured audio signals as the live audio input. In the illustrated embodiment, the live performance is provided by the second user 803 playing musical instrument 811, such as, e.g., a guitar, piano, cello, violin, drums, etc. In other embodiments, the live performance may be spoken word or other vocal performance provided by any one of the users and captured by the audio input device 810.

The computing device 806 comprises a creative circuit module 808 configured to process the live audio input received via the audio input device 810 and the two live B/N data streams received via the data receivers 804 and 807, and based thereon, generate an output for simultaneous delivery back to one or more of the users 801 and 803. The output may be an audio output for delivery via an audio output device 814, similar to the audio output device 714. In some cases, the output may also include a visual output for delivery via a visual output device 816, similar to the visual output device 716.

Figure 13:
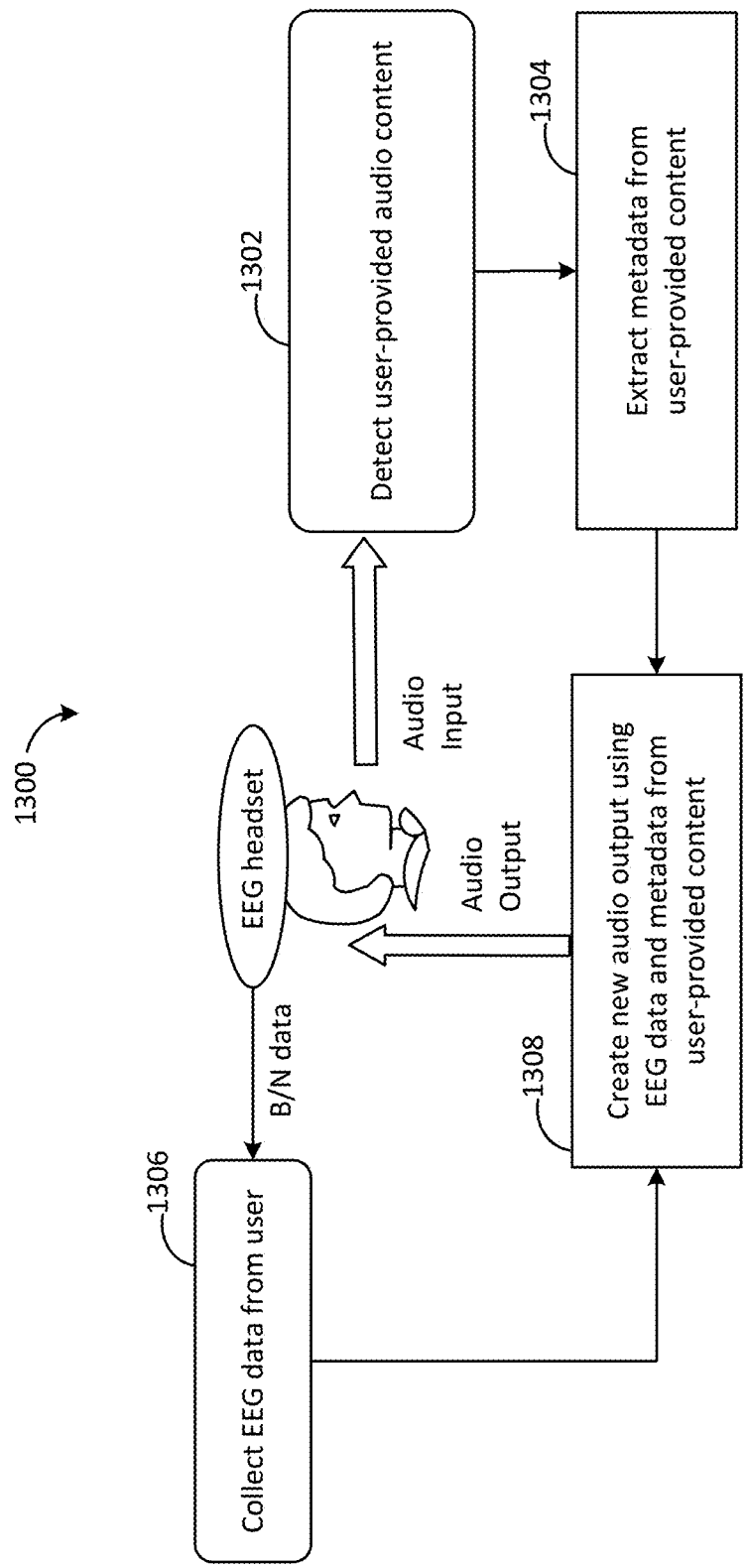
FIG. 13 is a flowchart depicting exemplary operations for creating a feedback loop while a single user is creating audio content and listening to an audio output generated based on the audio content and bio/neurometric data obtained from the user while performing, in accordance with embodiments.

In embodiments, the creative circuit module 808 may be configured to analyze the live audio input data using spectral analysis and create a vocabulary of pitches and/or rhythms based thereon, which then becomes the common vocabulary used by the algorithm that processes the biometric/neurometric data from both subjects (e.g., process 400 shown in FIG. 4A and/or process 420 shown in FIG. 4B). In some embodiments, the creative circuit module 808 uses an audio processing software tool for performing audio and/or music analysis in order to create the pitch vocabulary, for example, as an array representing the set of overtones in an incoming audio stream, binned into MIDI pitch buckets (e.g., written in JSON file format). The overtones may be derived from, or obtained based on, a frequency component extracted from the incoming audio stream by a spectral analyzer (e.g., spectral analyzer 1012 shown in FIG. 10), and the overtones may be converted to MIDI pitches using a known mathematical algorithm. In one embodiment, the audio processing tool utilizes the LibROSA library and Python programming language to perform music information retrieval on the incoming audio data, for example, as shown and described at the website "musicinformationretrieval.com/chroma.html", the contents of which are incorporated by reference herein. For example, the LibROSA library may be used to identify pitch values and/or other aspects of the user-provided content (e.g., as shown in FIG. 13). In some cases, the LibROSA beat module may be used to extract rhythm information from the user-provided content. Through such techniques, a "Vocabulary" datastore can be created in real time that defines the pitch and/or rhythm vocabulary to be used in the algorithm, which is configured to convert the incoming B/N data to sound, thereby allowing the audio output that is created based on both users' B/N data to be musically coherent and in harmony with the output produced by the musical instrument 811.

Another example of usage involving live audio input relates to the practice of "humanization." This is an active topic in the field of electronic music, for example, as shown and described at the web site "makingmusic.ableton.com/humanizing-with-automation-envelopes", the contents of which are incorporated by reference herein. Synthesizers can be programmed with preset loops that allow a user to have, for instance, a drum track running and play along with the track. The problem with these loops, however, is the robotic sound, which misses the little variations that human drummers naturally introduce. Some modern music work stations offer "humanization" functions, which essentially involve adding random variations to the preset loop.

In embodiments, the creative circuit module 808 can be configured to take humanization to a new level, where the variations are controlled by brain waves rather than being random. In such cases, the computer-generated preset loops can be modified to conform to the same common vocabulary and can be "humanized" through brain-wave controlled variations. As an example, these techniques can be implemented in a group setting with two users or human subjects playing musical instruments, or for a single user setting where the person is playing solo but now has a lively backing track varied by his brain, instead of a drum machine playing behind him, as is conventional. As another example, the humanized music may be played on its own as a new musical piece.

In some embodiments, the user may load preset MIDI tracks into a digital audio workstation (or audio engine), such as, e.g., Logic, and may configure the workstation to play the MIDI tracks in a loop using a selected instrument, such as, e.g., a piano, so as to serve as a backing track that is continuously on repeat during the user's performance (e.g., second user 803). Such preset loop may be received as an audio input at the audio input device 810 and may be spectrally analyzed to create the common vocabulary in real-time. In such cases, the system 800 may be configured to produce a humanized version of the preset loop by generating an output based in the common vocabulary derived from the preset loop, the brain waves collected from the user while the preset loop was playing, and the parameter file, using the techniques described herein. In other cases, the system 800 may be configured to generate an output based on the second user's live performance as shown in FIG. 8, and said output may be added to, or played along with, the backing track for humanization purposes. For example, a flute may be used to play the brain wave-embellished MIDI track, while the original MIDI track may be played on the piano. In other embodiments, the system 800 may be configured to humanize the backing track based on a static vocabulary and the detected brain waves of one or more users. In each of above-described examples, the humanized backing track may be generated based further on the parameter file. For example, the parameter file may be configured to match the length of a quarter note with the corresponding setting for the preset loop. Further, in some cases, one or more settings of the system 800 may be adjusted so that the pitches produced by the brain waves embellish the backing track in a satisfying manner.

Figure 9:
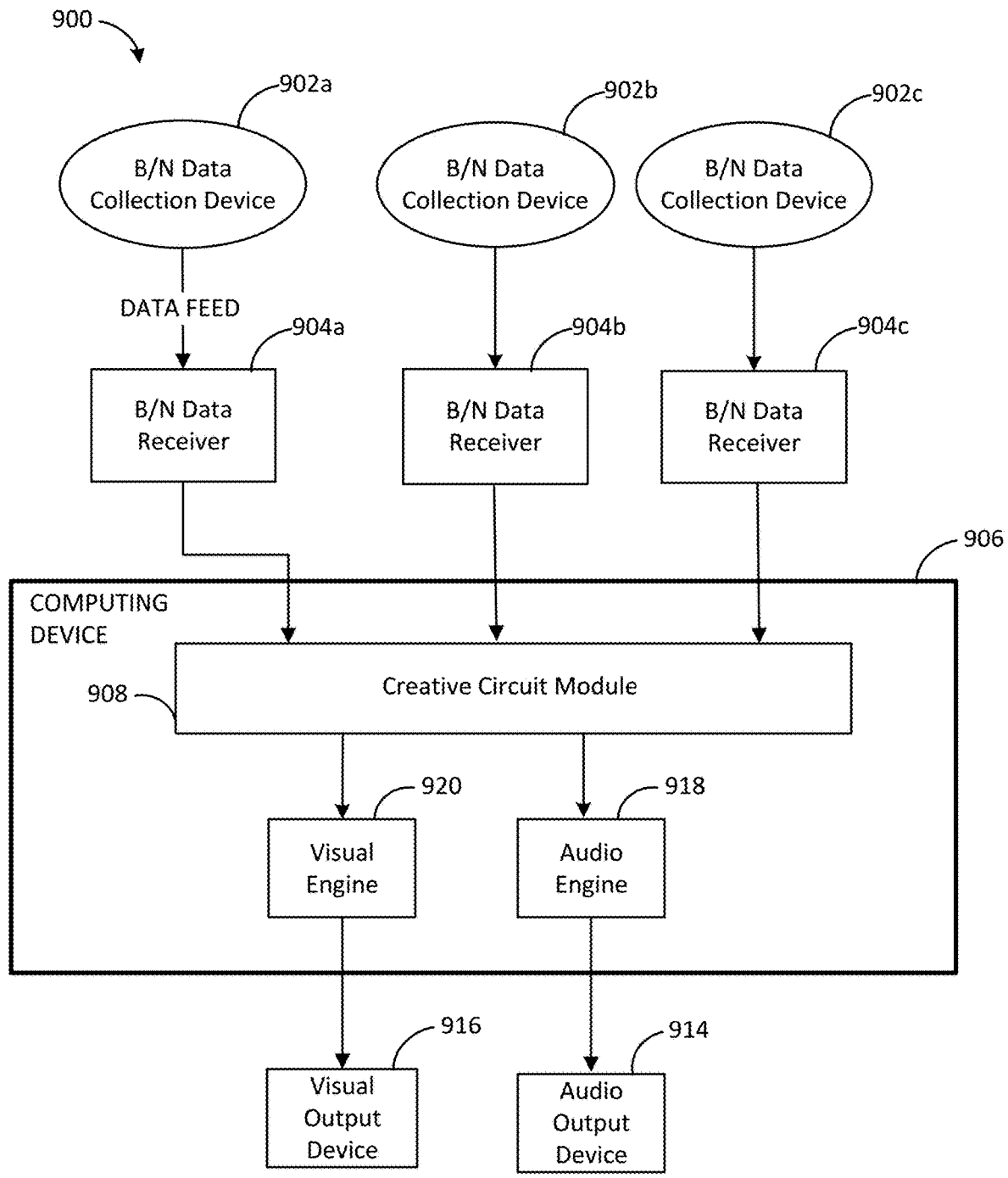
FIG. 9 is a block diagram depicting an exemplary creative circuit system comprising multiple bio/neurometric data collection devices for gathering data simultaneously and output devices for presenting a combined, coherent, visual and audible output to the user based thereon, in accordance with embodiments.

FIG. 9 illustrates using an exemplary creative circuit system 900 configured to simultaneously gathering various types of bio/neurometric data from a given user and produce a combined, coherent output based on all incoming data streams, in accordance with embodiments. As shown, the system 900 includes a plurality of bio/neurometric (B/N) data collection devices 902*a*, 902*b*, and 902*c* and a plurality of bio/neurometric (B/N) data receivers 904*a*, 904*b*, and 904*c*, each data receiver 904 communicatively coupled to a respective data collection device 902 (e.g., via a wired or wireless connection) for receiving a separate data feed therefrom. Each of the data receivers 904*a*, 904*b*, and 904*c* may also be communicatively coupled (e.g., via a wired or wireless connection) to a computing device 906 in order to transmit the received data thereto for processing. The computing device 906 includes a creative circuit module 908 configured to individually process the multiple data streams and generate a coherent output based on all received data. In embodiments, the system 900 may be substantially similar to the system 100 shown in FIG. 1 and described herein, aside from the addition of multiple B/N data collectors and data receivers. Accordingly, the common components of the system 900 will not be described in detail here for the sake of brevity.

In embodiments, each of the B/N data collection devices 902*a*, 902*b*, and 902*c* may be configured to collect a different type of bio/neurometric data from the user. For example, a first data collection device 902*a* may be configured to collect EEG data or other data representing brain-wave activity, such as, e.g., a Muse 2 headset. A second data collection device 902*b* may be configured to collect breathing rate and/or heart rate data, such as, e.g., a Spire respiration monitoring device. A third data collection device 902*c* may be configured to collect cerebral oxygenation data or otherwise monitor tissue oxygenation, for example, using near-infrared spectroscopy ("NIRS"). Other types of bio/neurometric data collection devices may also be used, in addition to or instead of the above, in order to collect other types, such as, for example, respiration measurement devices, blood pressure monitor, pulse monitor, near-infrared EEG device, conventional EEG device, heart rate variability ("HRV") monitor, and the like. In some embodiments, one or more types of data collection devices may be combined into a single unit for ease of use and user comfort, for instance. In some embodiments, the system 900 may include more, or fewer, than the three data collection devices 902 shown in FIG. 9.

The B/N data receivers 904a, 904b, and 904c may be any type of electronic device capable of receiving and processing the respective incoming data feed, such as, e.g., a smartphone, tablet, or other computing device, similar to the B/N data receiver 104 shown in FIG. 1. In some embodiments, each data receiver 904a, 904b, 904c may be configured to handle the particular type of B/N data being collected by the corresponding data collection device 902a, 902b, 902c. For example, the first data receiver 904a may include a software application configured to receive and process EEG data, like the software application 122 shown in FIG. 1. In one embodiment, the software application may be the Mind Monitor application designed to work with Muse 2 headsets.

The B/N data receivers 904 may use the OSC protocol, or other appropriate communication protocol, to transmit the received data feeds to the computing device 906. If the native data collection component(s) for a given data receiver 904 do not support OSC, a translation layer may be added to the component(s) to convert the protocol supported by said receiver 904 to OSC.

Once the computing device 906 receives the B/N data from the data receivers 904a, 904b, and 904c, e.g., at a communications module of the computing device 906, similar to the computing device 106 of FIG. 1, the data may be provided to the creative circuit module 908. The creative circuit module 908 may be configured to route each incoming data stream to the processing plug-in ("PPI") that has appropriate capabilities to support the respective data collection device 902 and/or type of data. In some embodiments, the creative circuit module 908 may use the following code to select or identify an appropriate PPI: <DeviceType/DeviceModel><OutputType>Selector. For example, if the B/N data collection device 902a is the Muse 2 EEG headset, the code to support this device would be named "EEGMuse2PitchSelector," "EEGMuse2RhythmSelector," "EEGMuse2Melody Selector," "EEGMuse2HarrmonySelector," "EEGMuse2ImageSelector," and so forth. Likewise, the code to support the Spire respiration monitor device would be "RespSpirePitchSelector," "RespSpireRhythmSelector," and so forth.

Through these codes, algorithms can be implemented which use the incoming data, the parameter files, and the vocabulary datastore to determine what audio and visual output to render. The output data is sent to an audio engine) 918 (similar to the audio production module 118) and/or a visual engine 920 (similar to the graphics/animation engine 120), depending on whether the output data is visual and/or audio. The visual engine 920 may be, for example, Unity or other graphics/animation production software, and the audio engine 918 may be, for example, Logic Pro or other digital audio workstation. The visual engine 920 can also contain custom code for image generation, for example, through the capability to add modules in the C# language to Unity. The visual engine 920 can also have access to the parameter files and vocabulary datastore and can also contain logic for image selection and geometric figure rendering. The audio engine 918 can be configured so that the input is rendered for different instruments on different MIDI channels, and these software instruments (such as synthesizers) can also be configured to produce different varieties of audio output.

FIG. 10 illustrates a process 1000 for concurrently processing multiple threads of bio/neurometric data using a common vocabulary derived from spectral analysis of a live audio input, in accordance with embodiments. As an example, the process 1000 may be used by the creative circuit system 800 shown in FIG. 8 and described herein, where the live audio input is a live performance by the second user 803. The process 1000 may be carried out using one or more components of a creative circuit module, such as, e.g., the module 200 shown in FIG. 2, and/or the module 808 of FIG. 8, or using any computing device having corresponding software stored on a computer readable medium and executable by one or more computer processors. While FIG. 10 specifically shows concurrent processing of data streams obtained from two separate human subjects, it should be appreciated that the incoming data of three or more human subjects may be concurrently processed using similar techniques. In other embodiments, the process 1000 may be used to processing a single thread of B/N data using common vocabulary derived from spectral analysis of live audio input.

Generally, the process 1000 provides an exemplary algorithm for determining audio and video output based on input bio/neurometric data received from separate users, with commonality gained by use of a shared parameter file 1010 and vocabulary datastore 1011. As shown, the process 1000 utilizes spectral analysis, and a resulting common datastore 1011, to determine a musical output based on incoming EEG data from both human subjects, each in a separate processing thread, thus allowing concurrent thread execution and hence, merged concurrent audio and video output. In one embodiment, the multi-threading can be handled using the multi-threading capabilities built into the Python programming environment. As shown, although the threads run concurrently in FIG. 10, they can share data, in this case the global parameter file 1010 and the common vocabulary datastore 1011.

Portions of the process 1000 may be similar to the process 400 shown in FIG. 4A. For example, the process 1000 may begin with a bio/neurometric data listener 1002, similar to the B/N data listener 402, providing the incoming data streams or threads from individual human subjects to a TCCS dispatcher 1004, similar to the TCCS dispatcher 404. The data listener 1002 may be configured to make multiple connections to different data collection devices (such as, e.g., the B/N data collection headsets 802 and 805 shown in FIG. 8), and hence multiple human subjects (e.g., users 801 and 803 in FIG. 8). The TCCS dispatcher 1004 may assign a respective one of a plurality of processing plug-ins ("PPI") 1006 and 1008 (similar to PPIs 406 and 408) to each human subject, or otherwise provide each thread to the respective processing plug-in. In embodiments, each processing plug-in 1006, 1008 may concurrently operate according to the process 420 shown in FIG. 4B, thus enabling the process 1000 to concurrently process both data threads and produce separate outputs based thereon that are musically coherent.

In FIG. 10, each plug-in 1006, 1008 also receives parameters from the shared TCCS parameter file 1010, which provides, for example, common pitch and/or rhythm data (or vocabulary) to be used for both threads. The TCCS parameter file 1010 may be substantially similar to the shared TCCS parameter file 410 shown in FIG. 4A and described herein, except that the common vocabulary is determined based on data received from a TCCS spectral analyzer 1012. Also, unlike the parameter file 410, the parameter file 1010 does not include a vocabulary datastore. Instead, the vocabulary datastore 1011 is stored separately from the parameter file 1010, as shown in FIG. 10.

According to embodiments, the spectral analyzer 1012 can be configured to measure the amplitude or power of each frequency of an input signal and based thereon, determine various other spectral aspects of the signal, such as, e.g., power, harmonics, bandwidth, etc. In some embodiments, the output of the spectral analyzer 1012 may include a frequency component and a corresponding power component identified from the input signal. The spectral analyzer 1012 may be implemented in hardware, software, or any combination thereof.

In embodiments, the vocabulary datastore 1011 may contain a "real-time" vocabulary that is dynamically populated based on the results of the spectral analysis performed by the spectral analyzer 1012 on the user-provided content. In some embodiments, the vocabulary datastore 1011 may include a JSON file comprising JSON arrays, with each JSON object representing a note. For example, one JSON array for representing the pitch vocabulary may be: ["C#5", "F#4", "C#6", "B5", "E4", "G6", "A#5", "C6", "D6", "G4", "A2", "A4", "G#5"], which includes pitch values corresponding to the frequencies extracted from the user-provided content by the spectral analyzer 1012, ordered by the intensity of volume level, or power, also extracted by the spectral analyzer 1012 for each frequency. In other embodiments, the real-time vocabulary may be provided as an array comprising pairs of pitch values (or the corresponding MIDI note numbers) and volume levels corresponding to the frequency and power components identified by the spectral analyzer 1012. For example, the array may include 127 elements representing all possible MIDI pitch numbers, with each element containing a volume level in decibels.

As shown in FIG. 10, the process 1000 further includes receiving a live audio input at an audio interface 1014. As an example, the audio interface 1014 may be a software component residing in the creative circuit module 808 and configured to interface with, or receive live input data from, the audio input device 810 for capturing the live performance shown in FIG. 8. The audio interface 1014 sends the received data to the TCCS spectral analyzer 1012, which populates the vocabulary datastore 1011 with preferred pitches based on spectral information (or frequency components) extracted from the live audio input, thus creating a real-time common vocabulary for pitches. The spectral information may include, for example, frequencies and overtones detected or identified in the user-provided content. In some cases, the extracted information may also be analyzed for rhythm data and used to populate the rhythm vocabulary, for example, using the LibROSA beat module. In some embodiments, the parameter file 1010 may include a variable "recordEnable=True" that causes the creative circuit module to start recording the live audio input, the recorded files then being provided to the spectral analyzer 1012 for analysis.

In embodiments, based on its analysis of the incoming audio, the spectral analyzer 1012 may create an array representing overtones in the incoming audio stream, binned into MIDI pitch buckets. This array may be saved in the vocabulary datastore 1011 as the pitch vocabulary in a JSON file, for example, and may be dynamically populated or updated as the spectral analyzer 1012 continues to process the incoming audio. When the processing plug-ins 1006, 1008 request pitch vocabulary from the parameter file 1010, the array may be retrieved from the vocabulary datastore 1011 and provided to the processing plug-ins as the "preferredNotesArray" for deriving a musically coherent output from the incoming B/N data. In this manner, the frequencies and overtones detected in the user-provided content may be used as the preferred notes for translating the B/N data into musical tones.

In some embodiments, the pitch vocabulary array includes 127 elements representing all possible MIDI pitch levels or numbers, and each array entry may include the volume level detected in the incoming audio content for the frequency that matches, or most closely matches, the frequency of the corresponding pitch level. In other embodiments, the array may only include entries for preferred pitches. For example, an array created upon spectral analysis of input audio detected during the live performance shown in FIG. 8 may include a volume or power level of 93 for MIDI pitch number 24, a power level of 72 for MIDI pitch number 59, a power level of 12 for MIDI pitch number 79, and a power level of 6 for MIDI pitch number 127. In still other embodiments, the array may be a list of pitch values ranked by volume level, rather than explicitly including the power values. In such cases, the volume level for each pitch value may be implicitly represented in the ordering of the pitch values. The exact form used for the pitch vocabulary may be set using variables in the parameter file, for example, by setting the variable "volumeRepresentation" equal to "Summary" for the ordered pitch value representation, or "Detailed" for the array of volume levels representation.

Regardless of the exact form, such "pitch sets" or pitch vocabulary may be stored in the vocabulary datastore 1011 as the real-time pitch vocabulary, and may be used by appropriate plug-in selector functions of processing plug-ins 1006 and 1008 to choose pitch representation for incoming bio/neurometric data, for example, in accordance with the process 420 shown in FIG. 4B. Thus, the vocabulary datastore 1011 can define the pitch vocabulary to be used in the algorithm that converts the EEG data to sound, thereby allowing the audio output created based on both subjects together to be musically coherent.

In embodiments, the calculation of which pitch and volume (or velocity) to render in the output may be done by the creative circuit module 808 (or TCCS Server Application) and may be transmitted to the audio engine 818 (e.g., Logic Pro or other DAW) using the MIDI protocol. The MIDI protocol also specifies a channel, allowing mapping to a specific instrument. For instance, channel 5 may be assigned to a cello. The choice of how to render video may be determined by the visual engine 820, for example, using custom code in the Unity system. The data may be transmitted to the visual engine 820 via the OSC protocol, and a section of C# code may determine what video to render based on the shared parameter file 1010 and vocabulary datastore 1011.

One example of a live performance that may be processed using the process 1000 is user spoken input (or a vocal performance), in which a single subject uses spoken word as the content to merge with the EEG data received via the data listener 1002, to produce a hypnotically powerful artifact (or output) that can be used by the user to reinforce the media content of choice, or otherwise enhance a hypnotic suggestion.

For instance, the user may wear the EEG headset 802, and read out loud, repeatedly, a phrase representing a target psychological state the person aspires to such as: "Every day I remember to be thankful for all I have been given." The process 1000 may be used to reinforce this hypnotic suggestion through the interplay of audio signals representing the user-provided content and biometric signals obtained from the EEG headset 802 while the user is reading this phrase. For example, the spectral analyzer 1012 may be used to extract phonetic content, as well as the primary pitch and overtones present in the audio stream representing the user's voice. This information may be converted into MIDI data representing overtones each with a corresponding volume (or velocity) level, or the real-time pitch vocabulary. The MIDI data may then be used by an appropriate processing plug-in to derive pitch values for the incoming EEG data and produce an output array of volume levels at different frequencies. The resulting audio output may be a "soundscape," which may be more like a texture than a song, or a harmonic progression with multiple tones rendered as chords, or as an individual melody, with these options depending on the processing plug-in algorithm and additional characteristics, such as timbre and instrumentation settings, being controlled by the settings of the audio engine. A feedback loop is created when this output is heard by the user and influences the way they read the words in the next iteration, which in turn changes the next output, and so on. It has been shown that the mind can adjust itself to produce EEG patterns that the subject wants to reinforce. Thus, the feedback process described herein, where the user is aware of the inclusion of their content in the creative process, may create a powerful reinforcing mechanism capable of increasing the hypnotic suggestive effect.

In another example, one or more subjects could play musical instruments and repeat a song or improvise over a chord progression, using the feedback loop to enhance their interpretation of the music they are playing, or inspire creative ideas.

In another example, one or more subjects could use the techniques described herein to perform free-form improvisation of music or spoken word, continually evolving their own content in response to the system feedback, in what might be termed an improvisational call and response with their own merged content. In these examples, bio/neurometric data from the one person, or multiple persons, involved could be taken into account by the appropriate processing plug-in.

Another possibility for user-provided input could be in the form of user movement, picked up by a camera and sent to the system in a custom parameter, or the user could draw on a digital tablet, providing coordinate data or pressure or color choice data in real-time that can be taken in as a custom parameter and used in an appropriate processing plug-in.

In another configuration, the system(s) described herein could be used with pre-existing EEG files that are played back through the system in a loop (such as, e.g., the playback mode shown in FIG. 3 and described herein). With files of different lengths looping and going to different MIDI channels, the effect is a continuously varying audio and/or video stream, providing a musical and/or visual texture to be used for relaxation, entertainment, creative stimulation, guided meditation, or other beneficial purposes.

The system(s) described herein can be configured so that different EEG bands can be associated with different MIDI channels, and different users can be associated with different channel ranges. So, for instance, a subject could have their brain wave power in the Alpha range to be associated with a flute, while all other bands are used to determine output from a violin. Each subject can have their own customized choices of what brain wave is associated with what instrument or form of output.

The system(s) described herein can also be configured so that user-provided content is recorded in multiple segments, each generating its own output of audio characteristics, which the algorithm for pitch/rhythm/harmony selection cycles through iteratively, allowing for variety such as sections with different keys, chords, styles etc.

The system(s) described herein can be configured to support multiple individuals wearing headsets, each individually identifiable on separate ports in the system. In the event latency and performance becomes an issue, because the input data supports receiving EEG through Wide Area Network (WAN) transfer protocols such as UDP, the system can support daisy chaining of computer systems and aggregation of EEG data before transmission across a network. So, far-instance, to support 100 users one might use 10 computers, each computer handling 10 users, aggregating the EEG data, and sending only average and/or peak values to a central node. These techniques, plus other, known networking techniques, may be used to support the group examples described here.

FIG. 11 illustrates an exemplary process 1100 for selecting appropriate audio representations (such as, e.g., pitch and velocity, or volume, parameters) for received bio/neurometric data, using a parameter file and vocabulary datastore, in order to convert EEG data to sound, in accordance with embodiments. As an example, the process 1100 may be used by any of the creative circuit systems 100, 500, 600, 700, 800, and/or 900, or the creative circuit module included therein, to map received B/N data to appropriate pitch and velocity values. In particular, the process 1100 may be carried out using one or more components of the creative circuit module (e.g., the module 200 shown in FIG. 2 and/or the module 300 shown in FIG. 3), such as, for example, a processing plug-in included therein, or using any computing device having corresponding software stored on a computer readable medium and executable by one or more computer processors. In the case of multiple input B/N streams from multiple users, the process 1100 may be concurrently carried out for each stream of B/N data (or each user) by the appropriate processing plug-in (e.g., as shown in FIG. 10). The parameter file and/or vocabulary datastore may be substantially similar to at least one of the TCCS parameter file 410 shown in FIG. 4B and the TCCS parameter file 1010 and vocabulary datastore 1011 shown in FIG. 10, or otherwise use the techniques described herein with respect to vocabulary usage and parameter selection.

As described herein, the vocabulary may be either prepopulated (i.e. static) or dynamically populated based on analysis of input audio and/or visual data (e.g., from a live performance). In the case of static vocabulary, the vocabulary datastore information may be stored or held in the parameter file and represented by arrays of notes, for example. In the case of real-time vocabulary, the vocabulary datastore information may be stored or held in a separate file capable of being dynamically populated, such as, for example, a JSON file containing JSON arrays, with each JSON object representing a note. Which vocabulary datastore implementation is chosen can be based on system requirements, such as, e.g., performance and ease of access. In some embodiments, the vocabulary datastore may be implemented as a database, such as, e.g., relational, document-oriented, or other suitable database types.

The illustrated process 1100 provides one method for determining pitch and volume, or velocity, of a given note based on incoming EEG data. This logic might be included in the "EEGMuse2PitchSelector" algorithm described above with respect to FIG. 9, for example. In one example, the power of a given brain wave frequency, provided in microvolts, may be detected in the Alpha range (e.g., 8-12 hertz (Hz)) and used as the basis for calculation. At step 1102, the brain wave frequency value (or EEG power) may be scaled up to above a predetermined frequency threshold, for example, so that the value falls within the range of possible human-hearable frequencies (e.g., 20 Hz to 20 kHz), for example, by multiplying the value by a factor of 100 or other preset number. In this manner, a candidate pitch is chosen.

Next, the nearest MIDI note to the candidate pitch is located within the vocabulary datastore to determine the pitch value to include in the output. To create variety in the volume, a higher value may correspond to a louder volume. In particular, at step 1104, the process 1100 determines whether the brain wave frequency is diatonic in (or involves the notes for) a key of D major or in a key of A major. This may be achieved, for example, by comparing the candidate pitch to the pitches which are diatonic in a given key. The process 1100 may also include, at step 1106, obtaining appropriate vocabulary from a pitch vocabulary datastore. As shown, the vocabulary may include, for example, data fields indicating that a first tonal center corresponds to the key D major and a second tonal center corresponds to the key A major. The vocabulary obtained at step 1106 may determine which keys are sought in step 1104, for example.

If the answer at step 1104 is no (i.e. the brain wave frequency (candidate pitch) is not diatonic in one of the desired keys), the process 1100 continues to step 1108, where a nearby frequency candidate is calculated. The nearby frequency to the candidate pitch may be calculated, for instance, by rounding the candidate pitch up until it corresponds to a note that is a half-step higher. The calculated frequency candidate is then analyzed again at step 1104. This loop may continue until the analysis at step 1104 results in a "Yes" answer, or until the analyzed frequency is diatonic in the key of D major or A major. Once that occurs, the process 1100 continues to step 1110, as shown in FIG. 11. At step 1110, the frequency that is diatonic in either D major or A major is used as is, and converted to an appropriate MIDI note (or pitch) number using the standard mathematical function for converting a frequency (expressed in hertz) to a MIDI note value.

At step 1112, the EEG power level of the brain wave may also be used to set the velocity or volume of the audio representation. For example, the MIDI velocity may be calculated for the brain wave frequency by using the MIDI pitch number (e.g., 0-127) as the velocity. This will make higher pitches louder and lower pitches softer. As another example, the velocity may be based on the ratio of Alpha strength to Beta strength in microvolts, so that the stronger Alpha is relative to Beta, the louder the signal. In some cases, the developer of the processing plug-in may implement different algorithms in an effort to find what mapping of brain waves to velocity creates the most effective creative circuit. The MIDI pitch or note number and the MIDI velocity number may be packaged in an output array and, at step 1114, may be sent to an audio engine, such as, e.g., audio production module 118 of FIG. 1, for generating an appropriate audio output based thereon. The audio output may be delivered to the user via an audio output device of the system, such as, e.g., audio output device 114 shown in FIG. 1.

The above is just one example, as many other algorithms could be used. For instance, another possibility is one could perform a mapping using the amplitude of a sampled interval, and scaling that value up to determine pitch, while using the power in microvolts to determine velocity. So, for instance, 9 Hz might scale up to 440 Hz, which maps to MIDI note 120(A), and the power of 0.8 microvolt (μV) might scale up to a velocity of 6. The techniques described herein are not limited to one particular algorithm, but allow for plugging in of different methods to suit the needs of a particular use case.

FIG. 12 illustrates an exemplary process 1200 for selecting appropriate visual representations (e.g., visual angle or ray, shape, and color parameters) for incoming bio/neurometric data using information retrieved from a parameter file and vocabulary datastore, in order to convert EEG data into images or other visual output, in accordance with embodiments. As an example, the process 1200 may be used by any of the creative circuit systems 100, 500, 600, 700, 800, and/or 900, or the creative circuit module included therein, to map received B/N data to appropriate color, shape, and angle values, or other visual representations. In particular, the process 1200 may be carried out using one or more components of the creative circuit module (e.g., the module 200 shown in FIG. 2 and/or the module 300 shown in FIG. 3), such as, for example, a processing plug-in included therein, or using any computing device having corresponding software stored on a computer readable medium and executable by one or more computer processors. In the case of multiple input B/N streams from multiple users, the process 1200 may be concurrently carried out for each stream of B/N data (or each user) by the appropriate processing plug-in (e.g., as shown in FIG. 10). The parameter file and/or vocabulary datastore may be substantially similar to at least one of the TCCS parameter file 410 shown in FIG. 4B and the TCCS parameter file 1010 and vocabulary datastore 1011 shown in FIG. 10, or otherwise use the techniques described herein with respect to vocabulary usage and parameter selection.

In general, the image selector process 1200 shown in FIG. 12 may be analogous to the functions performed by the pitch selector process 1100 for generating an audio output. For instance, the vocabulary datastore may contain a repository of allowed geometric symbols and colors, either pre-defined statically or gained through image analysis of incoming visual data. In the illustrated embodiment, for example, the list of shapes in the vocabulary datastore includes Circle, Triangle, and Cube; the range of colors in the vocabulary includes Magenta, Black, and Purple; and the range of angles includes 15 degrees, 20 degrees, and 45 degrees. The use of a parameter file allows one to specify, for a given configuration, how biometric/neurometric data should be mapped to the audio and visual domains.

In embodiments, the logic represented by process 1200 may be included in the "EEGMuse2ImageSelector" algorithm described above with respect to FIG. 9, for example. As shown in FIG. 12, the image selector process 1200 may begin at step 1202 with receipt of an incoming data item, such as, e.g., a brain wave frequency with power of 0.9 μV in the Alpha range. The brain wave frequency may be scaled up so that it falls within a valid MIDI velocity range (e.g., 0-127), or at least above a predetermined threshold. Use of the MIDI ranges here, even though not for an audio output, can allow for standardization of the numeric representations across both the audio and video engines and thus, help generate a coherent output from both.

Next, the parameter file and vocabulary datastore may be referenced in order to obtain appropriate image values for the input data. For example, at step 1204, the parameter file may indicate that the Alpha range power data should be rendered as angles (or rays) and should be mapped to a specific shape and color based on the image vocabulary provided by the vocabulary datastore at step 1206. In the illustrated embodiment, the vocabulary datastore placed the shapes and colors in arrays ordered by relative frequency of occurrence of those representations within the visual data extracted from the user-provided data (e.g., as shown in FIG. 13), and the parameter file indicates that values in the Alpha frequency range should be mapped to array slot 1 for both the shape and color array, as shown in FIG. 12. In other embodiments, the array slots may be ordered based on other factors, such as, for example, color parameters (e.g., hue, lightness/darkness level, saturation, etc.).

At step 1208, a scaling function can be applied to the power level of the input data value, resulting in a value between for instance 0 and 360 degrees, and the nearest value in the angle vocabulary provided by the vocabulary datastore may be chosen. So, for instance, a scaled value of 16 for the input power level would result in rendering a 15 degree ray at step 1210, as 16 is closer to 15 than 20. Thus, based on the rules provided in the exemplary process 1200, where the shape array is [Circle, Triangle, Cube] and the color array is [Magenta, Black, Purple], for an input brain wave frequency have 0.9 µV of Alpha power, the "EEGMuse2ImageSelector" algorithm will output a rendering of a ray angled at 15 degrees and embedded in a magenta-colored circle. As will be appreciated, other outputs may be obtained using different image vocabulary and parameter files.

FIG. 13 illustrates an exemplary process 1300 for creating a feedback loop as a single user produces audio content while wearing an EEG headset and listens to an audio output generated based on the collected EEG data and captured audio content, in accordance with embodiments. The process 1300 may be carried out using a system that comprises a bio/neurometric data collecting headset to be worn by a user (such as, e.g., an EEG headset as shown in FIG. 13), an audio input device (such as, e.g., a microphone) for detecting audio content representing a live performance of the user, a computing device (such as, e.g., a tablet or a laptop, desktop, or server computer) for creating a coherent, audio output based on the detected audio and the data collected by the headset, and one or more audio output devices (such as, e.g., audio speakers or a personal listening device) for presenting the audio output to the user. Portions of the process 1300 may be carried out by a creative circuit module (such as, e.g., the creative circuit module 200 shown in FIG. 2) included in the computing device. In some embodiments, the process 1300 may be implemented using the creative circuit system 100 shown in FIG. 1 and/or the creative circuit system 600 shown in FIG. 6.

As shown in FIG. 13, the process 1300 may begin at step 1302 with detection of user-provided audio content, or audio generated by a live performance of the user, using the audio input device (e.g., audio input device 110 shown in FIG. 1). The audio content may be a vocal performance, such as, e.g., spoken word or singing, or a musical performance, such as, e.g., playing an instrument (like the musical instrument 811 shown in FIG. 8). The audio content may be provided to a computing device (such as, e.g., computing device 106 shown in FIG. 1) for analysis by a creative circuit module included therein (such as, e.g., creative circuit module 108 shown in FIG. 1).

At step 1304, the module may identify one or more aspects of the input signal by, for example, extracting metadata from the user-provided content, such as, e.g., volume, pitch, etc., and may use these aspects to create a vocabulary. As an example, the creative circuit module may include an audio interface for receiving the detected audio content, a TCCS spectral analyzer for analyzing the incoming audio, a vocabulary datastore for creating new vocabulary based on the live input data, and a TCCS parameter file for setting the vocabulary and other parameters to be used by a processing plug-in for generating the output, as shown in steps 1014, 1012, 1011, and 1010, respectively, of FIG. 10. In such cases, the spectral analysis techniques described herein with respect to FIG. 10 and otherwise may be used to extract volume, pitch, and other metadata from the user-provided content and deposit the extracted information into an array, thus creating the new vocabulary. The resulting vocabulary may be provided to a processing plug-in also included in the module (such as, e.g., PPI 206 shown in FIG. 2).

At step 1306, bio/neurometric data may be collected from the user, or more specifically, the EEG headset or other B/N data collection device worn by the user, and provided to the creative circuit module for analyzing the B/N data. It should be appreciated that in some cases, two or more of the steps 1302, 1304, and 1306 may occur simultaneously, or nearly simultaneously, while in other cases, certain steps may occur before others. The process 1300 is not limited to an exact order of these steps, so long as a feedback loop is created.

At step 1308, the processing plug-in included in the creative circuit module creates a new audio output based on the metadata generated at step 1304 and the EEG data collected at step 1306. For example, the processing plug-in may use all or portions of the process 1000 shown in FIG. 10 and/or the processes 400 and 420 shown in FIGS. 4A and 4B, respectively, in order to create the audio output. The audio output may be delivered to, or played for, the user through one or more audio output devices (such as, e.g., audio output device 114 shown in FIG. 1). In this manner, the user is able hear sounds generated based on their own B/N data and live audio content, which may then influence the user's continued thought and content creation, thus creating a feedback loop.

Figure 14:
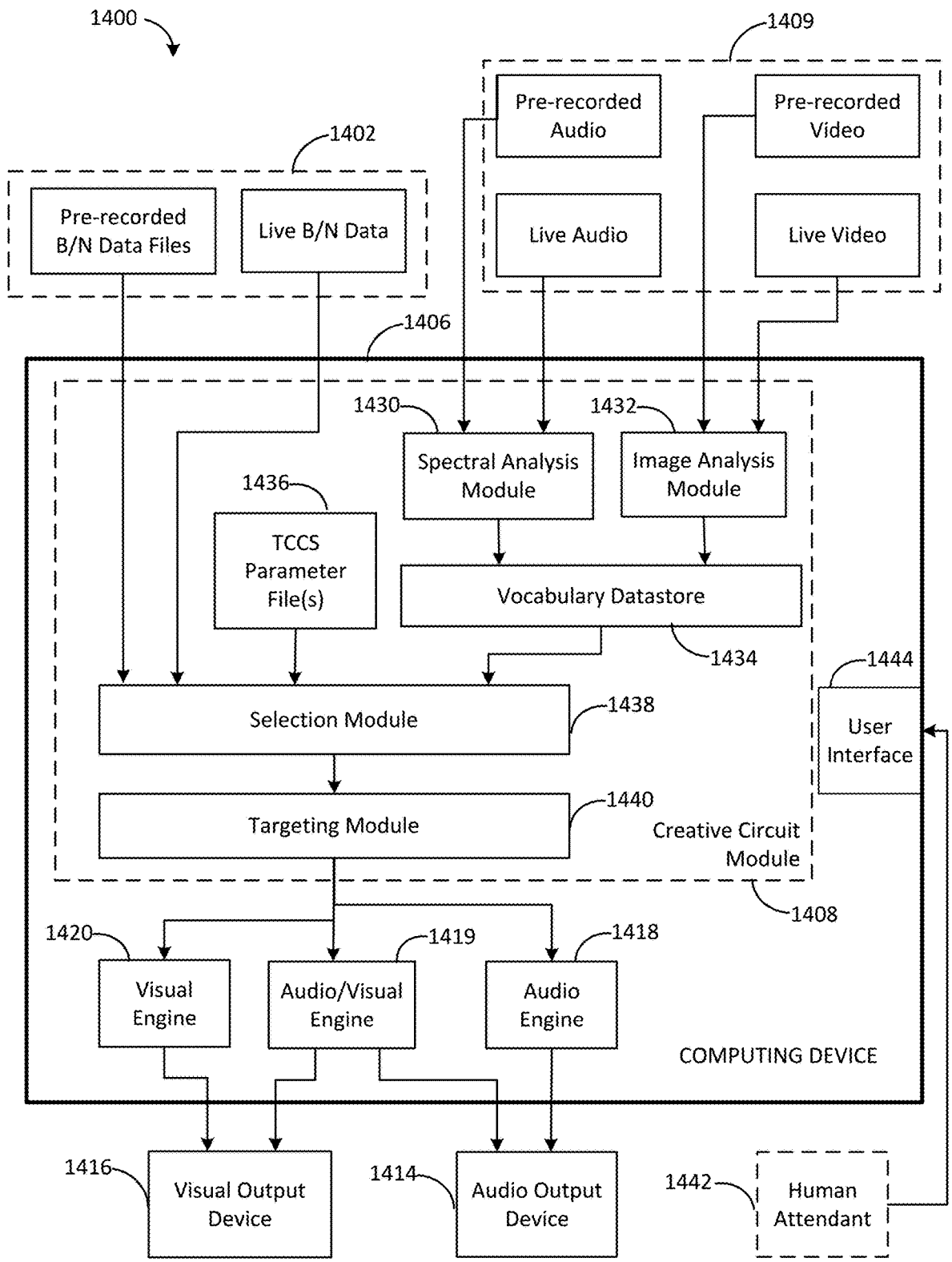
FIG. 14 is a block diagram depicting an exemplary creative circuit system for processing multiple input sources using targeting logic, in accordance with embodiments

FIG. 14 illustrates an exemplary creative circuit system 1400 configured to create a coherent output based on multiple inputs and use targeting logic to direct the output to an appropriate output generator, in accordance with embodiments. As shown, the creative circuit system 1400 comprises a computing device 1406 configured to receive various types of inputs, including bio/neurometric (B/N) data and user-provided content, and provide the received inputs to select components of a creative circuit module 1408 included in the device 1406 for processing the inputs. Certain components of system 1400 may be substantially similar to corresponding components of the creative circuit system 100 shown in FIG. 1 (or other systems described herein) and therefore, will not be described in detail here for the sake of brevity. For example, the computing device 1406 may be substantially similar to the computing device 106 shown in FIG. 1, and the creative circuit module 1408 may be substantially similar to the module 108 shown in FIG. 1, the module 200 shown in FIG. 2, and/or the module 300 shown in FIG. 3. In some cases, the process 1300 shown in FIG. 13 may be implemented using components of the system 1400.

In embodiments, the creative circuit system 1400 includes a bio/neurometric data input system 1402 communicatively coupled to the computing device 1406 (e.g., via a wired or wireless connection) for providing live and/or pre-recorded bio/neurometric data to the creative circuit module 1408. The B/N input system 1402 may include one or more B/N data collection devices configured to collect one or more types of B/N data, such as, e.g., EEG data, heart rate data, blood pressure data, galvanic skin response data, etc. In some embodiments, the B/N input system 1402 may include an EEG headset, such as, e.g., the Muse 2 headset, and/or other data collection device similar to the B/N data collector 102 shown in FIG. 1. In some embodiments, the B/N input system 1402 may also include a data receiver communicatively coupled to the B/N data collection device and configured to convey B/N data received from the collection device to the computing device 1406, for example, similar to the B/N data receiver 104 shown in FIG. 1.

As shown in FIG. 14, the B/N input system 1402 may be configured to transmit a live B/N data stream to the computing device 1406, such as, for example, B/N data obtained in real-time from a user wearing an EEG headset or other B/N data collection device (e.g., as shown in FIG. 5). The B/N input system 1402 may also be configured to provide pre-recorded B/N data files to the creative circuit module 1408. For example, in some cases, the B/N data may have been previously collected by a B/N data collection device of the B/N input system 1402. In other cases, the B/N data may have been obtained by the B/N input system 1402 from another source. In either case, the B/N data files may be stored in a memory of the B/N input system 1402 until requested by the computing device 1406. In some embodiments, the B/N input system 1402 may include a file manager, similar to the file manager 312 shown in FIG. 3, for storing the pre-recorded B/N data for future use.

As shown in FIG. 14, the creative circuit system 1400 also includes an audio/visual input system 1409, similar to the audio/visual input system 109 shown in FIG. 1. In embodiments, the audio/visual input system 1409 can include at least one audio input device, such as, e.g., a microphone, for capturing live audio data or signals (e.g., similar to the audio input device 110 shown in FIG. 1), and at least one video input device, such as, e.g., a camera, video recorder, or webcam, for capturing live images, video, or other visual data (e.g., similar to the video input device 112 shown in FIG. 1).

As shown, the audio/visual system 1409 can be configured to transmit a live video stream, a live audio stream, pre-recorded audio data, and/or pre-recorded video data to the computing device 1406. In some embodiments, the audio/visual system 1409 may transmit other types of non-live data to the computing device 1406 that is not necessarily pre-recorded, such as, e.g., an audio track or video file generated by a computer and transmitted directly to the computing device 1406, etc. The live streams may include audio and/or video data captured by the audio/visual system 1409 and transmitted to the computing device 1406 in real-time. In some cases, the pre-recorded data may have been previously collected by the audio and/or video input devices of the system 1409. In other cases, the pre-recorded audio and/or video data may have been obtained by the audio/visual input system 1409 from another source (e.g., downloaded). In either case, the non-live audio and/or video data may be stored in a memory of the audio/visual input system 1409 until requested by the computing device 1406.

The creative circuit module 1408 comprises various components for receiving and processing the incoming data, whether live, pre-recorded, or otherwise, including a spectral analysis module 1430 for analyzing all incoming audio data and an image analysis module 1432 for analyzing all incoming video data. The spectral analysis module 1430 may be configured to extract metadata (e.g., pitch, volume, etc.) from the incoming audio data, or otherwise identify aspects of said data, and create an appropriate audio vocabulary based thereon, for example, similar to the TCCS spectral analyzer 1012 shown in FIG. 10 and described herein. The image analysis module 1432 may apply similar techniques for extracting metadata (e.g., shape, color, angle, etc.) from the video data and creating an image vocabulary based thereon.

As shown in FIG. 14, each of the modules 1430 and 1432 may be configured to provide the newly acquired vocabulary to a vocabulary datastore 1434 of the creative circuit module 1408. As such, the vocabulary datastore 1434 may be dynamically populated with a common vocabulary that can be applied to all incoming B/N data to create a coherent output based thereon. In some embodiments, the vocabulary datastore 1434 may be similar to the vocabulary datastore 1011 shown in FIG. 10 and may include, for example, a pitch vocabulary datastore as shown in FIG. 11 and a shape vocabulary datastore as shown in FIG. 12. The creative circuit module 1408 also includes one or more TCCS parameter files 1436 configured to store parameter information and threshold information for use during output generation, for example, similar to the TCCS parameter file 1010 shown in FIG. 10. The parameter file 1436 may include a set of instructions for applying the common vocabulary to the incoming data, for example, as shown in FIG. 12.

The creative circuit module 1408 further includes a selection module 1438 configured to receive all B/N data, live or pre-recorded, from the B/N input system 1402, parameter information from the TCCS parameter file 1436, and vocabulary information from the vocabulary datastore 1434. Based on the received information, the selection module 1438 may create an output array comprising a plurality of data field (e.g., pitch, volume, image) and a value selected for each field. The data fields may be set or determined by the parameter file. The values for each data field may be selected by the module 1438 using one or more algorithms for mapping the received B/N data to the common vocabulary received from the vocabulary datastore 1434. The algorithm(s) may be stored in the module 1438 and may be similar to, for example, the processes 1100 and 1200 shown in FIGS. 11 and 12, respectively. In some embodiments, the selection module 1438 may be implemented as a processing plug-in, such as, e.g., PPI 206 shown in FIG. 2, and may be configured to carry out the process 420 shown in FIG. 4B.

As shown in FIG. 14, the creative circuit module 1408 further includes a targeting module 1440 configured to receive the output array from the selection module 1438 and determine which output generation engine may be best suited for generating an audio/visual output based on the received output array. In embodiments, the targeting module 1440 may be called or utilized only if a predetermined threshold is hit for an input data sample, wherein the threshold is provided by the parameter file 1436. The targeting module 1440 may include one or more algorithms for carrying out these and other operations and may be implemented as a plug-in, in some embodiments.

The output generation engines may include, for example, an audio engine 1418 that is substantially similar to the audio production module 118 shown in FIG. 1, an audio/visual engine 1419 that is substantially similar to the audio/visual engine 619 shown in FIG. 6, and a visual engine 1420 that is substantially similar to the graphics/animation engine 120 shown in FIG. 1. Other output generation engines may also be included to accommodate other types of output generation techniques, as will be appreciated. In some embodiments, the engines 1418, 1419, and 1420 may be included in the computing device 1406 and in communication with the creative circuit module 1408, as shown in FIG. 14. In other embodiments, the engines 1418, 1419, and 1420 may be included within the creative circuit module 1408, itself.

The visual engine 1420 may be configured to provide a visual output (e.g., images, videos, or other visuals) generated based on the output array received from the targeting module 1440, to a visual output device 1416 for delivering the visual output to the user, similar to the visual output device 116 shown in FIG. 1. Likewise, the audio engine 1418 may be configured to provide an audio output (e.g., music, voice, or other sounds) generated based on the output array received from the targeting module 1440, to an audio output device 1414 for delivering the audio output to the user, similar to the audio output device 114 shown in FIG. 1. And the audio/visual engine 1419 may be configured to provide outputs generated based on the output array received from the targeting module 1440 to both devices, namely an audio output to the audio output device 1414 and a visual output to the visual output device 1416. In some embodiments, the visual output device 1416 and the audio output device 1414 may be external devices (e.g., an external monitor and an external audio system) communicatively coupled to the computing device 1406, as shown in FIG. 14. In other embodiments, one or more of the visual output device 1416 and the audio output device 1414 may be integrated into the computing device 1406 (e.g., a native speaker or display screen).

Further details on the use of a parameter file to specify which plug-ins and audio/visual engines to use during operation of the system 1400 is provided in FIG. 15, which depicts a table 1500 listing the name of exemplary TCCS parameters, a description of each, and an explanation of how each parameter is used in audio outputs and video outputs. In table 1500, the given TCCS parameter may be used in the audio output to influence data values passed to the sound generation system, for example, via MIDI, OSC, or other audio streaming protocols, and may be used in the video output to influence data values passed to the visual generation system, for example, via OSC or other streaming data protocols. An exemplary parameter file 1800 is shown in FIG. 18.

In traditional neurofeedback applications, targets or thresholds are defined for various neurometric data which produce new visual or audio stimuli if hit. The system 1400 supports this through the use of the targeting module 1440, or a targeting plug-in, which can be inserted into the flow and can be customized for different use cases. Due to the support for multiple threads, multiple input types, and multiple users, the system 1400 is able to define heterogeneous group targets. So, for instance, the targeting plug-in 1440 can be written to specify that if the group average for power in the Alpha range is over 0.8 microvolts (wherein this threshold is specified in the parameter file 1436), then send output MIDI to a second, different MIDI channel (which is also specified in the parameter file 1436). For example, the second MIDI channel may be ringing a bell, whereas the first MIDI channel may be playing a violin, piano, or other instrument. The conditions under which the threshold is considered met could take into account multiple types of bio/neurometric data input, as well as audio input.

In some embodiments, one or more aspects of the system 1400 may be controlled by a human attendant 1442 to allow for real-time modification of parameters or settings according to the needs of a given use case. In such embodiments, the system 1400 may be further configured to receive an input from the attendant 1442 and adjust one or more settings based on the input. For example, the attendant 1442 may change the instrument that is assigned to a given MIDI channel (e.g., from bell to organ) upon listening to an audio output provided to one or more users or observing the reaction of a user.

As shown in FIG. 14, the computing device 1406 may include a user interface 1444 for enabling the attendant 1442 to interact with the creative circuit module 1408. For example, the user interface 1444 may be configured to receive inputs from the attendant 1442 and provide those inputs to the module 1408. The user interface 1444 may be in communication with a processor of the computing device 1406 (such as, e.g., processor 124 shown in FIG. 1) and may be implemented in hardware, software, or a combination thereof. For example, the user interface 1444 may be implemented as a console or electronic control panel comprising one or more input devices (e.g., keyboard, button, slider, dial, joystick, mouse, touchscreen, microphone, etc.) for receiving the attendant's inputs, and one or more software programs, executed by the processor, for interacting, and exchanging data, with the creative circuit module 1408. The user interface 1444 may also include one or more output devices (e.g., display screen, speakers or other audio output device, etc.) for experiencing the outputs provided to the user, for observing the reactions of the user, and/or for viewing configurable settings of the creative circuit module 1408.

In some embodiments, the creative circuit module 1408 may analyze a received input to determine which of its component(s) require modification and may send the input to the appropriate component. In other embodiments, the user interface 1442 may include separate interfaces (or consoles) for manipulating each of the targeting plug-in 1440, the selection module (or processing plug-in) 1438, the audio engine 1418, the video engine 1420, and the audio/visual engine 1419, so that the received input can be directly routed to the appropriate component.

In embodiments, the system 1400 may be configured for various different modes of operation. The following paragraphs describe nine exemplary modes of operation. It should be appreciated, however, that other modes of operation are also contemplated in accordance with the teachings herein. Each of the nine modes is described below with examples. The modes labeled "Assisted" require participation of the human operator or attendant 1442, referred to as a "Circuit Moderator" (CM), and require that the individual have access to the user interface 1444 capable of manipulating parameters available in each subsystem, referred to as a "Console." While the below discussion assumes existence of a targeting plug-in console, a processing plug-in console, an audio engine console, and a video engine console, other embodiments may include one console for controlling all components of the creative circuit module 1408.

Mode 1: Real-Time, Unassisted, Untargeted Operation and Mode 2: Real-Time, Unassisted, Targeted Operation In either of these modes, the user or users wear the headset or other biometric data capturing equipment, and the data is streamed in real-time from the biometric data source(s) to the Theta-u Creative Circuit System (TCCS), such as, e.g., the creative circuit system 1400 shown in FIG. 14.

Starting State: Before the data flow starts, the TCCS system must be started, initialized with values and algorithms as specified in the TCCS parameter file, and the Audio and Video engines specified in the TCCS parameter file must be running, waiting for input and also set up with desired parameters and configurations.

Processing: The Processing Plug-in indicated in the TCCS parameter file is called for each sample received in real-time. The output values are streamed in real-time to the Audio and Video Engines specified in the parameter file. Each engine renders appropriate audio and video output based on the real-time data. In addition to applying the algorithms listed above as described for each TCCS parameter, in Targeted Mode, the system will check to see if rules described in the Threshold file are met, and if so, will render appropriate output. In Untargeted mode, no changes are made to the output data programmatically.

Examples of Usage:

Unassisted, Untargeted Operation (or Mode 1): A user enjoys cello-piano-flute combination, so Audio engine is setup with 3 tracks, each of which will receive data over MIDI channel 1. The system is launched with Processing-PlugIn-1 as described above, and the user hears output in real-time. The music evolves over the 10 minutes as the user adjusts to which thought patterns produce which result, and becomes able to modify the output to become more and more pleasurable as the brain adjusts to patterns which produce satisfying musical output.

Unassisted, Targeted Operation (or Mode 2): As in example above, a cello-piano-flute combination is setup, and the system is launched with ProcessingPlugIn-1. In addition, a threshold file is created which indicates that every time the average power in the Alpha range is above 0.05 microvolts (μV) for over 500 milliseconds (ms) in the octave, the pitch representing Alpha power will be raised one octave. Also, this value will be sent over MIDI channel 2, a channel reserved for targeted data, allowing the audio engine to treat this data with specific instrumentation. This example shows that the TCCS system can be used to create a neurofeedback system usable by therapists, similar to systems such as the @Nexus system.

Mode 3: Real-Time, Assisted, Untargeted Operation and Mode 4: Real-Time, Assisted, Targeted Operation In either of these modes, the user or users wear the headset or other biometric data capturing equipment, and the data is streamed in real-time from the biometric data source(s) to the ThetaU Creative Circuit System (TCCS), such as, e.g., the creative circuit system 1400 shown in FIG. 14.

Starting State: Before the data flow starts, the TCCS system must be started, initialized with values and algorithms as specified in the TCCS parameter file, and the Audio and Video engines specified in the TCCS parameter file must be running, waiting for input and also setup with desired parameters and configurations. A human attendant, i.e. the Circuit Moderator (CM), is watching and potentially making changes through one or more of the control consoles of the TCCS, such as, e.g., Processing PlugIn Console, Targeting PlugIn Console, Audio Engine Console, and Video Engine Console.

Processing: The Processing Plugin indicated in the TCCS parameter file is called for each sample received in real-time. The output values are streamed in real-time to the Audio and Video Engines specified in the parameter file. Each engine renders appropriate audio and video output based on real-time data. In addition to applying the algorithms listed above as described for each TCCS parameter, in Targeted Mode, the system will check to see if rules described in Threshold file are met, and if so, will render appropriate output. In Untargeted mode, no changes are made to the output data programmatically. As system processing proceeds, the CM may modify parameters of any of the components, including changing values in the TCCS parameter file, changing instrumentation in the Audio Engine, changing parameters such as field of view or zoom level or animation speed in the Video Engine, or changing values in the Targeting file. All of these changes will take effect in real-time.

Examples of Usage:

Assisted, Untargeted Operation (Mode 3): A user enjoys cello-piano-flute combination, so Audio engine is setup with three tracks. CM starts session with only cello track active and uses an iterative loop approach with audio engine to provide all three tracks. For example, after three minutes of cello only, which is being recorded in real-time, CM introduces piano with "backing track" of initial cello, allowing user's brain to create a piano track adjusting to input stimuli of initial cello track. CM records this piano track for three minutes. CM then plays back cello-piano track to user while introducing flute track and records flute as it responds to brain signals for three minutes. At this point, the user's brain has recorded all three instruments individually, creating a three minute cello-piano-flute composition, which the user has experienced hearing as it was incrementally created. At this point, the CM turns on recording for all three tracks simultaneously and records for three more minutes as the user's brain, consciously or unconsciously, adjusts to the input to achieve a desired audio result. The CM then stops the system, having facilitated the creation of a six minute composition produced by the user's mind.

Assisted, Targeted Operation (Mode 4): A user enjoys cello-piano-flute combination, so Audio engine is setup with three tracks, all of which will receive data over MIDI channel 1. The system is launched with selected ProcessingPlugIn and user hears output in real-time. In addition, initially a threshold file is created which indicates that every time the average power in the Alpha range is above 0.05 μV for over 500 ms in the octave, the pitch representing Alpha power will be raised one octave. Also, this value will be sent over MIDI channel 2, allowing the audio engine to treat this data with specific instrumentation. The CM adjusts the Audio Engine to place the flute track on channel 2, so it becomes the reinforcing instrument for this Alpha threshold. After three minutes, the CM introduces another threshold, indicating that every time the Beta range is below 0.07 μV for over 500 ms, the pitch representing Beta power will be lowered one octave. Also, this value will be sent over MIDI channel 3, allowing the audio engine to treat this data with specific instrumentation. The CM adjusts the Audio Engine to place the piano track on channel 3, so it becomes the reinforcing instrument for this Beta threshold. After observing the user's response for three minutes via the TCCS console, the CM notices difficulty achieving the Beta response, and changes the threshold target to target below 0.09 μV rather than 0.07 μV.

Mode 5: Playback, Unassisted, Untargeted Operation and Mode 6: Playback, Unassisted, Targeted Operation In either of these modes, a human file containing biometric data from a session where the user or users wore a headset and/or other biometric data capturing equipment, and the data was recorded, is opened and processed by the ThetaU Creative Circuit System (TCCS), such as, e.g., creative circuit system 1400 shown in FIG. 14.

Starting State: Before the data flow starts, the TCCS system must be started, initialized with values and algorithms as specified in the TCCS parameter file, and the Audio and Video engines specified in the TCCS parameter file must be running, waiting for input and also setup with desired parameters and configurations.

Processing: The Processing Plugin indicated in the TCCS parameter file is called for each sample found in the input file set. The output values are streamed to the Audio and Video Engines specified in the parameter file. Each engine renders appropriate audio and video output based on incoming data. In addition to applying the algorithms listed above as described for each TCCS parameter, in Targeted Mode, the system will check to see if rules described in Threshold file are met, and if so, will render appropriate output. In Untargeted mode, no changes are made to the output data programmatically. In playback mode, the targeting is obviously not going to have an effect on the input since it was pre-recorded; however, in this mode, it serves to introduce variety and possibilities for audio and visual highlighting of periods of the pre-recorded session where the brain was in a certain state.

Examples of Usage:

Unassisted, Untargeted Operation (Mode 5): A user enjoys cello-piano-flute combination, so Audio engine is setup with three tracks, each of which will receive data over MIDI channel 1. The system is launched with ProcessingPlugIn-1 as described above, and the pre-recorded data is read in, processed, and streamed to the audio and video engines. The audio and video output is recorded, resulting in a composition sourced by the biometric data.

Unassisted, Targeted Operation (Mode 6): As in example above, a cello-piano-flute combination is setup, and the system is launched with ProcessingPlugIn-1. In addition, a threshold file is created which indicates that every time the average power in the Alpha range is above 0.05 µV for over 500 ms in the octave, the pitch representing Alpha power will be raised one octave. Also, this value will be sent over MIDI channel 2, a channel reserved for targeted data, allowing the audio engine to treat this data with specific instrumentation. This results in a composition with a new source of variety compared to the untargeted example, where the brain state of higher Alpha is highlighted through instrumentation and the higher octave.

Mode 7: Playback, Assisted, Untargeted Operation and Mode 8: Playback, Assisted, Targeted Operation In either of these modes, a pre-recorded file containing biometric data from a session where the user or users wore a headset and/or other biometric data capturing equipment, and the data was recorded, is opened and processed by the ThetaU Creative Circuit System (TCCS), such as, e.g., the creative circuit system 1400 shown in FIG. 14.

Starting State: Before the data flow starts, the TCCS system must be started, initialized with values and algorithms as specified in the TCCS parameter file, and the Audio and Video engines specified in the TCCS parameter file must be running, waiting for input, and also setup with desired parameters and configurations. A human attendant, i.e. the Circuit Moderator (CM), is watching and potentially making changes through one or more of the control consoles of the TCCS, such as, e.g., a Processing PlugIn Console, Targeting PlugIn Console, Audio Engine Console, and Video Engine Console.

Processing: The Processing Plugin indicated in the TCCS parameter file is called for each sample found in the input file set. The output values are streamed to the Audio and Video Engines specified in the parameter file. Each engine renders appropriate audio and video output based on incoming data. In addition to applying the algorithms listed above as described for each TCCS parameter, in Targeted Mode, the system will check to see if rules described in Threshold file are met, and if so, will render appropriate output. In Untargeted mode, no changes are made to the output data programmatically. As system processing proceeds, the CM may modify parameters of any of the components, including changing values in the TCCS parameter file, changing instrumentation in the Audio Engine, changing parameters such as field of view or zoom level or animation speed in the Video Engine, or changing values in the Targeting file. All of these changes will take effect in real-time.

Examples of Usage:

Assisted, Untargeted Operation (Mode 7): A user enjoys cello-piano-flute combination, so Audio engine is setup with three tracks. CM starts session with only cello track active and uses an iterative loop approach with audio engine to introduce the remaining tracks. After three minutes of cello only, which is being recorded in real-time, CM introduces piano with "backing track" of initial cello, allowing creation of a piano track. CM records this piano track for three minutes. CM then plays back cello-piano track while introducing flute track and records flute as it responds to incoming signals for three minutes. At this point the user's brain has recorded all three instruments individually, creating a three minute cello-piano-flute composition. At this point, the CM turns on recording for all three tracks simultaneously and records for three more minutes. The CM then stops the system, having facilitated the creation of a six minute composition with various segments of the input file overlaid against one another.

Assisted, Targeted Operation (Mode 8): A user enjoys cello-piano-flute combination, so Audio engine is setup with three tracks, each of which will receive data over MIDI channel 1. The user is also interested in highlighting their periods of high relaxation. After doing a dry run in unassisted mode and observing the average brain wave activity via the TCCS console, the CM creates a threshold file which indicates that every time the average power in the Alpha range is above 0.05 µV for over 500 ms in the octave, the pitch representing Alpha power will be raised one octave. Also, this value will be sent over MIDI channel 2, allowing the audio engine to treat this data with specific instrumentation. The CM adjusts the Audio Engine to place the flute track on channel 2, so it becomes the reinforcing instrument for this Alpha threshold. The CM runs the system with this threshold file in place and then changes the instrumentation by moving the piano to track 2, so both flute and piano react to the periods where the Alpha was higher. The CM, perhaps listening along with the patient, decides that this is the best instrumentation mapping and runs the system while recording the output, to have a completed composition to give to the user as an MP3 file.

Mode 9: Playback, Post-Processing Operation

In this mode, the biometric data from a recorded session can be processed in multiple passes, running the TCCS repeatedly with different parameter settings. For instance, in one run, note length might be set to 8, key to the key of D, and Tonal center to D. This will generate a set of MIDI files that can be imported into Logic Pro, or other Audio Engine, and laid against one another, and also a set of 3D model files that can be imported into Unity, or other Visual Engine. The 3D models are created using functions similar to those described for audio, with the output of each run of the processing plugin being a vertex or face, for example, as described in the OBJ file format developed by Wavefront Technologies. The resulting OBJ files can be imported into Unity. In another run, note length might be set to 4, key to the key of D, and tonal center to E, creating a Dorian Mode effect. All of the resulting MIDI and OBJ files can be used in combination. Also, this mode can be combined with any of the other modes above. For instance, a run could be done which generates OBJ and MIDI files; Logic Pro and Unity could be pre-loaded with these artifacts, creating a Unity Scene background; and then a playback, unassisted, targeted run (i.e. mode 6) could occur that animates this scene and overlays audio to the existing MIDI.

Note that in all modes of operation, interaction with musicians playing standard instruments is possible, whereby ensembles are reacting to the music produced by these instruments, which changes the brain output, which is heard by those musicians and which they can respond to, forming a creative circuit in this manner. Creative circuits can also be formed by a player with his own rendered brain output, by a player with the rendered output of others, including audience members, or by a player with others around him who are producing auditory or visual stimulation.

FIGS. 17A and 17B depict a table 1700 summarizing several possible examples of how a given creative circuit system (such as, e.g., the system 100 shown in FIG. 1) can be setup and used, in accordance with embodiments. It should be appreciated that the table 1700 does not provide an exhaustive list of uses and that other uses are also contemplated. Also, while the examples provided in table 1700 use EEG data, all examples could be setup with other biometric data input such as, e.g., heart rate, blood pressure or galvanic skin response, using techniques described herein.

Thus, the techniques described herein include a system capable of creating and using a static or dynamically changing "vocabulary," predefined or generated in real-time, from live input and/or existing audio sources, as a common base to enable merging of bio/neurometric data from multiple people or sources (including previously generated brain wave or other bio/neurometric data files or data from animals) and generating a collaborative output that provides a coherent audio and/or visual result based on this common vocabulary. Possible use cases for such a system include, for example, a compositional system (where original music is composed from bio/neurometric data source); a live performance allowing the combination of live instruments, pre-recorded sources, and bio/neurometric data; therapeutic applications where, for instance, teams in a business setting learn about collaboration through creating a composition together, with each providing different brain wave contributions to the whole, which is used as a metaphor for working out roles and functions within the group; and "humanization" of computer generated audio to add variety for performers using such audio to accompany themselves.

Figure 19:
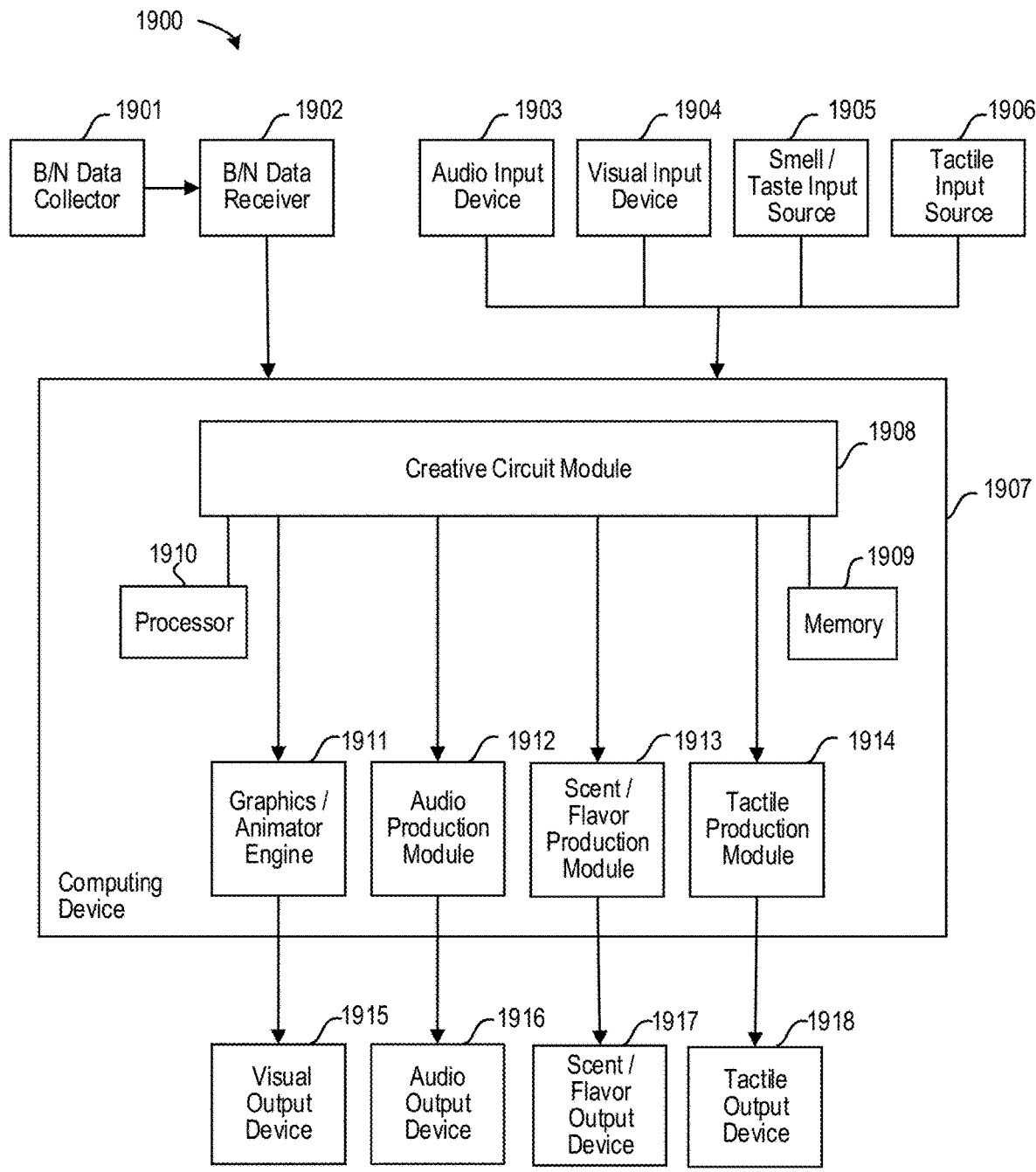
FIG. 19 is a block diagram depicting a system comprising an exemplary creative circuit module configured to collect bio/neurometric data and produce coherent output based thereon in various sensory formats, in accordance with embodiments.

As further explained, the concepts of the above-described invention may be modified and adapted to apply to all of the five human senses. FIG. 19 provides a schematic overview of a system 1900 that can generate input from bio/neurometric data merged with user provided content. Bio/Neurometric data collector 1901 (or B/N data collector), such as, for example a neuroheadset from Muse Corporation, sends brainwave data to a bio/neurometric data receiver 1902 (or B/N data receiver), such as, for example, an application running on an Android or IOS device. This data is routed to a computing device 1907 executing creative circuit module 1908. Additionally, data from audio input device 1903, visual input device 1904, smell/taste input source or device 1905, and tactile input source or device 1906 are optionally routed to the computing device 1907 for use by the creative circuit module 1908.

The creative circuit module uses processor 1910 of the computing device 1907 to execute algorithms selected from memory 1909, also included in computing device 1907, in conjunction with a parameter file to determine appropriate output for each of the senses (sight, sound, taste, smell, touch) and sends data to the appropriate production module (e.g., as shown in FIG. 24). Graphics generation data goes to the graphics/animator engine 1911, audio generation data goes to the audio production module 1912, smell and taste data goes to the scent/flavor production module 1913, and tactile data goes to the tactile production module 1914. These modules, in turn, direct output to devices that can present to the user(s), namely, visual output device 1915, audio output device 1916, smell/taste output device 1917, and tactile output device 1918.

Figure 20:
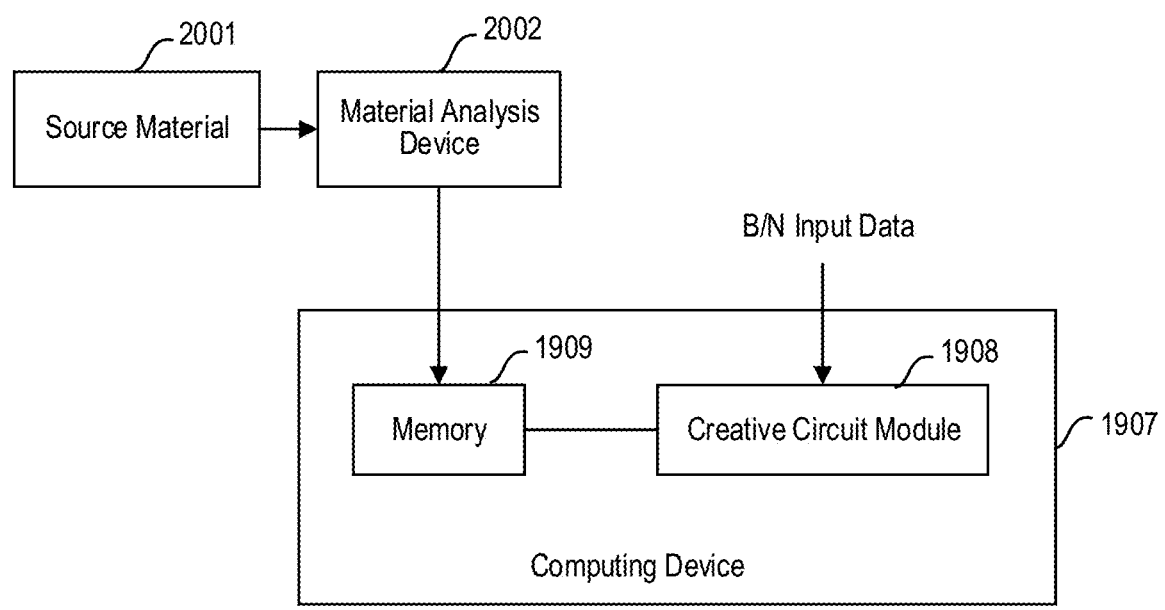
FIG. 20 is block diagram illustrating aspects of the system of FIG. 19 for evaluating source materials, in accordance with embodiments.

FIG. 20 illustrates an exemplary creative circuit module 1908 comprising various software components for implementing processing of incoming bio/neurometric data and a source material 2001, which could be any liquid, solid, or gas, that is provided as an input to a material analysis device 2002. A material analysis device is any device that can determine the chemical composition of a liquid, solid, or gas. One example would be a gas chromatography device that does comprehensive two-dimensional gas chromatography with software interfaces, for example, as described at https://www.ncbi.nlm.nih.gov/pmc/articles/PMC7644112/, and produced by companies such as Agilent Technologies, such as the gas chromatography device described at https://www.agilent.com/en/product/gas-chromatography. Gas chromatography can be combined with mass spectrometry for a more accurate analysis. The process begins by loading an input compartment of the material analysis device 2002 with the substance or source material 2001 being analyzed, such as, for example a commercially available vegetable smoothie mixture. The material analysis device 2002 produces a digital list of the chemicals, elements, and/or compounds that are contained in the source material 2001, which is stored in memory 1909 and available to creative circuit module 1908. In a later step, this list can be provided as an input to the creative circuit module 1908.

This is not necessarily a real-time process, as gas chromatography/mass spectrometry takes time on the order of minutes or hours rather than milliseconds or seconds in current implementations, although it could become real-time as the technology improves. The list may take the form of an array containing the names of the elements or compounds isolated by the analysis process and their percentages within the input source, for example sodium 5%. The output can also be subjectively post-processed by a human or automated process into higher level categories of scent or flavor, for example sweet 10%, indicating 10% of the input source contains elements or compounds that fall in the sweet category.

Figure 21:
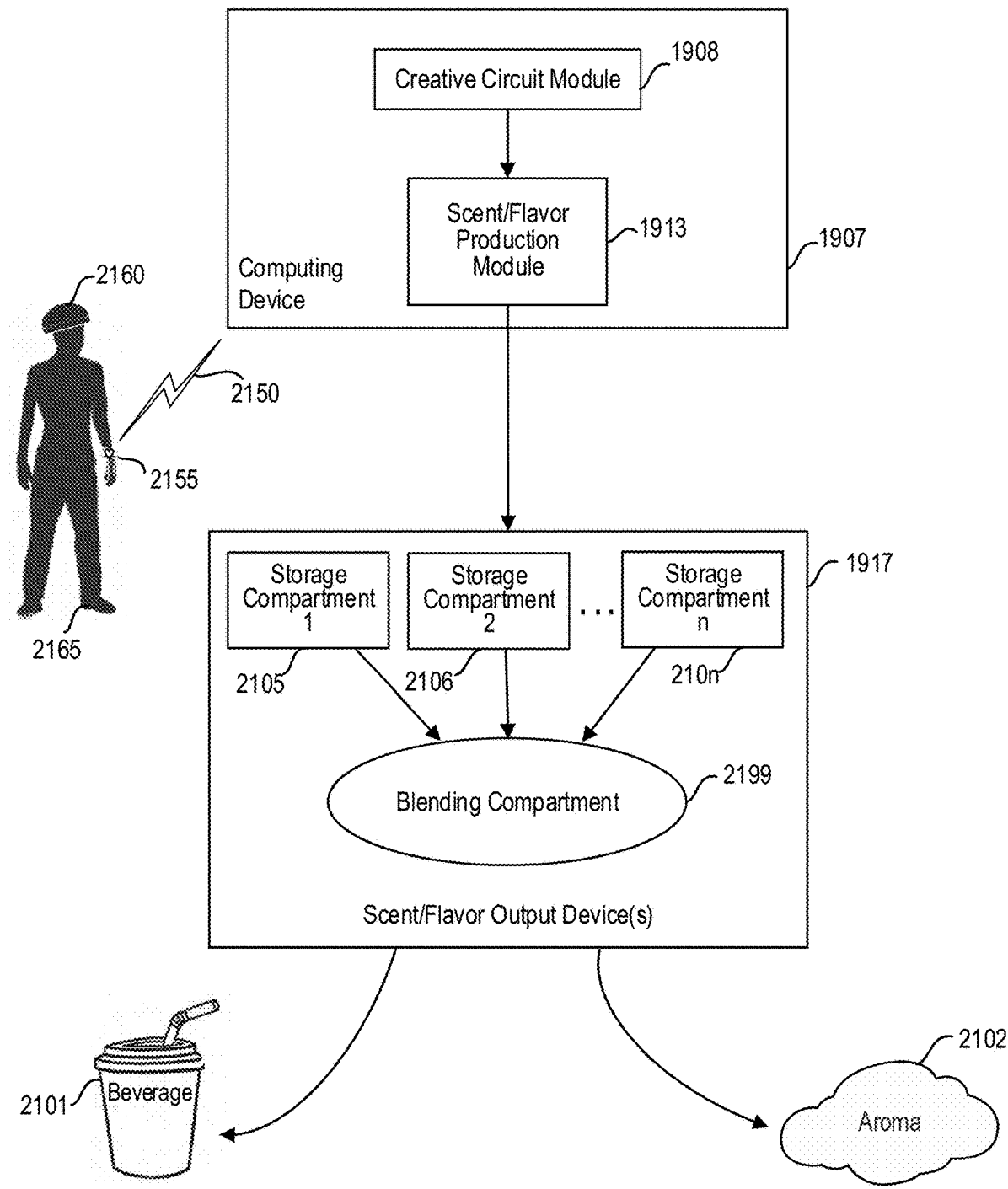
FIG. 21 is a block diagram illustrating aspects of the system of FIG. 19 for evaluating and producing scents and/or flavors, in accordance with embodiments.

FIG. 21 provides a schematic overview of the flow to support the production of a scent or flavor. The scent/flavor production module 1913 is a software component that is capable of acting as a controller of one or more smart scent/flavor output devices 1917. The scent/flavor production module 1913 receives instructions for operation via data messages from the creative circuit module 1908 (as also shown in FIG. 19). These messages instruct the scent/flavor production module 1913 to send the appropriate commands to a particular scent/flavor output device 1917 to output a specific flavor (such as the flavor for beverage 2101) or scent (such as the scent for aroma 2102). An example of a scent/flavor output device is the Bartendro drink machine with software control, as described at https://partyrobotics.com/collections/products.

FIG. 21 shows a scent/flavor production module 1913 that is software module capable of sending command and control data to scent/flavor output device 1917 over a wired or wireless interface. The n number of storage compartments (2105, 2106 . . . 210n) in the scent/flavor output device 1917 can be pre-loaded with substances that were manually or automatically chosen through the process described in association with FIG. 20. In particular, scent/flavor production module 1913 may be configured to generate a control sequence and provide it to scent/flavor output device 1917. The control sequence may instruct scent/flavor output device 1917 to emit a specific amount of the substance in a given storage compartment. The protocol used by each scent/flavor output device 1917 may be specific to the manufacturer of that scent/flavor output device 1917; thus, the scent/flavor production module 1913 may be manufacturer-specific as well. For instance, a manufacturer of a "Smart" drink-making device (a type of scent/flavor output device 1917) may require that commands be sent in a specific json data format over a Bluetooth connection with a protocol defining what json element names are used for each operation. For instance, sending {["Release", 2106, 100]} could be a command sent from scent/flavor production module 1913 to the scent/flavor output device 1917 telling it to release 100% of the contents in compartment 2106 into blending compartment 2199. After sending a set of commands that load blending compartment 2199 from one or more storage compartments 2105, 2106, and/or 210n, scent/flavor production module 1913 may instruct the scent/flavor output device 1917 through another command sequence to distribute the blended result as an output such as, for example, beverage 2101 or aroma 2102.

Data contained in the parameter file used by the creative circuit module 1908 (see FIG. 20) indicates what substance is present in each compartment of scent/flavor output device 1917. Hence, combining the processes defined in FIGS. 19-21, an example could be as follows: An off the shelf beverage such as a vegetable smoothie could be analyzed as in FIG. 20, and a list of ingredients and percentages could be generated. This list could be post-processed by human or automated means to produce a file containing representative output percentages of various taste categories, for instance {[{Bitter, 10%}, {Sweet, 5%}, {Salty, 2%}]}. Storage compartments 2105, 2106 and 201n in scent/flavor output device 1917 (FIG. 21) could be loaded with bitter, sweet and salty substances, respectively. The vocabulary in this case is therefore [bitter, sweet, salty]. The creative circuit module 1908 could be configured to drive the scent/flavor production module 1913 based thereon, thereby producing drinks with varying percentages of bitterness, sweetness and saltiness, with variation driven by parameters defined in a parameter file and algorithms defined in a processing plug-in (e.g., as shown in FIG. 24).

Different scent/flavor output devices will have different capabilities, and might be entirely different in function. For instance one could be a smart aromatherapy delivery device with the capability to deliver six different aromas while another could be a smart beverage making device with the capability to deliver a beverage based on the combination of liquids in ten different storage compartments. This is accommodated by the given architecture of a particular embodiment of the invention. So the parameter file could contain a variable scent/flavor output device-type. For scent/flavor output device-type="DrinkMaker1," the AlphaFlavorScentMultiplier parameter could define the influence of the Alpha wave EEG power over the amount of the liquid in storage container 210n that will be included in an output beverage. For scent/flavor output device-type="AromaTherapy1," the AlphaFlavorScentMultiplier parameter could define the influence of the Alpha wave EEG power over the amount of scent in storage container 210n (for example) that is used in an output aroma. In both cases creative circuit module 1908 would send a message to scent/flavor production module 1913 (with the logic to send this command implemented in a processing plug-in, as previously described), and the scent/flavor production module 1913 would send the appropriate control command to the scent/flavor output device 1917 for that particular device.

Regarding the protocol used to communicate from the scent/flavor production module 1913 to a scent/flavor output device 1917, an example of an appropriate protocol to implement for message passing is Open Sound Control (OSC), described previously and also proposed for use in communicating between the visual output production module (or graphics/animator engine 1911) and the visual output device 1915, as shown in FIG. 19. As described earlier, although the name OSC implies a reference to sound in particular, this protocol is designed to allow for a user-defined message set, which can have nothing to do with sound, as in this case. So for instance, a message can be passed from creative circuit module 1908 to the scent/flavor production module 1913 such as ["Release", 1, 0.5], which will indicate that 0.5 of the contents of storage compartment 1 (or compartment 2105 in FIG. 21) should be released. The scent/flavor production module 1913 will interpret this appropriately based on the type of scent/flavor output device 1917 it is controlling. The communication between scent/flavor production module 1913 and scent/flavor output device 1917 will be manufacturer-specific and may or may not use a standard such as OSC (although, for convenience, that usage is shown as OSC herein).

As further shown in FIG. 21, the system 1900 can also receive input from a human subject, such as bio/neurometric data generated by a subject 2165, and use it in combination with the components needed to generate a scent or flavor based on the combination of the bio/neurometric data and previous analysis of a given input source material 2001, or materials. The source material 2001 may be chosen based on input, such as foods, drinks, and/or scents the human subject 2165, or subjects, have expressed a liking for. As described in association with FIG. 20, the material analysis device 2002 analyzes each substance or source material 2001 and produces a list of chemicals, elements, and/or compounds that make up the source material(s) 2001. This information is stored in memory 1909. The storage compartments 2105 to 210n (indicating some variable "n" quantity) of the scent/flavor output device 1917 are loaded with chemicals, elements, and/or compounds that are going to make up the output scent or flavor based on this analysis. One possible flow is as follows: Human subject 2165 wears a neuro headset 2160 (such as a MUSE headset) as well as a heart rate or heart rate variability (HRV) monitor 2155 with wireless capability (such as a Fitbit or Apple watch). Data from these devices is transmitted over Bluetooth or other network protocol through the bio/neurometric data collector 1901 to the bio/neurometric data receiver 1902 (as shown in FIG. 19) and then to the creative circuit module 1908 within computing device 1907 via wireless connection 2150. Creative circuit module 1908 will use this data in conjunction with a parameter file stored in memory 1909 to determine a set of output values to send to scent/flavor production module 1913.

One way of having bio/neurometric data influence the scent/flavor output is to have the percent of each material in the compartments of the scent/flavor output device 1917 used to output a final scent or flavor be determined partially or completely by the bio/neurometric data. The parameter file is used to determine how the bio/neurometric data will affect the output values. For instance, in a particular embodiment, the file contains a parameter called "ThetaInfluenceArray," which is an integer array representing how much the amplitude of brain waves in the theta range are to affect the level of output of the chemical, compound, and/or element, and with which compartment, as indicated by the index of the array. So the higher this value, the more the amplitude of brain waves in the theta range affects the percentages used to determine the composition. In a particular embodiment, the weighting scale is 0-100 and there is also an AlphaInfluenceArray. In a particular embodiment, a value in ThetaInfluenceArray[2105] of 50 and AlphaInfluenceArray

[2105] of 50 indicates that the level of output from compartment 2105 in the scent/flavor output device 1917 should be 50% determined by the amplitude of brain waves in the Theta range and 50% determined by the amplitude of brain waves in the Alpha range. This is just an example of how the algorithm used in creative circuit module 1908 can be made flexible through the use of parameter data. FIG. 26 provides examples of other parameters that may be used for flavor/scent outputs, as described herein.

Once creative circuit module 1908 has determined the percentages to use of the substances in each compartment of the scent/flavor output device 1917, it sends this data to scent/flavor production module 1913, which is configured to provide instructions to the scent/flavor output device 1917. Based on these control instructions from the scent/flavor production module 1913, scent/flavor output device 1917 combines the materials in the compartments it has available in a specific manner and proportions unique to that individual, and outputs a chemical, element, and/or compound (2101 or 2102, for example) that the user can either taste or smell or both.

Figure 22:
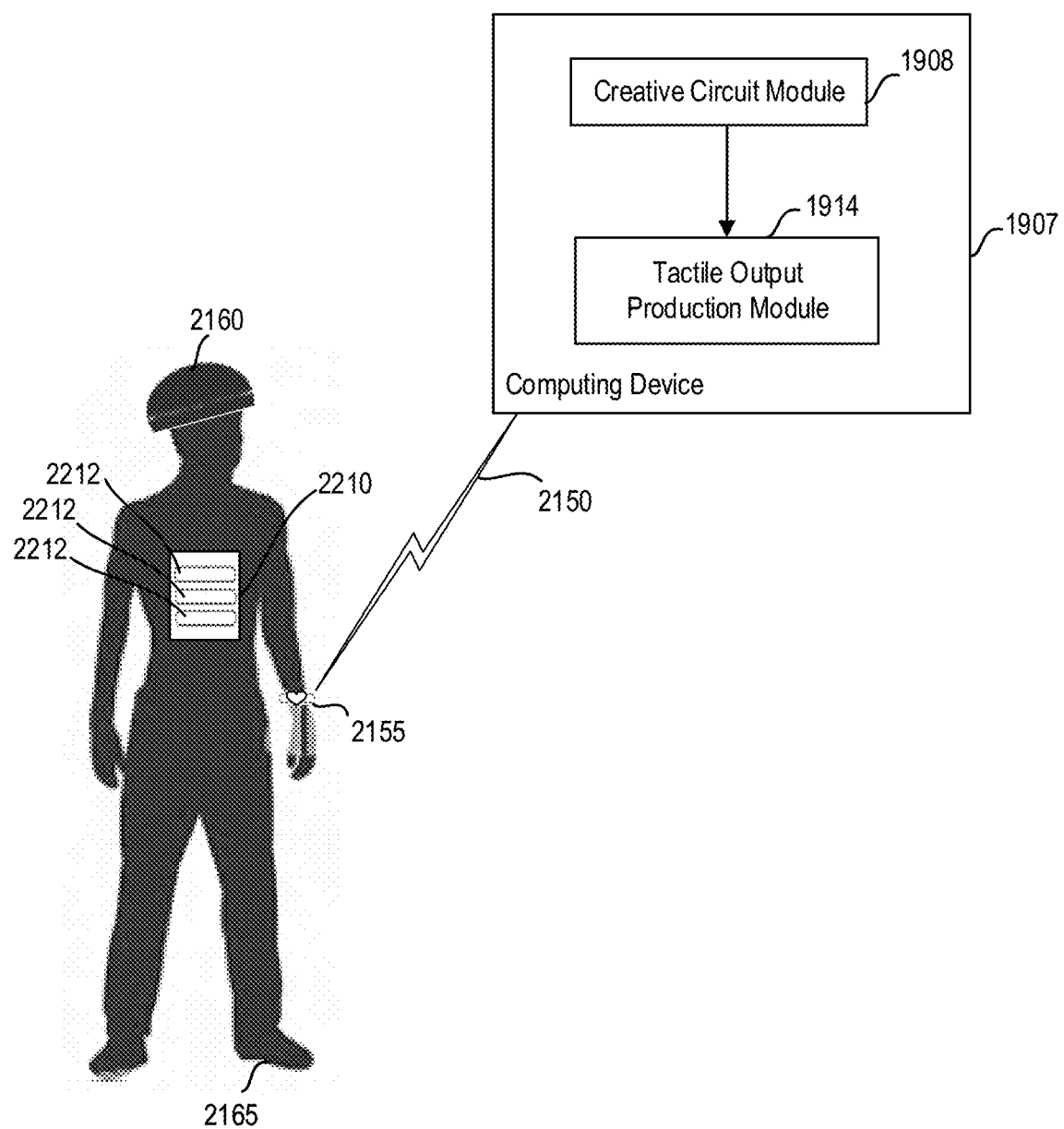
FIG. 22 is schematic diagram illustrating interaction of a user with a tactile production module of the system of FIG. 19 to generate a unique tactile sequence, in accordance with embodiments.

In addition to audio, video, and taste/scent experiences, the system 1900 supports generation of tactile experiences. FIG. 22 provides an overview of the interaction between the human subject 2165, bio/neurometric data generated by the subject, and the components needed to generate a tactile experience based on the combination of the B/N data and input parameters describing a user's preferred level and type of tactile experience.

As shown in FIG. 22, the system 1900 may comprise a tactile production module 1914, which is a software module capable of sending command and control data to a tactile output device 1918, such as, e.g., tactile output device 2210 shown in FIG. 22, via a wired or wireless interface. The illustrated tactile output device 2210 includes three pressure delivery strips 2212 that can deliver pressure to a user's back. In one implementation, these strips 2212 are individually controlled by commands sent to the tactile output device 2210 via a Bluetooth connection 2150. In particular, tactile production module 1914 may be configured to generate a control sequence and send it to tactile output device 2210. The control sequence may instruct tactile output device 2210 to start, stop, or change the speed or pattern of a given pressure delivery strip 2212 on the tactile output device 2210. One example of a "smart" back massager with settings that may be controlled by the tactile production module 1914 is described at https://www.jialekangmassager.com/new-multi-functions-massage-cushion-chair-massage-pad-luxury-back-massager-with-jade-heads-and-bluetooth_p2.html. The protocol used by tactile output device 2210 may be specific to each tactile output device manufacturer, so the tactile production module 1914 may be manufacturer-specific as well. For instance, a manufacturer of a "smart" back massager may require that commands be sent in a specific j son data format over a Bluetooth connection, with a protocol defining what j son element names are used for each operation. For instance, in a particular embodiment, the array {["Start", 1, 5]} is a command sent from the tactile output device 2210 to the tactile production module 1914 telling it to start sending pulses from the first pressure strip at a speed of 5 pulses/second. A given manufacturer's tactile output device 2210 could also have the capability to delivery heat from the pressure delivery strips 2212, or to activate pulses of delivery in a pattern around the strips 2212. All of these capabilities could be controlled by a network protocol understood by the tactile production module 1914.

Computing device 1907 of FIG. 22 contains components identical to those shown in FIG. 19, including memory 1909, processor 1910, and creative circuit module 1908. Tactile production module 1914 is a software component that could be running on the same system 1900 as creative circuit module 1908, and is also shown in FIG. 19 as an option. In some embodiments, the tactile production module 1914 could be a separate object rather than integrated into the computing device 1907, in which case tactile production module 1914 would have its own computing capability (e.g., memory, processor, and/or storage). The creative circuit module 1908 communicates with tactile production module 1914. One possible dataflow is as follows: Human subject 2165 wears the neuro headset 2160 (such as a MUSE headset) as well as a heart rate/HRV monitor 2155 (such as a Fitbit or Apple watch). Data from these devices is transmitted over Bluetooth or other network protocol 2150 through the bio/neurometric data collector 1901 to the bio/neurometric data receiver 1902 (as shown in FIG. 19) and then to creative circuit module 1908 (a software component within computing device 1907. The subject 2165 is wearing tactile output device 2210 against his back, or other body part). Creative circuit module 1908 will use this data in conjunction with a parameter file stored in memory 1909 to determine a set of output values to send to tactile production module 1914.

One way of having bio/neurometric data influence the tactile output is to have the strength of vibration of different strips 2212 (or pads) be controlled by different parameters, such that pad 1 could be controlled by changes in heart rate intensity, pad 2 could be controlled by changes in heart rate variability, and pad 3 could be controlled by changes in amplitude of brain waves in the Beta range, for example. The parameter file can be used to determine how the bio/neurometric data will affect the output values. For instance, in a particular embodiment, the file contains a parameter called "HRTactileMultiplier," which is an integer that is used to determine a speed of pad 1. For example, Heart Rate×HRTactileMultiplier1 is the number of vibrations per minute for pad 1. FIG. 25 lists more examples of parameters that may be used for tactile outputs, as described below.

Different tactile output devices will have different capabilities, and might be entirely different in function. For instance, in some embodiments, a "Smart" glove delivers pressure or temperature changes to each finger. This is accommodated by the architecture. So the parameter file could contain a variable tactile output device-type, which indicates the type of tactile output device. For tactile output device-type="BackMassager1," the HRTactileMultiplier1 described above may refer to pressure delivery strip number 1 on back massage tactile output device 2210, while for tactile output device-type="Glove1," the HRTactileMultiplier1 may refer to finger #1. In both cases the creative circuit module 1908 would send a message to tactile production module 1914 (with the logic to send this command implemented in a processing plug-in as previously described), and tactile production module 1914 would send the appropriate control command to the tactile output device 2210 for that particular device.

Regarding the protocol used to communicate between tactile production module 1914 to tactile output device 1918 or 2210, an example of an appropriate protocol to implement for message passing is Open Sound Control, as described previously and also proposed for use in communicating between the visual output production module (or graphics/animator engine 1911) and the visual output device 1915.

Although the name open sound control implies a reference to sound in particular, this protocol is designed to allow for a user-defined message set, which can have nothing to do with sound, as in this case. So for instance, a message can be passed from the creative circuit module 1908 to tactile production module 1914 such as ["PulseSpeed", 1, 5], which would indicate to set the pulse speed on pressure delivery point 1 to "5". Similarly, a command such as ["PressureAndHeat", 1, 0.5, 80.0] would indicate to set the delivery pressure to 0.5 strength and temperature to 80.0 degrees Fahrenheit for pressure delivery point 1. Tactile production module 1914 will interpret this appropriately based on the type of tactile output device 1918 it is controlling. The communication between tactile production module 1914 and the tactile output device 1918 will be manufacturer-specific, and may or may not use a standard such as Open Sound Control.

Figure 23:
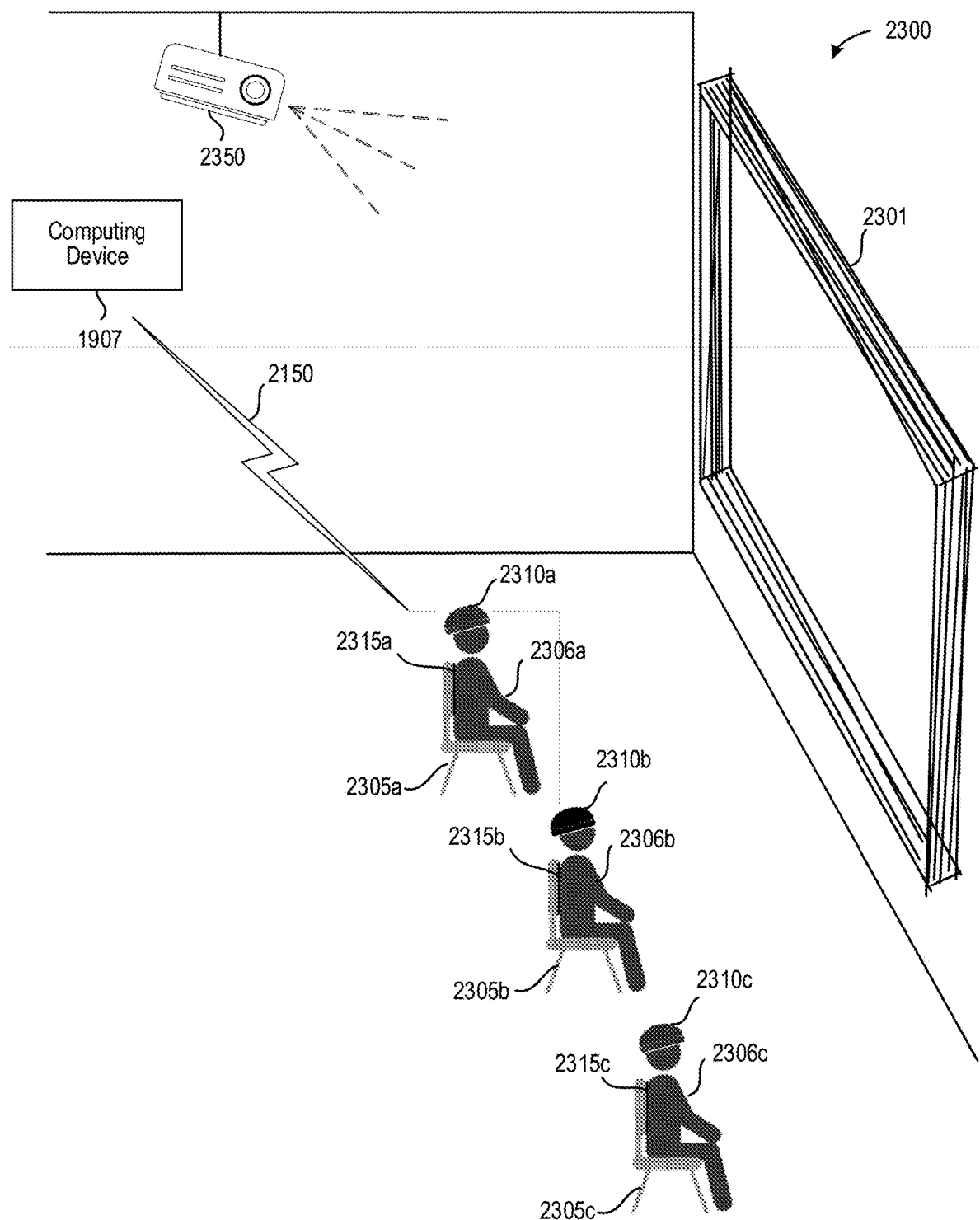
FIG. 23 is a schematic diagram illustrating use of the tactile production module of FIG. 22 with multiple users to combine tactile input data, in accordance with embodiments.

All scenarios discussed thus far can be used with either one human subject or multiple human subjects providing bio/neurometric data and/or receiving the specified sensory experience. To illustrate this, FIG. 23 provides an example of use of the system 1900 in a group setting, combining both visual and tactile components. FIG. 23 depicts a theater 2300 with a projection screen 2301 and a visual output device 1915, or in this case, a smart projector 2350 that projects images on the screen 2301. Human subjects 2306a, 2306b, and 2306c sit in seats 2305a, 2305b, and 2305c which are outfitted with tactile output devices 2210 in the form of back massagers 2315a, 2315b, and 2315c, respectively. Bio/neurometric data obtained from neuro headsets 2310a, 2310b, and 2310c worn by the users 2306a, 2306b, and 2306c respectively (and possibly also heart rate monitors (not shown)) is transmitted over a WIFI or other wireless network connection 2150 to computing device 1907, which houses the components shown within it in FIG. 19. Creative circuit module 1908 will use the aggregated data from all users in conjunction with a parameter file stored within memory 1909 to determine digitized visual output data to project on screen 2301. Data from all users could be averaged, or min/max, median approaches could be used by the algorithm in creative circuit module 1908, as influenced by the parameter file with Booleans such as useMin, UseMax or UseMedian. The computing device 1907 would also contain the software component for communication with the back massagers 2315a, 2315b, and 2315c in the seats 2305a, 2305b, and 2305c and thusly, aggregated data could also control both the visual and the tactile experience of the seated human subjects 2306a, 2306b, and 2306c, respectively.

Usage examples of the disclosed invention covering different senses are as follows:

Sound: A user listens to a piece of music generated by a MIDI stream from either a MIDI file or a live performance (with the performer or performers using MIDI-capable instruments. MIDI monitoring software is used to capture the MIDI stream, including the MIDI control messages. The piece is presented to the user in sections. As she is listening, the user notes her level of enjoyment of each section. The captured MIDI stream plus the user's feedback is used to create a vocabulary and set parameters that will be used to create new content (e.g., as shown in FIG. 28). In addition to pitch and velocity, attributes such as vibrato and reverb can be part of the vocabulary controlled by use of the MIDI control message. The user is outfitted with biometric data capturing equipment, and the system generates new content from this vocabulary and parameters.

Sight: Using a computer-based object and shape recognition system, a painting or video is analyzed, and the "vocabulary" of the painting/video is extracted (e.g., as shown in FIG. 28). Size, shape, angle values, hue, saturation, and chroma can all be part of the vocabulary, as well as speed and direction in the case of animation. This vocabulary is employed along with parameters set and varied during playback according to user and operator choice. The user is outfitted with biometric data capturing equipment, and a computer graphics/animation system generates new visual content from this vocabulary and parameters.

Smell and/or Taste: The scent coming from different areas of a field of flowers is analyzed to determine the chemical makeup of the volatile organic compounds in the air that create the scents. The user's subjective report of the scents in the air is also recorded and his preference for which scents he enjoys most. The user is outfitted with biometric data capturing equipment, and the information from the analysis plus the user's feedback is used to create a vocabulary and set parameters that will be used to create aromas, generated by a computer controlled aromatherapy device (e.g., as shown in FIG. 28). This device is loaded with chemical compounds determined by the vocabulary. Alternatively, a drink the user enjoys could be analyzed to determine the chemical compounds that create the taste. The user is outfitted with biometric data capturing equipment, and the information from analysis plus the user's feedback is used to create a vocabulary and set parameters that will be used to create a custom drink generated by a computer-controlled cocktail-making device loaded with liquids based on the vocabulary.

Touch: Just as a vocabulary can be created for use in audio, visual, taste, and scent experiences, a tactile vocabulary can be defined (e.g., as shown in FIG. 28). In the case of a massage device, the tactile vocabulary may be expressed as temperature, pressure level, rate of pressure delivery (pressure pulses/second), location of pressure delivery or style (sequential across pressure delivery points in a predefined sequence or random). To define a custom vocabulary that matches his preferences, a user could operate a back massage device with an ability to deliver varying temperature, pressure, and rate, and the settings the user enjoys can be captured. These settings would be entered into a parameter file. The file could map the types of massage delivery the user enjoys to brain and/or body states such that, for example, when a target power of theta at a given electrode site or a given heart rate or HRV level is hit, the system responds with a given massage and/or temperature (or heat) mode.

FIG. 24 illustrates a table 2400 with examples of how values in the TCCS parameter file can determine which targeting plug-in, processing plug-in, audio engine, and/or video or visual engine to use during operation of the system 1900, in accordance with embodiments. The table 2400 may be similar to the table 1500 shown in FIG. 15 to illustrate the configurable nature of the plug-in architecture described herein. In particular, the table 2400 lists the name of exemplary TCCS parameters, a description of each, and an explanation of how each parameter is used in tactile outputs and flavor/scent outputs. In table 2400, the given TCCS parameter may be used in the tactile output to influence data values passed to the tactile output production module, for example, via OSC or other data streaming protocols, and may be used in the scent/flavor output to influence data values passed to the scent/flavor production module, for example, via OSC or other streaming data protocols.

To further illustrate what an exemplary plug-in may look like, FIG. 25 depicts a table 2500 that describes an exemplary set of parameters (e.g., TCCS parameters) and shows how these parameters could be used within an exemplary processing plug-in for generating tactile outputs. Similarly, FIG. 26 illustrates a table 2600 describes an exemplary set of parameters (e.g., TCCS parameters) and shows how these parameters could be used within an exemplary processing plug-in for generating flavor/scent outputs. The tables 2500 and 2600 may be similar to, and used in a similar manner as, the table 1600 shown in FIGS. 16A, 16B, and 16C, except for producing tactile or flavor/scent outputs.

FIG. 27 depicts a table 2700 summarizing several possible examples of how a given creative circuit system (such as, e.g., the system 1900 shown in FIG. 19) can be setup and used, in accordance with embodiments. It should be appreciated that the table 2700 does not provide an exhaustive list of uses and that other uses are also contemplated. Also, while the examples provided in table 2700 use EEG data, all examples could be setup with other biometric data input such as, e.g., heart rate, blood pressure or galvanic skin response, using techniques described herein.

FIG. 28 depicts a table 2800 that lists various sensory experience categories that may be used by the system 1900 of FIG. 19 and exemplary vocabulary elements and methods of vocabulary formation for each category, as well as examples of a delivery mechanism for each category. As will be appreciated, the table 2800 is a non-exhaustive list and other vocabulary elements, formation methods, and/or delivery mechanisms may be used.

In the context of this document, a "computer-readable medium" may be any means that can store, communicate, propagate, or transport data objects for use by or in connection with the system 100, or any other systems described here. The computer readable medium may be for example, an electronic, magnetic, optical, electromagnetic, infrared, or semiconductor system, apparatus, device, propagation medium, or any other device with similar functionality. More specific examples (a non-exhaustive list) of the computer-readable medium would include the following: an electrical connection (electronic) having one or more wires, a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and stored in a computer memory. Portions of the systems, modules and/or processes described herein can be embodied in any type of computer-readable medium for use by or in connection with an instruction execution system or apparatus, such as a computer.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

It will be understood by those skilled in the art that various changes may be made and equivalents may be substituted without departing from the scope of the novel and non-obvious techniques disclosed in this application. Therefore, it is intended that the novel teachings of the invention not be limited to the particular embodiments disclosed, but that they will include all embodiments falling within the scope of the appended claims.

What is claimed is:

1. A method of creating a coherent output based on biometric and/or neurometric data using a computing device comprising one or more processors and memory, the method comprising:
receiving a first incoming signal from a first bio-generated data sensing device worn by a user;
receiving, from a sensory input system, a first input signal representing sensory content experienced by the user in association with generation of the first incoming signal;
using the one or more processors, populating a common vocabulary with one or more values determined based on the first input signal, the common vocabulary being stored in the memory;
determining, using the one or more processors, a first set of output values based on the first incoming signal, the common vocabulary, and a parameter file stored in the memory, the common vocabulary comprising a list of possible output values, and the parameter file comprising a set of instructions for applying the common vocabulary to the first incoming signal to derive the first set of output values;
generating, using the one or more processors, a first output array comprising the first set of output values; and
providing the first output array to an output delivery system configured to render the first output array as a first sensory output.

2. The method of claim 1, wherein the first sensory output is a tactile output comprising vibrations determined based on the first output array, and the output delivery system comprises one or more vibration output devices for generating the vibrations.

3. The method of claim 1, wherein the first sensory output is an aroma output having a scent determined based on the first output array, and the output delivery system comprises one or more scent output devices for generating the scent.

4. The method of claim 1, wherein the first sensory output is a consumable item having a flavor determined based on the first output array, and the output delivery system includes one or more flavor output devices for generating the flavor.

5. The method of claim 1, wherein the sensory input system comprises a tactile input source, and the sensory content is vibratory content applied to the user, the first input signal including first data identifying a pressure level of the vibratory content and second data identifying a temperature level of the vibratory content.

6. The method of claim 1, wherein the sensory input system comprises a material analysis device, and the sensory content is a source material consumed by the user, the first input signal comprising data identifying one or more components of the source material.

7. The method of claim 1, wherein the first bio-generated data sensing device is a monitor configured to collect heart rate intensity or heart date variability data of the user.

8. The method of claim 1, wherein the first bio-generated data sensing device is a headset configured to collect electroencephalography ("EEG") signals of the user.

9. The method of claim 1, further comprising:
receiving a second incoming signal from a second bio-generated data sensing device worn by the user;
determining, using the one or more processors, a second set of output values based on the second incoming signal, the common vocabulary, and the parameter file, wherein the parameter file further comprises a set of instructions for applying the common vocabulary to the second incoming signal;
generating, using the one or more processors, a second output array comprising the second set of output values; and
providing the second output array to the output delivery system, the output delivery system further configured to render the second output array as a second sensory output.

10. The method of claim 1, further comprising:
receiving a second input signal, from an audio/visual input system, representing audio content produced by the user during receipt of the first incoming signal;
populating the common vocabulary based further on the second input signal using a spectral analyzer and the one or more processors;
determining, using the one or more processors, a third set of output values based on the first incoming signal, the common vocabulary, and the parameter file;
generating, using the one or more processors, a third output array comprising the third set of output values; and
providing the third output array to the output delivery system, the output delivery system further configured to render the third output array as an audio output.

11. The method of claim 10, wherein the third set of output values comprises Musical Instrument Digital Interface ("MIDI") data.

12. The method of claim 1, wherein the common vocabulary is populated with values determined based on different types of sensory experiences, the first input signal being associated with a first sensory experience, and the output array being associated with a second sensory experience that is different from the first sensory experience.

13. A system, comprising:
a bio-generated data sensing device worn by a user and configured to detect a first electrical signal representing biometric and/or neurometric data of the user;
a sensory input system configured to provide a first input signal representing sensory content experienced by the user in association with detection of the first electrical signal;
a memory configured to store a parameter file and a common vocabulary;
one or more processors configured to:
receive the first input signal from the sensory input system;
populate the common vocabulary with one or more values determined based on the first input signal;
determine a first set of output values based on the first electrical signal, the common vocabulary, and the parameter file, and
generate a first output array comprising the first set of output values; and
an output delivery system configured to render the first output array as a first sensory output,
wherein the common vocabulary comprises a list of possible output values, and the parameter file comprises a set of instructions for applying the common vocabulary to the first electrical signal to derive the first set of output values.

14. The system of claim 13, wherein the bio-generated data sensing device is a headset configured to collect electroencephalography ("EEG") signals of the user.

15. The system of claim 13, wherein the bio-generated data sensing device is a monitor configured to collect heart rate intensity or heart date variability data of the user.

16. The system of claim 13, wherein the first sensory output is a tactile output comprising vibrations determined based on the first output array, and the output delivery system comprises one or more vibration output devices configured to generate the vibrations.

17. The system of claim 13, wherein the first sensory output is an aroma output having a scent determined based on the first output array, and the output delivery system comprises one or more scent output devices for generating the scent.

18. The system of claim 13, wherein the first sensory output is a consumable item having a flavor determined based on the first output array, and the output delivery system includes one or more flavor output devices for generating the flavor.

19. The system of claim 13, wherein the sensory input system comprises a tactile input source, and the sensory content is vibratory content applied to the user, the first input signal including first data identifying a pressure level of the vibratory content and second data identifying a temperature level of the vibratory content.

20. The system of claim 13, wherein the sensory input system comprises a material analysis device, and the sensory content is a source material consumed by the user, the first input signal comprising data identifying one or more components of the source material.

21. The system of claim 13, further comprising:
a second bio-generated data sensing device worn by the user and configured to detect a second electrical signal representing second biometric and/or neurometric data of the user,
wherein the one or more processors are further configured to:
determine a second set of output values based on the second electrical signal, the common vocabulary, and the parameter file, wherein the parameter file further comprises a set of instructions for applying the common vocabulary to the second electrical signal; and
generate a second output array comprising the second set of output values, and
wherein the output delivery system is further configured to render the second output array as a second sensory output.

22. The system of claim 13, further comprising:
an audio/visual input system configured to provide a second input signal representing audio content produced by the user during detection of the first electrical signal; and
a spectral analyzer configured to identify one or more aspects of the second input signal,
wherein the one or more processors are further configured to:
populate the common vocabulary based further on the identified aspects of the second input signal;
determine a third set of output values based on the first electrical signal, the common vocabulary, and the parameter file;

generate a third output array comprising the third set of output values; and provide the third output array to the output delivery system, wherein the output delivery system is further configured to render the third output array as an audio output.

23. The system of claim 22, wherein the third set of output values comprises Musical Instrument Digital Interface ("MIDI") data.

24. The system of claim 13, wherein the common vocabulary is populated with values determined based on different types of sensory experiences, the first input signal being associated with a first sensory experience, and the output array being associated with a second sensory experience that is different from the first sensory experience.

25. A system, comprising:
- a first bio-generated data sensing device worn by a first user and configured to detect a first electrical signal representing biometric and/or neurometric data of the first user;
- a second bio-generated data sensing device worn by a second user and configured to detect a second electrical signal representing biometric and/or neurometric data of the second user;
- a memory configured to store a parameter file and a common vocabulary;
- one or more processors configured to:
- determine a set of output values based on the first electrical signal, the second electrical signal, the common vocabulary, and the parameter file, and
- generate an output array comprising the set of output values; and
- an output delivery system configured to render the first output array as a first sensory output for the first user and a second sensory output for the second user, wherein the common vocabulary comprises a list of possible output values, and the parameter file comprises a set of instructions for applying the common vocabulary to each of the first electrical signal and the second electrical signal to derive the set of output values.

26. The system of claim 25, further comprising a sensory input system configured to provide: a first input signal representing sensory content experienced by the first user in association with detection of the first electrical signal, and a second input signal representing sensory content experienced by the second user in association with detection of the second electrical signal, wherein the one or more processors are further configured to:
- receive the first and second input signals from the sensory input system, and
- populate the common vocabulary with one or more values determined based on the first input signal and the second input signal.

27. The system of claim 25, wherein each of the first bio-generated data sensing device and the second bio-generated data sensing device is a headset configured to collect electroencephalography ("EEG") signals or the is a monitor configured to collect heart rate intensity or heart date variability data.

* * * * *